US011497303B2

(12) United States Patent
Miller et al.

(10) Patent No.: US 11,497,303 B2
(45) Date of Patent: Nov. 15, 2022

(54) TOOLLESS ATTACHMENT ASSEMBLY

(71) Applicant: Poppin, Inc., New York, NY (US)

(72) Inventors: Jeffrey F. Miller, New York, NY (US); Adrian Gomez, Edgewater, NY (US); Justin D. Dollinger, New York, NY (US); Robert D. Peavey, Brooklyn, NY (US); Matteo Bonacina, Astoria, NY (US)

(73) Assignee: Poppin Inc., New York, NY (US)

( * ) Notice: Subject to any disclaimer, the term of this patent is extended or adjusted under 35 U.S.C. 154(b) by 153 days.

(21) Appl. No.: 17/046,499

(22) PCT Filed: May 6, 2019

(86) PCT No.: PCT/US2019/030879
§ 371 (c)(1),
(2) Date: Oct. 9, 2020

(87) PCT Pub. No.: WO2019/213650
PCT Pub. Date: Nov. 7, 2019

(65) Prior Publication Data
US 2021/0052064 A1 Feb. 25, 2021

Related U.S. Application Data

(60) Provisional application No. 62/667,005, filed on May 4, 2018.

(51) Int. Cl.
*A47B 3/06* (2006.01)
*A47B 9/00* (2006.01)
(Continued)

(52) U.S. Cl.
CPC .................. *A47B 3/06* (2013.01); *A47B 9/00* (2013.01); *A47B 13/023* (2013.01); *F16B 2/18* (2013.01); *F16B 12/42* (2013.01)

(58) Field of Classification Search
CPC ........... A47B 3/06; A47B 3/12; A47B 13/003; A47B 13/02; A47B 2013/006; A47B 2013/022; F16B 2/18; F16B 12/42
(Continued)

(56) References Cited

U.S. PATENT DOCUMENTS 3,228,360 A * 1/1966 Jones .................. F16M 11/2014
                                                              108/158
4,944,235 A * 7/1990 Jahnke ................. A47B 13/003
                                                              108/154
(Continued)

FOREIGN PATENT DOCUMENTS

WO    WO-2018093323 A1 *  5/2018  ............... A47B 1/08
WO    WO-2019174686 A2 *  9/2019  ............. A47B 13/06
(Continued)

OTHER PUBLICATIONS

International Search Report and Written Opinion for International PCT Application No. PCT/US2019/030879, dated Jul. 16, 2019.

*Primary Examiner* — Jose V Chen
(74) *Attorney, Agent, or Firm* — K&L Gates LLP

(57) ABSTRACT

An attachment assembly for use with furniture and other articles. The attachment assembly includes a connector assembly that is configured to engage with a rail. The connector assembly includes a first, fixed protrusion, a lever, a second protrusion extending from the lever, and a third protrusion positioned between the first protrusion and the second protrusion. The rail includes a lip and a cutout in the lip that is sized to receive the third protrusion. The rail is configured to retain the connector assembly. Pivoting the lever when the connector assembly is positioned within the rail is configured to cause the second protrusion to bear against a bottom surface of the rail, such that the first protrusion and the second protrusion frictionally engage the
(Continued)

bottom surface of the rail and the third protrusion frictionally engages the lip to fixedly hold the connector assembly.

21 Claims, 40 Drawing Sheets

(51) Int. Cl.
  *A47B 13/02* (2006.01)
  *F16B 2/18* (2006.01)
  *F16B 12/42* (2006.01)
(58) Field of Classification Search
  USPC .............. 108/158.12, 157.1, 159.11, 157.16; 248/188.1, 188
  See application file for complete search history.

(56) References Cited

U.S. PATENT DOCUMENTS

| | | |
|---|---|---|
| 5,323,713 A | 6/1994 | Luyk et al. |
| 11,298,812 B1 * | 4/2022 | Price ................. A47B 3/06 |
| 2015/0147113 A1 | 5/2015 | Crabtree, II |
| 2015/0238008 A1 | 8/2015 | Rutz |
| 2015/0282605 A1 * | 10/2015 | Wu ........................ A47B 9/00 248/188.2 |
| 2017/0135466 A1 * | 5/2017 | Randløv ................ A47B 9/04 |
| 2017/0251806 A1 | 9/2017 | Newman |
| 2018/0020822 A1 | 1/2018 | Miller et al. |
| 2018/0103753 A1 * | 4/2018 | Davidsen ............. A47B 13/003 |
| 2020/0154876 A1 * | 5/2020 | Liu ........................ A47B 9/00 |
| 2020/0154881 A1 * | 5/2020 | Applegate ............ A47B 3/0815 |
| 2020/0214439 A1 * | 7/2020 | Bennett ................. A47B 9/20 |
| 2020/0245757 A1 * | 8/2020 | Jones .................... A47B 13/003 |
| 2020/0359783 A1 * | 11/2020 | Koehn ................... H02K 5/225 |
| 2021/0100356 A1 * | 4/2021 | Huang .................. A47B 17/03 |

FOREIGN PATENT DOCUMENTS

| | | |
|---|---|---|
| WO | 2019213650 A1 | 11/2019 |
| WO | WO-2021041680 A1 * | 3/2021 |

* cited by examiner

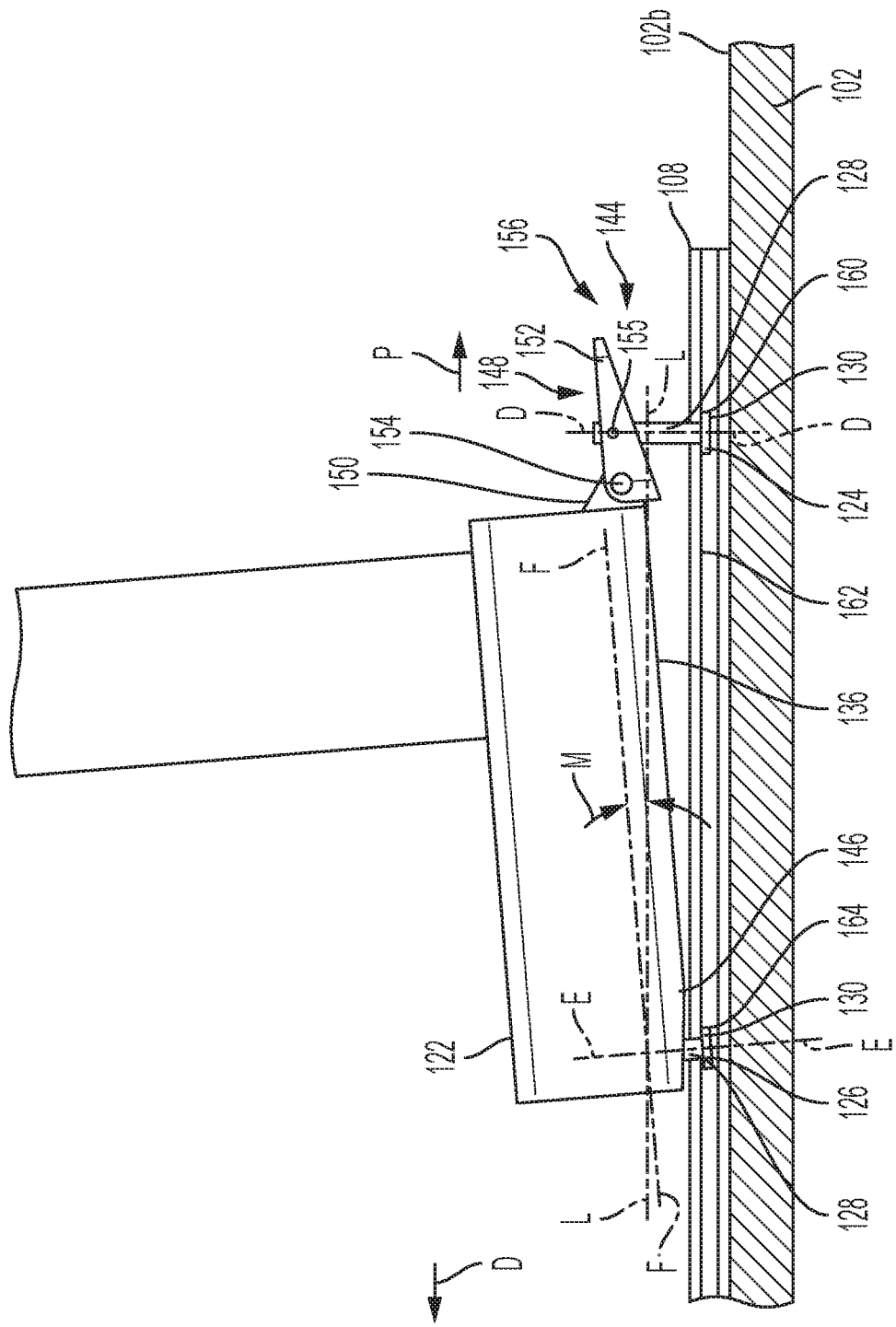

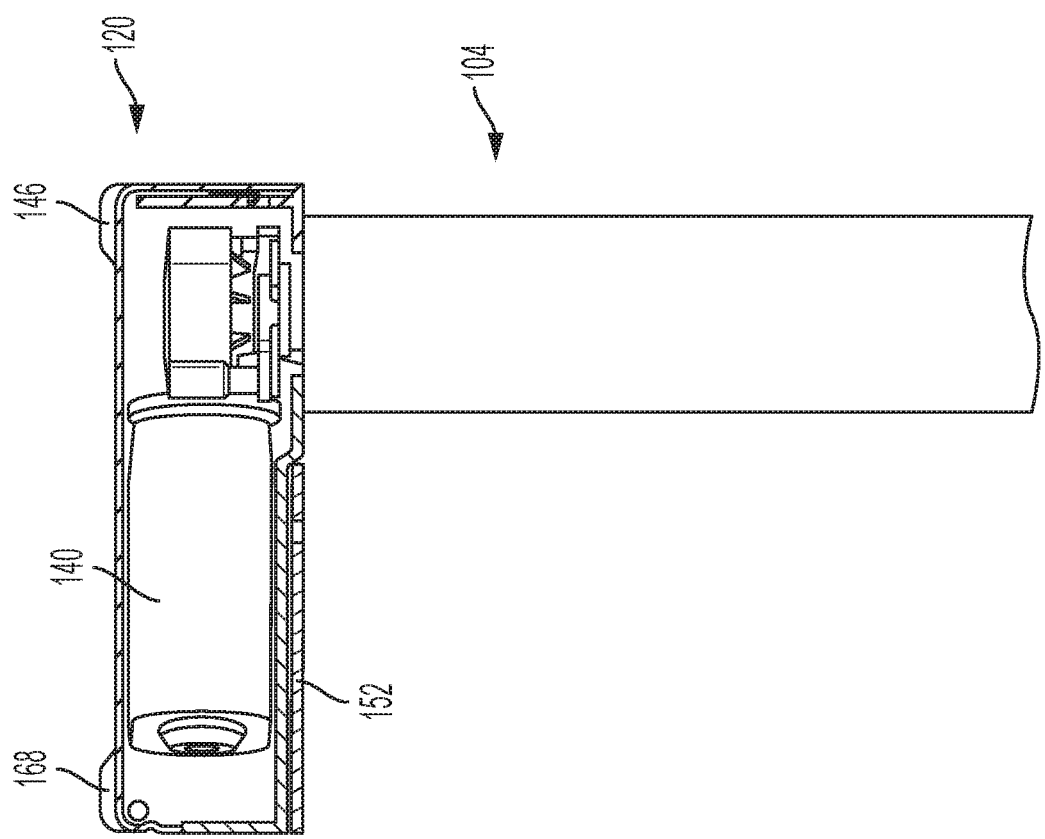

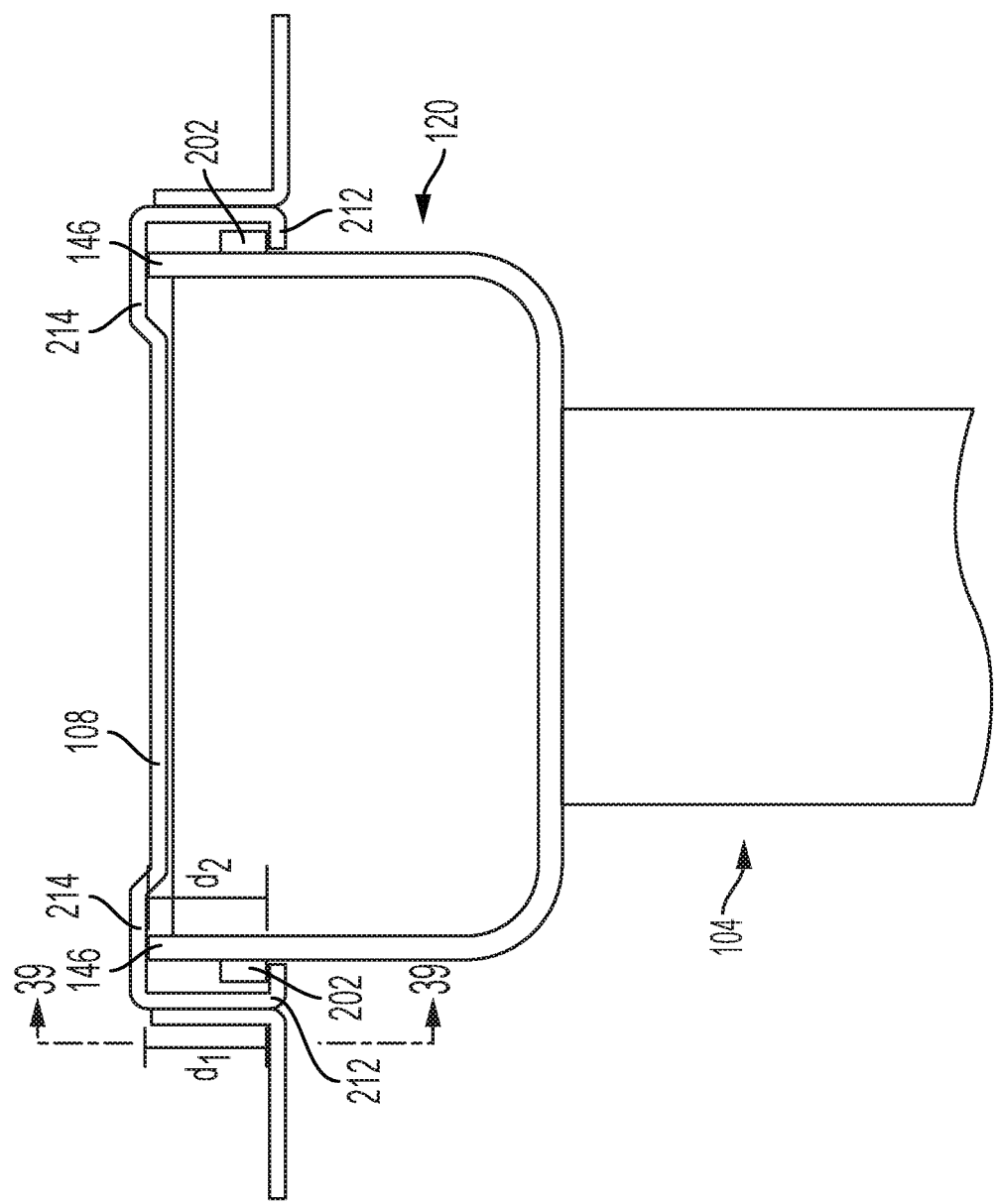

TOOLLESS ATTACHMENT ASSEMBLY

CROSS-REFERENCE TO RELATED APPLICATIONS

This application is a U.S. National Stage Entry under 35 U.S.C. § 371 of International Patent Application No. PCT/US2019/030879, entitled TOOLLESS ATTACHMENT ASSEMBLY, filed May 6, 2019, which claims the benefit of priority under 35 U.S.C. § 119(e) to U.S. Provisional Application No. 62/667,005, filed May 4, 2018, entitled TOOLLESS ATTACHMENT ASSEMBLY, the entire disclosures of which are hereby incorporated by reference herein.

BACKGROUND

The present disclosure is related to devices, systems, and methods to attach a motor housing and/or a leg assembly to an electronic height-adjustable desk.

SUMMARY

In one general aspect, an attachment assembly comprising a connector assembly and a rail. The connector assembly comprises: a first protrusion held in a fixed orientation relative to the connector assembly, a lever pivotable between a first position and a second position, a second protrusion extending from the lever, the second protrusion configured to rotate from a first orientation to a second orientation as the lever pivots from the first position to the second position, and a third protrusion positioned between the first protrusion and the second protrusion. The rail comprises a lip and a cutout in the lip, the cutout located at an insertion position on the rail and is sized to receive the third protrusion. The rail is configured to retain the connector assembly at a retention position on the rail, the retention position being at a different position than the insertion position. Pivoting the lever from the first position to the second position when the connector assembly is positioned within the rail is configured to cause the second protrusion to bear against a bottom surface of the rail, such that the first protrusion and the second protrusion frictionally engage the bottom surface of the rail and the third protrusion frictionally engages the lip to fixedly hold the connector assembly at the retention position.

In another general aspect, a furniture assembly comprising a table surface, a leg assembly, and the attachment assembly described above, wherein the connector assembly is disposed on the leg assembly and the rail is disposed on the table surface.

In yet another general aspect, a method of assembling an article of furniture comprising a connector assembly and a rail, the connector assembly comprising a first protrusion held in a fixed orientation relative to the connector assembly, a lever pivotable between a first position and a second position, a second protrusion extending from the lever, the second protrusion configured to rotate from a first orientation to a second orientation as the lever pivots from the first position to the second position, and a third protrusion positioned between the first protrusion and the second protrusion, the rail comprising a lip and a cutout in the lip, the cutout sized to receive the third protrusion. The method comprises: aligning the third protrusion with the cutout; inserting the connector assembly into the rail; sliding the connector assembly to a location along the rail; and pivoting the lever from the first position to the second position to cause the second protrusion to bear against a bottom surface of the rail, such that the first protrusion and the second protrusion frictionally engage the bottom surface of the rail and the third protrusion frictionally engages the lip to fixedly hold the connector assembly at a retention position.

The foregoing is a summary and thus may contain simplifications, generalizations, inclusions, and/or omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein.

FIGURES

The novel features of the various aspects described herein are set forth with particularity in the appended claims. The various aspects, however, as to structures, arrangements, and/or methods of operation may be better understood by reference to the following description, taken in conjunction with the accompanying drawings as follows:

FIG. 27 illustrates a detailed view of the connector assembly in a loosened configuration according to an alternative aspect of the present disclosure.

FIG. 33B illustrates a sectional view along line 33-33, where the lever is in the tightened configuration, according to the alternative aspect of FIG. 31.

FIG. 38 illustrates a sectional view of the connector assembly along line 38-38, according to the alternative aspect of FIG. 31.

Figure 1:
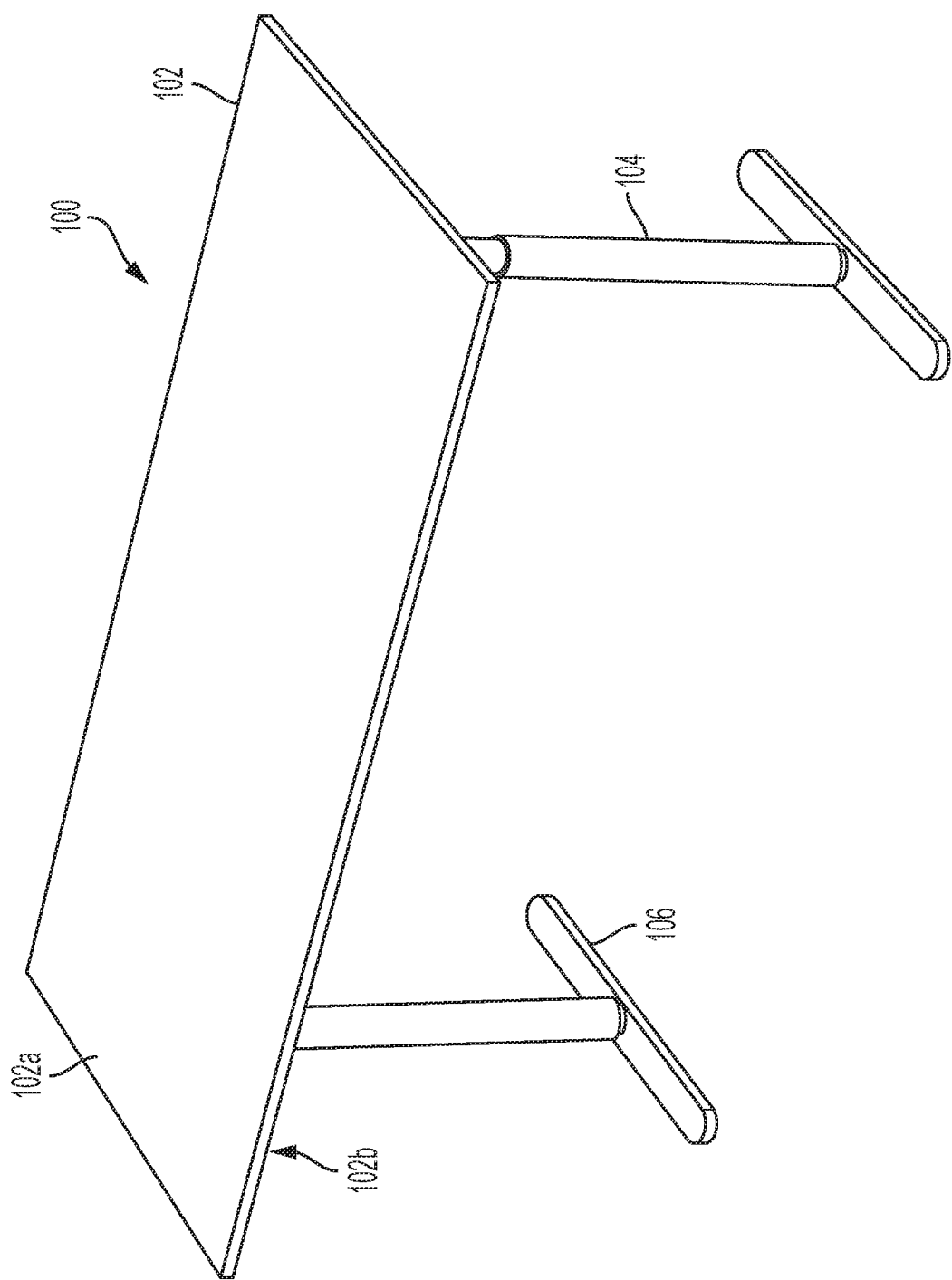
FIG. 1 illustrates an example electronic height-adjustable desk assembled according to various aspects of the present disclosure.

The foregoing figures are illustrative only and are not intended to be in any way limiting. In addition to the illustrative aspects and features described above, further aspects and features will become apparent by reference to the drawings and the following detailed description.

In addition to the foregoing, various other device, system, and/or method aspects are set forth and described in the teachings such as text (e.g., claims and/or detailed description) and/or drawings of the present disclosure.

Further, it is understood that any one or more of the following described forms, expressions of forms, and examples can be combined with any one or more of the other following-described forms, expressions of forms, and examples.

DESCRIPTION

In the following detailed description, reference is made to the accompanying drawings, which form a part hereof. In the drawings, similar symbols and reference characters typically identify similar components throughout the several views, unless context dictates otherwise. The illustrative aspects described in the detailed description, drawings, and claims are not meant to be limiting. Other aspects may be utilized, and other changes may be made, without departing from the scope of the subject matter presented here.

Before explaining the various aspects of the present disclosure in detail, it should be noted that the various aspects disclosed herein are not limited in their application or use to the details of construction and arrangement of parts illustrated in the accompanying drawings and description. Rather, the disclosed aspects may be positioned or incorporated in other aspects, variations, and modifications thereof, and may be practiced or carried out in various ways. Accordingly, aspects disclosed herein are illustrative in nature and are not meant to limit the scope or application thereof. For example, various aspects are disclosed in the context of an electronic height-adjustable desk (e.g., otherwise referred to as an adjustable "standing" desk, "sit-stand" desk, "sit-to-stand" desk, "stand-up" desk, etc.). It is noted that the disclosed aspects may be utilized in the context of a plurality of different types of furniture (e.g., a non-electronic desk, a table, a chair, a cabinet, etc.). More broadly, various disclosed aspects may be utilized to attach a first component to a second component (e.g., a leg, a tray, a housing, an assembly, etc. to any surface of a piece of equipment, a furnishing, etc.).

Unless otherwise indicated, the terms and expressions employed herein have been chosen for the purpose of describing the aspects for the convenience of the reader and are not to limit the scope thereof. In addition, it should be understood that any one or more of the disclosed aspects, expressions of aspects, and/or examples thereof can be combined with any one or more of the other disclosed aspects, expressions of aspects, and/or examples thereof, without limitation.

Also, in the following description, it is to be understood that terms such as front, back, inside, outside, top, bottom, and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

Before getting into the details below, aspects of the present disclosure are intended to solve various problems including but not limited to: 1) the requirement to use tools to assemble a piece of furniture, 2) inefficiencies (e.g., labor time) resulting from the use of a plurality of screws or similar hardware to assemble a piece of furniture, 3) more loose/overall pieces (e.g. screws) to assemble a piece of furniture, 4) extensive labor/effort required to assemble a piece of furniture, etc. In this vein, benefits from aspects of the present disclosure include: 1) a tool-free assembly, 2) a way to rigidly attach a first component to a second component in a time-efficient manner, 3) less loose/overall pieces for assembly, 4) minimal labor/effort for assembly, etc.

FIG. 1 illustrates an example electronic height-adjustable desk 100 assembled according to various aspects of the present disclosure. In such an aspect, the desk 100 comprises a desktop 102 including a first or top surface 102a and a second or bottom surface 102b, one or more than one leg assembly 104 coupled to the desktop 102 and a foot assembly 106 coupled to each leg assembly 104.

Figure 2:
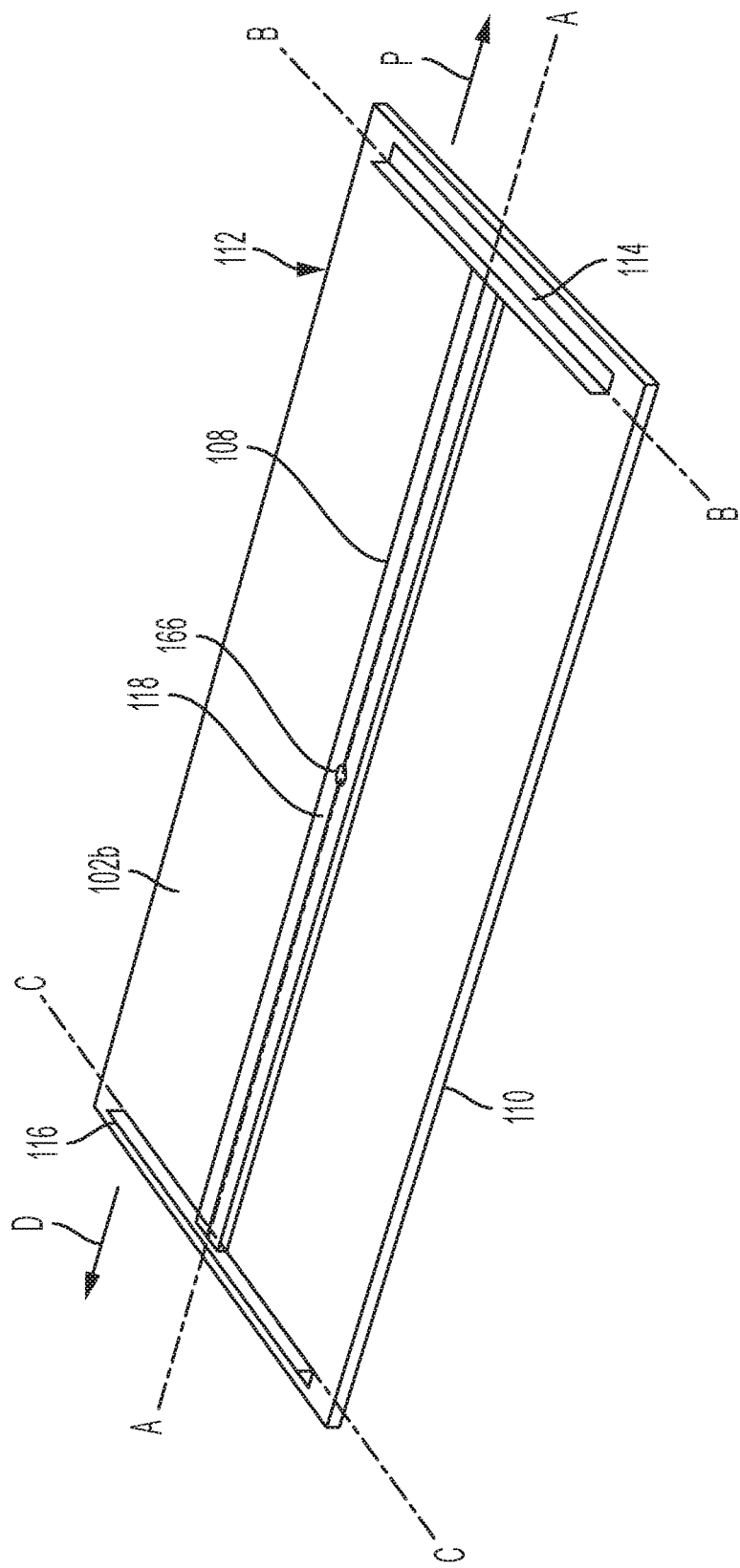
FIG. 2 illustrates an example slotted rail and angled brackets as installed on a desktop according to one aspect of the present disclosure.

Turning to FIG. 2, a slotted rail 108 may extend along axis A-A lengthwise between a proximal portion (proximal direction marked "P") and a distal portion (distal direction marked "D") of the second or bottom surface 102b of the desktop 102. Axis A-A may be centrally located between a left or first side 110 and a right or second side 112 of the desktop 102. A first angled bracket 114 may be coupled to and/or cap a proximal end of the slotted rail 108 and may extend perpendicular to axis A-A along axis B-B, between the left or first side 110 and the right or second side 112, to support the desktop 102 and anticipated desktop loads. A second angled bracket 116 may be coupled to and/or cap a distal end of the slotted rail 108 and may extend perpendicular to axis A-A along axis C-C, between the left or first side 110 and the right or second side 112, to support the desktop and anticipated desktop loads. According to various aspects, additional transverse brackets (not shown) may be positioned between the proximal end and the distal end of the slotted rail to further support the desktop 102. In further aspects, the slotted rail 108 may comprise multiple slots extending between the proximal end and the distal end of the slotted rail.

According to various aspects of the present disclosure, the slotted rail 108 and/or the angled brackets 114/116 may be pre-installed on the desktop 102 by a manufacturer (e.g., attached via screws and/or adhesive, etc.). In such an aspect, the desk 100 may be quickly assembled as disclosed herein without the need to attach the slotted rail to the desktop 102.

Figure 10:
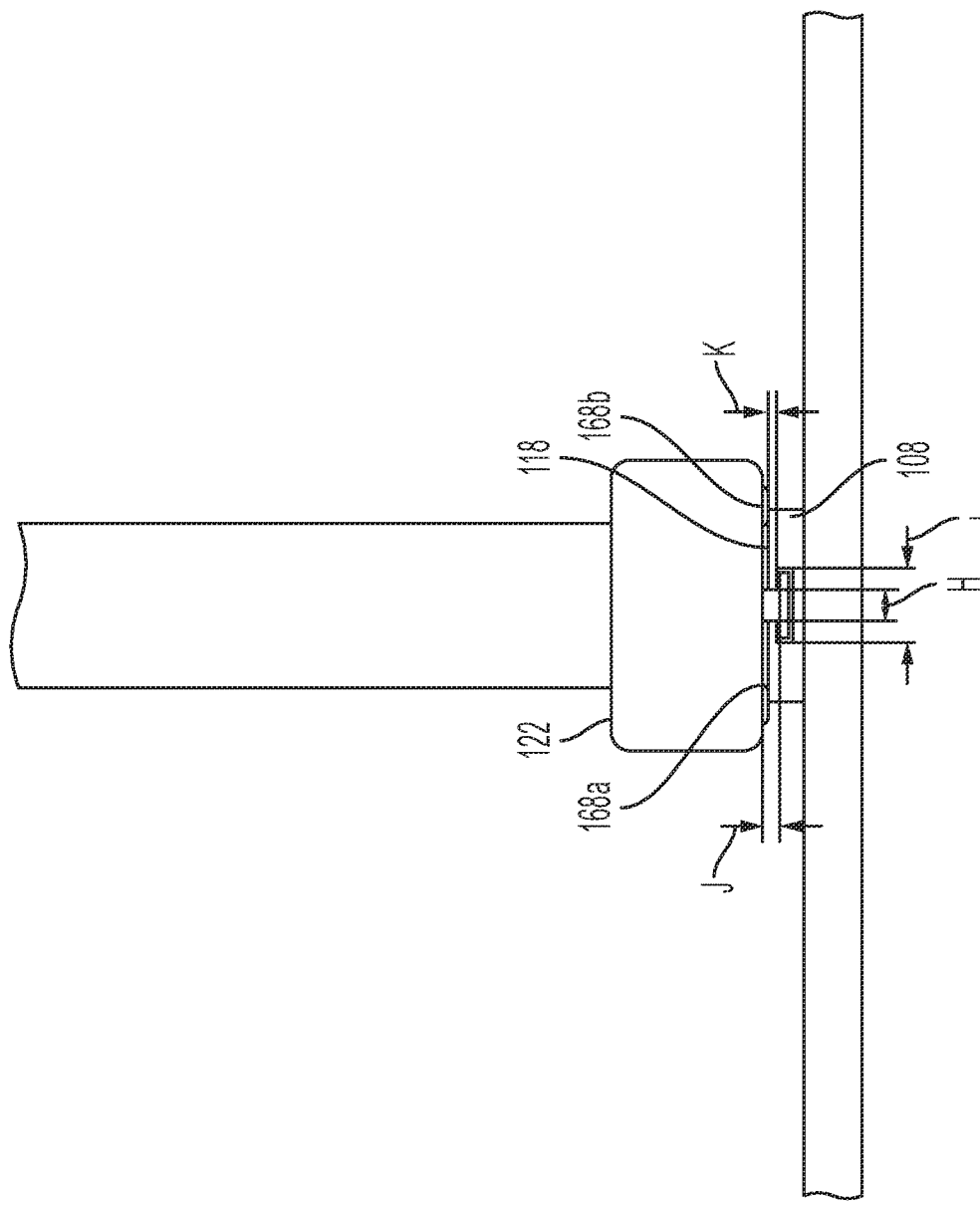
FIG. 10 illustrates a cross-section, through the desktop and the slotted rail, viewing the motor housing assembly and the housing attachment assembly, in a distally-facing direction, in a tightened configuration, according to various aspects of the present disclosure.

According to one aspect, the slotted rail 108 may comprise an aluminum slotted rail including at least one standard T-slot (see FIG. 10). In other aspects, other materials (e.g., other metals, woods, composites) comprising at least one T-slot may be used. In yet other aspects, a slot configuration/profile different from a T-slot may be used.

According to one alternative aspect, the slotted rail 108 may be inset into the second or bottom surface 102b of the desktop 102. According to one aspect, a top surface 118 of slotted rail 108 may be flush with the second or bottom surface 102b. According to another alternative aspect, a slot (e.g., a T-slot formed via a router) may extend along axis A-A lengthwise between the proximal portion and the distal portion of the second or bottom surface 102b. According to such an aspect, the slot may be integral to or part of the second or bottom surface 102b of the desktop 102 to supplant the use of a slotted rail 108.

Figure 3:
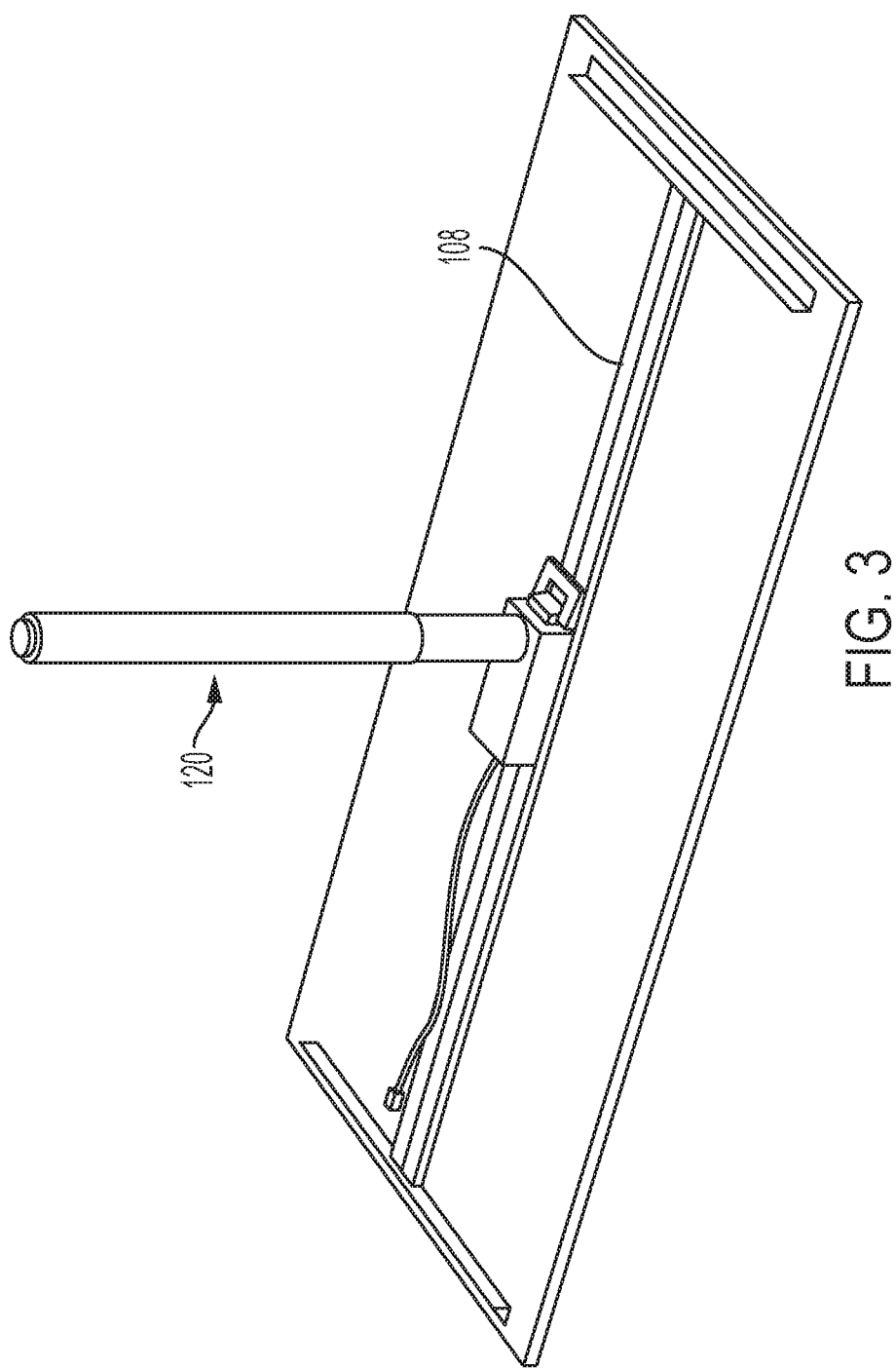
FIG. 3 illustrates a connector assembly slideably coupled to the slotted rail according to various aspects of the present disclosure.

Turning now to FIG. 3, a connector assembly 120 may be slideably coupled to the slotted rail 108. Notably, according to various aspects of the present disclosure, the connector assembly 120 may comprise a leg assembly 104 coupled to a housing 122. According to various aspects of the present disclosure the connector assembly 120 may be preassembled by a manufacturer. In such an aspect, the desk 100 may be quickly assembled as disclosed herein without the need to separately couple the leg assembly 104 and the housing 122. An example connector assembly 120 is shown and discussed in reference to FIGS. 25 and 26 below.

Figure 4:
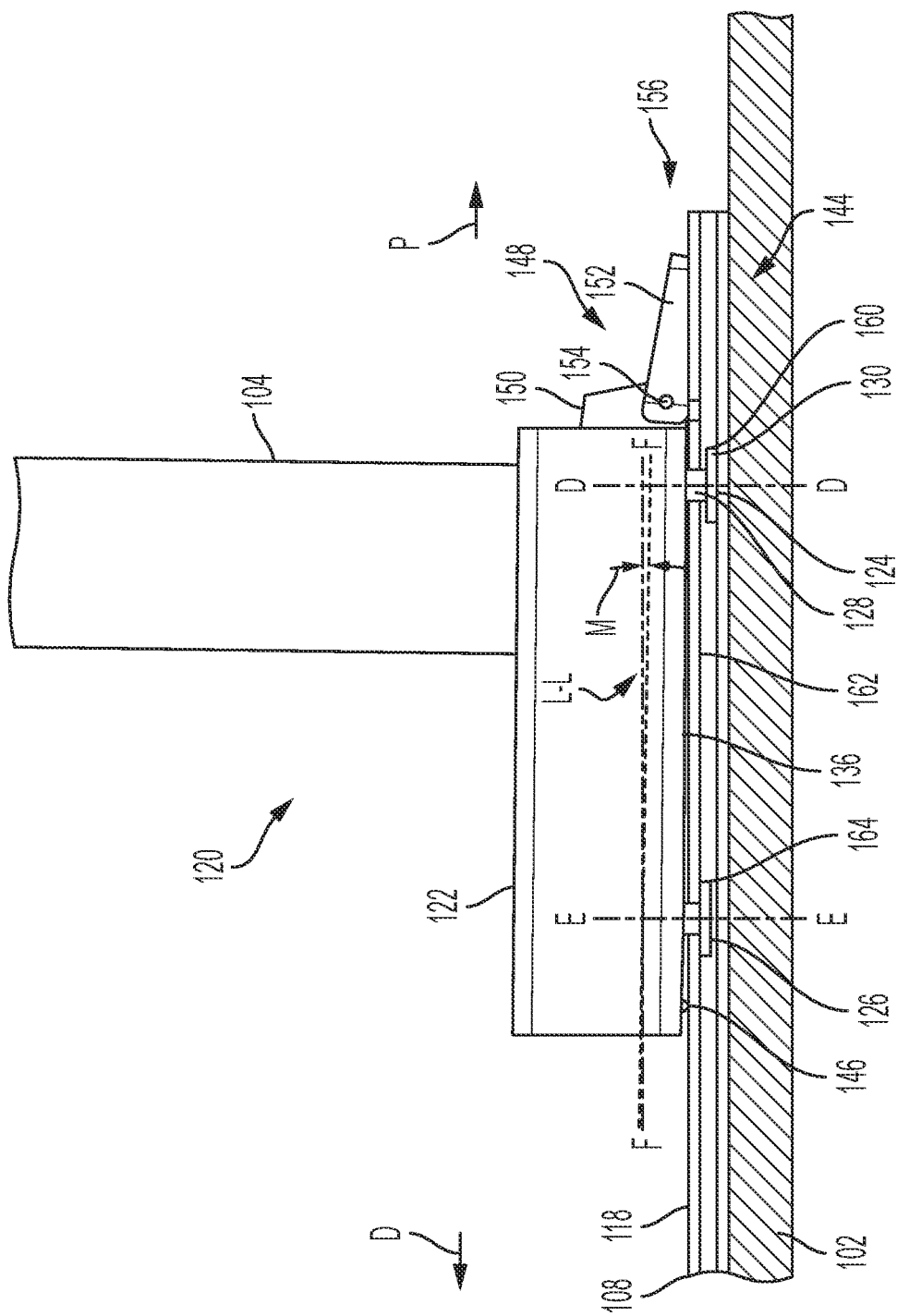
FIG. 4 illustrates a detailed view of the connector assembly in a loosened configuration according to aspects of the present disclosure.

FIG. 4 illustrates a detailed view of a connector assembly 120, in a loosened configuration, according to various aspects of the present disclosure. The connector assembly 120 can include a first protrusion 146 and a second protrusion 168 (FIG. 8), the functions of which are described in more detail below. Further, the connector assembly 120 can include a first male anchor 124 and a second male anchor 126 are coupled to a bottom surface 136 of the housing 122. The anchors 124, 126 can also collectively be referred to as "third protrusions." According to one aspect of the present disclosure, each of the first male anchor 124 and the second male anchor 126 comprise a neck-like spacer 128 and a washer-shaped head 130. In such an aspect, referring again to FIG. 4, the spacer 128 and the head 130 of the first male anchor 124 are coaxially aligned with axis D-D and the spacer 128 and the head 130 of the second male anchor 126 are coaxially aligned with axis E-E. In such an aspect, axis D-D and axis E-E may be perpendicular to axis F-F (see FIG. 5) which extends lengthwise between a proximal end (proximal direction marked "P") and a distal end (distal direction marked "D") of the housing 122. Axis F-F may be centrally located between a first side 132 and a second side 134 of the housing 122. Notably, axis F-F and axis A-A may be aligned in the same plane. Further in such an aspect, the neck-like spacer 128 and the washer-shaped head 130 of the first male anchor 124 and the second male anchor 126 are configured to mimic the shape of the T-slot of the slotted rail 108 (see FIG. 10). More specifically, each spacer 128 is configured and dimensioned to be insertably and slideably received in portion "H" defined by the slotted rail 108 and each head 130 is configured and dimensioned to be insertably and slideably received in portion "I" defined by the slotted rail 108 (see FIG. 10).

Figure 26:
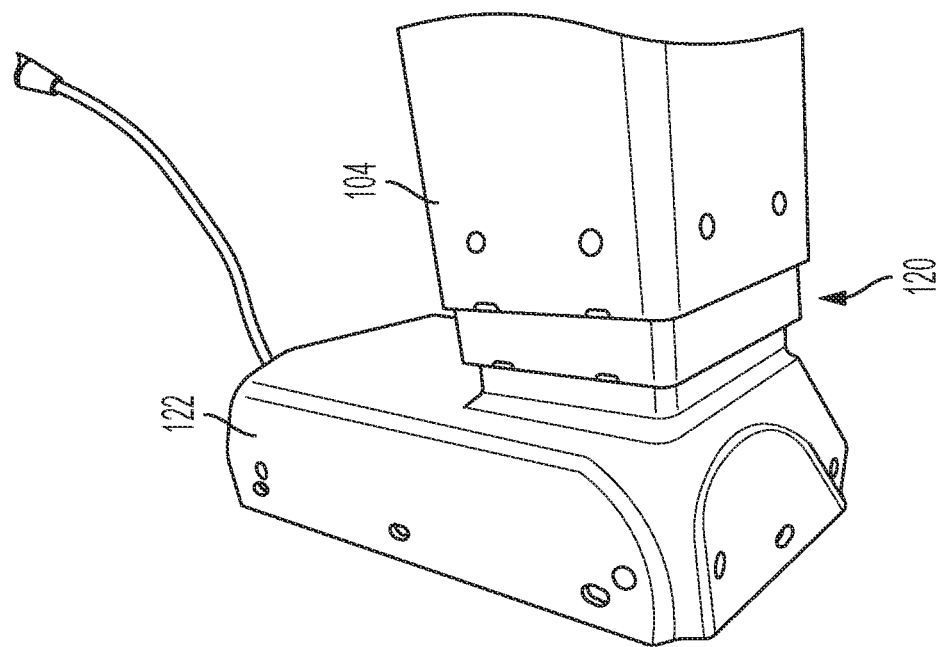
FIG. 26 illustrates another perspective of the example connector assembly of FIG. 25.
Figure 25:
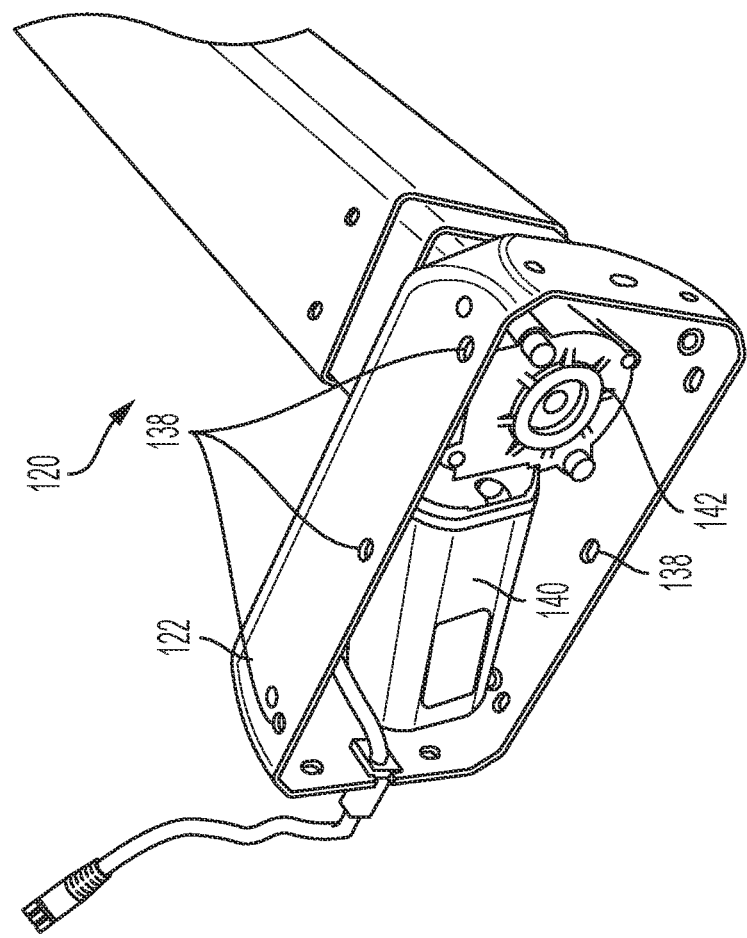
FIG. 25 illustrates an example connector assembly wherein the motor housing assembly lacks a bottom surface.

Referring again to FIG. 4, according to one aspect of the present disclosure each of the first male anchor 124 and the second male anchor 126 are not adjustable. More specifically, a distance "J" defined between a top surface of each head 130 and a bottom surface 136 of the housing 122 cannot be altered (see FIG. 10). In such an aspect distance "J" may be specifically calibrated for a particular/standard slotted rail 108 with tight tolerances. According to one aspect, the spacer 128 and head 130 of each of first male anchor 124 and the second male anchor 126 may be precision machined as one piece. According to such an aspect, the first male anchor 124 and the second male anchor 126 may be fixedly attached to the bottom surface 136 of the housing 122. In one aspect, the first male anchor 124 and the second male anchor 126 may be welded to the bottom surface 136 of the housing 122. In another aspect, each of the first male anchor 124 and the second male anchor 126 may further define an aperture along axes D-D and E-E respectively. In such an aspect, a sleeved screw (e.g., that bottoms out at the desired distance "J"), may be inserted in each respective aperture to fixedly attach the first male anchor 124 and the second male anchor 126 to the bottom surface 136 of the housing 122. According to yet another aspect of the present disclosure, the first male anchor 124 and the second male anchor 126 may be integrated on the bottom surface 136 of the housing 122 via a die casting process. Namely, FIGS. 25 and 26 illustrate an example connector assembly 120 wherein the housing 122 lacks a bottom surface 136. In such an example, a bottom surface/plate 136 comprising the first male anchor 124 and the second male anchor integrated thereon, may be die casted for attachment to the housing 122 (e.g., via welding, screws/bolts to existing/available holes e.g., 138). Such a die casted bottom surface/plate 136 would serve at least three purposes: i) protect the motor 140 and gear assembly 142, ii) make the housing 122 rigid, and iii) provide a way to simply, quickly, and rigidly attach a connector assembly 120 to a desk 100. The motor 140 and gear assembly 142 within the housing 122 can be configured to extend and retract the leg assembly 104. Lastly, according to one alternative aspect of the present disclosure, a housing 122 of a connector assembly 120 (see, e.g., FIGS. 25 and 26) may be fixedly inserted within and/or attached to a rectangular steel tube or sleeve to which the first male anchor 124 and second male anchor 126 are attached as described herein.

Referring again to FIG. 4, according to an alternative aspect of the present disclosure, each of the first male anchor 124 and the second male anchor 126 may be adjustable. In another aspect of the present disclosure the first male anchor 124 may be adjustable and the second male anchor 126 may not be adjustable. In yet another aspect of the present disclosure, the first male anchor 124 may not be adjustable and the second male anchor 126 may be adjustable. According to such aspect, adjustability of the first male anchor 124 and/or second male anchor 126 may account for material variability (e.g., of the first male anchor 124 and/or the second male anchor 126 affecting distance "J," thickness "K" of the lip of the slotted rail 108, etc.). According to one aspect, to realize adjustability, the first male anchor 124 and/or the second male anchor 126 may define an aperture along axes D-D and E-E respectively. In such an aspect, a screw may be inserted in each respective aperture to fixedly attach the first male anchor 124 and the second male anchor 126 to the bottom surface 136 of the housing 122. Notably, in such an aspect, the spacer 128 may be compressible (e.g., are constructed from or include a compressible material) to selectively adjust the distance "J" to ensure that the motor housing 122 is rigidly attached to the slotted rail 108.

Turning again to FIG. 4, a detailed view of a connector assembly 120 in a loosened configuration, according to various aspects of the present disclosure, is disclosed. In particular, the housing 122 comprises a housing attachment assembly (shown generally at 144). More specifically, in such aspects the housing attachment assembly 144 comprises a first male anchor 124 and a second male anchor 126 (e.g., described above) coupled to a first component surface 136 (e.g., a bottom surface of the housing 122, a surface of a die casted plate, a bottom surface of a rectangular steel tube, etc.), a first protrusion 146 (also referred to as, in some instances, a "fulcrum" or "pivot") located on a distal portion of the first component surface 136 and a lever assembly 148 coupled to a proximal end/portion of the first component (e.g., housing 122). Notably, the lever assembly 148 comprises a base 150, a lever 152, and a pin 154, wherein the lever 152 is configured to rotate (e.g., counterclockwise in FIG. 4) about the pin 154 between a first position 156 (see FIGS. 3-6, e.g., where the housing attachment assembly 144 is in a movable configuration) and a second position 158 (see FIGS. 7-11, e.g., where the housing attachment assembly 144 is in a fixed/rigid configuration).

In view of FIG. 4, in the first position 156, a first gap 160 exists between a top surface of the head 130 of the first male anchor 124 and an interfacing surface 162 of the slotted rail 108 and a second gap 164 exists between a top surface of the head 130 of the second male anchor 126 and the interfacing surface 162 of the slotted rail 108. In such an aspect, the first gap 160 may be larger than the second gap 164. Notably, in such an aspect, due to such a gap difference, axis F-F varies from axis L-L by an angle "M". In such an aspect, axis L-L may be parallel to a plane defined by the bottom surface 102b of the desktop 102. Furthermore, angle "M" may comprise an acute angle sufficient to produce a first gap 160 and a second gap 164 that enables the housing 122 to slide longitudinally, between the proximal end and the distal end of the slotted rail 108, within the slot (e.g. T-slot). Furthermore, the angle "M" may comprise an acute angle sufficient to prevent a frictional binding between the first protrusion 146 and the top surface 118 of the slotted rail 108 and/or a wedging between the first protrusion 146 and the second male anchor 126 that would inhibit distal and/or proximal slideability of the housing 122.

Notably, referring back to FIG. 2, the top surface 118 of the slotted rail 108 may further define an aperture 166 configured/sized to insertably receive the head 130 of each of the first male anchor 124 and the second male anchor 126. In such an aspect the first male anchor 124 may be inserted through the aperture 166 followed by the second male anchor 126, or vice versa, to slideably couple the housing 122 of the connector assembly 120 to the slotted rail. In another aspect of the present disclosure the first angled bracket 114 and/or the second angled bracket 116 may define a cutout (not shown) at the proximal end and/or distal end of the slotted rail 108 respectively that permits the first male anchor 124 and the second male anchor 126 to slide into the slot of the slotted rail 108 and the motor housing assembly to slide onto the slotted rail 108. In such an aspect, a plug (not shown) may be inserted into the slot of the slotted rail 108 and/or attached to the first angled bracket 114 and/or the second angled bracket 116 to prevent the inserted housing 122 from sliding out the proximal end and/or distal end of the slotted rail 108.

Figure 5:
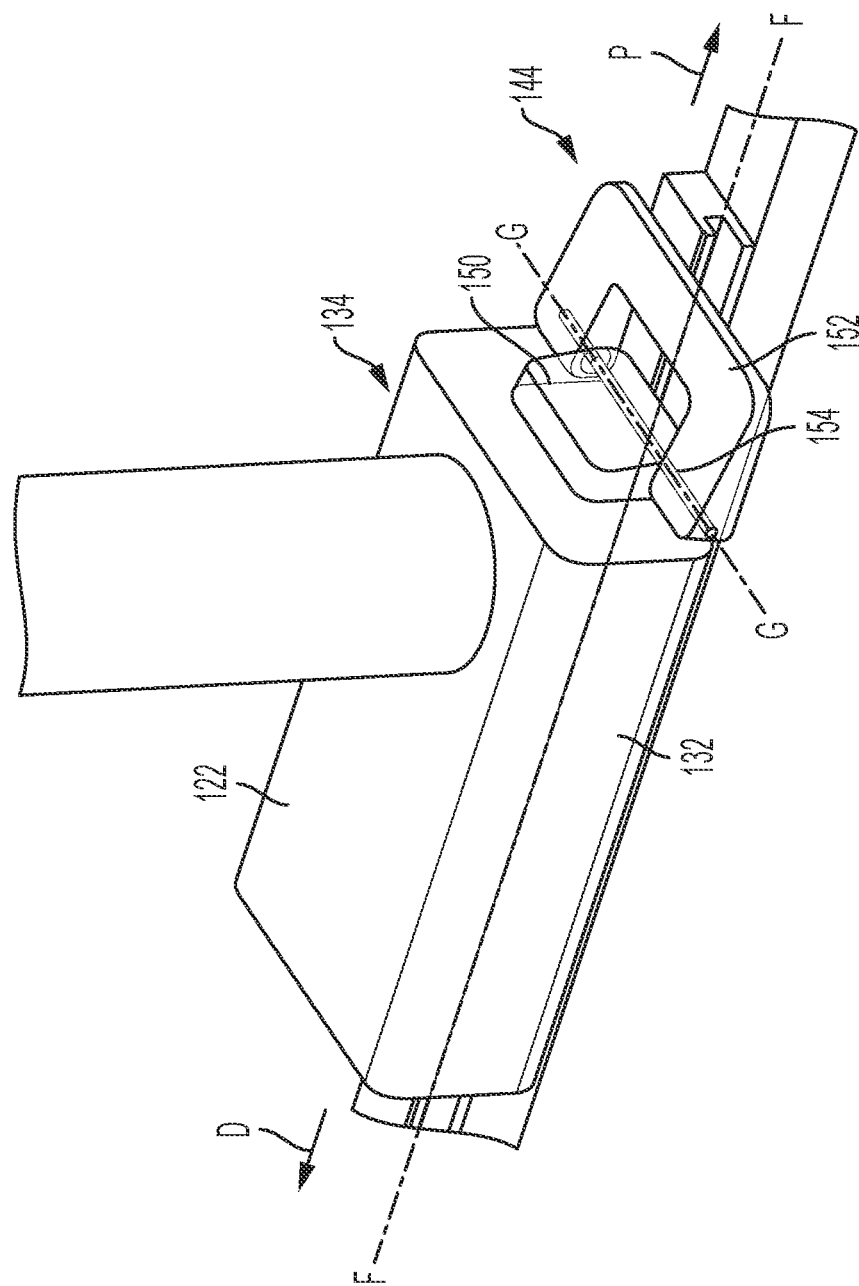
FIG. 5 illustrates an isometric view of the motor housing assembly and the housing attachment assembly according to various aspects of the present disclosure.

FIG. 5 illustrates an isometric view of the housing 122 and the housing attachment assembly 144 according to various aspects of the present disclosure. Notably, in view of FIG. 5, the lever assembly 148 of the housing attachment assembly 144 comprises the pin 154 that extends along axis G-G through the base 150 and the lever 152 to rotatably couple the lever 152 to the base 150. In such an aspect, the axis G-G may be perpendicular to axis F-F.

Figure 6:
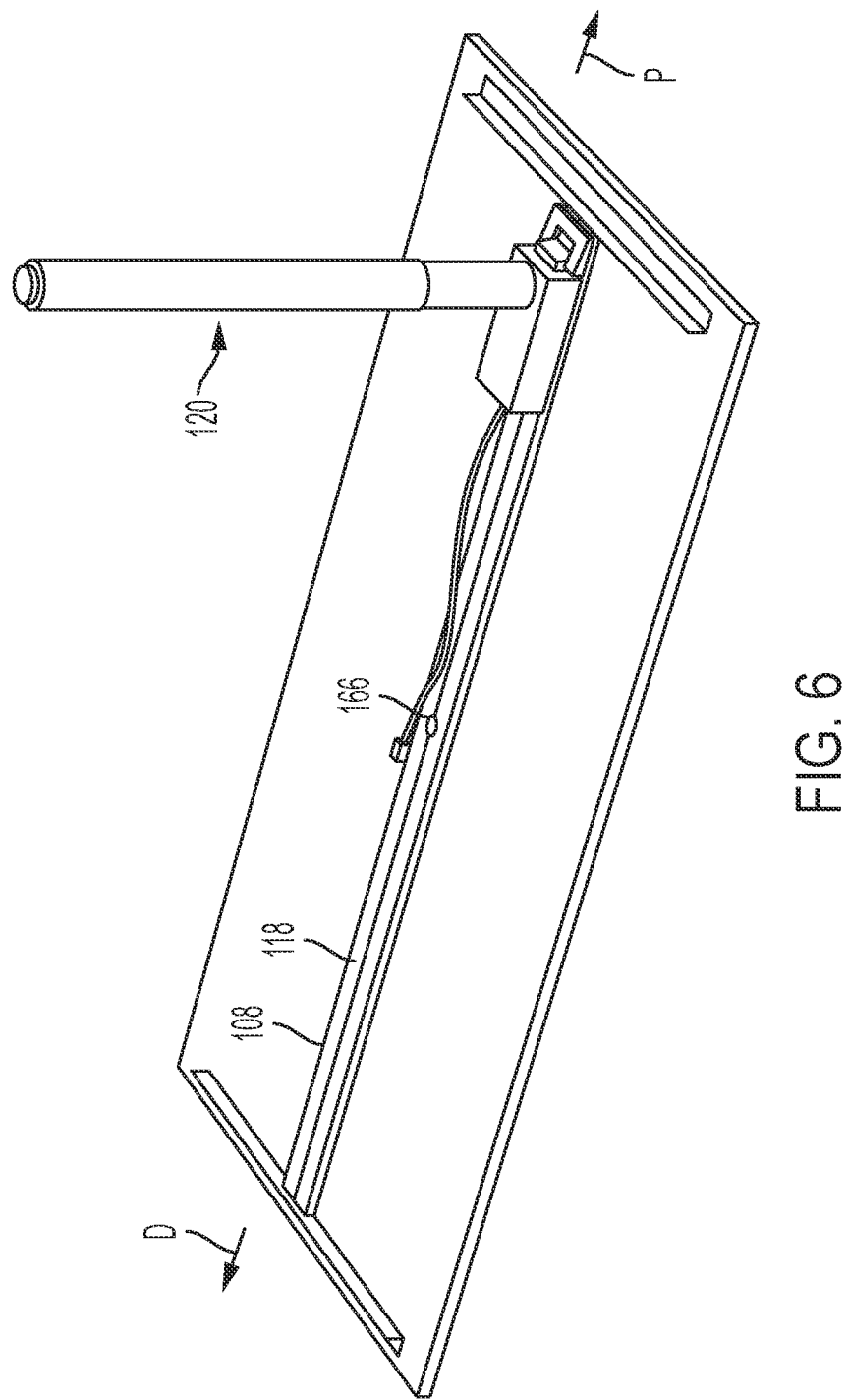
FIG. 6 illustrates the slideability of the connector assembly toward a proximal end of the slotted rail with the housing attachment assembly in a movable configuration, according to various aspects of the present disclosure.

FIG. 6 illustrates the slideability of the connector assembly 120 toward a proximal end of the slotted rail 108 with the housing attachment assembly 144 in a movable configuration. For example, after insertion of the first male anchor 124 and the second male anchor 126 through aperture 166 defined in the top surface 118 of the slotted rail 108, the connector assembly 120 may be slid proximally toward the proximal end of the slotted rail 108 to a desired position. Notably, the slotted rail 108 and the housing attachment assembly 144 described herein permits that connector assembly 120 to be located at various positions along the slotted rail. According to various aspects, no designated position is established, thus enabling a customizable distance between more than one connector assembly 120 (see FIG. 14).

Figure 7:
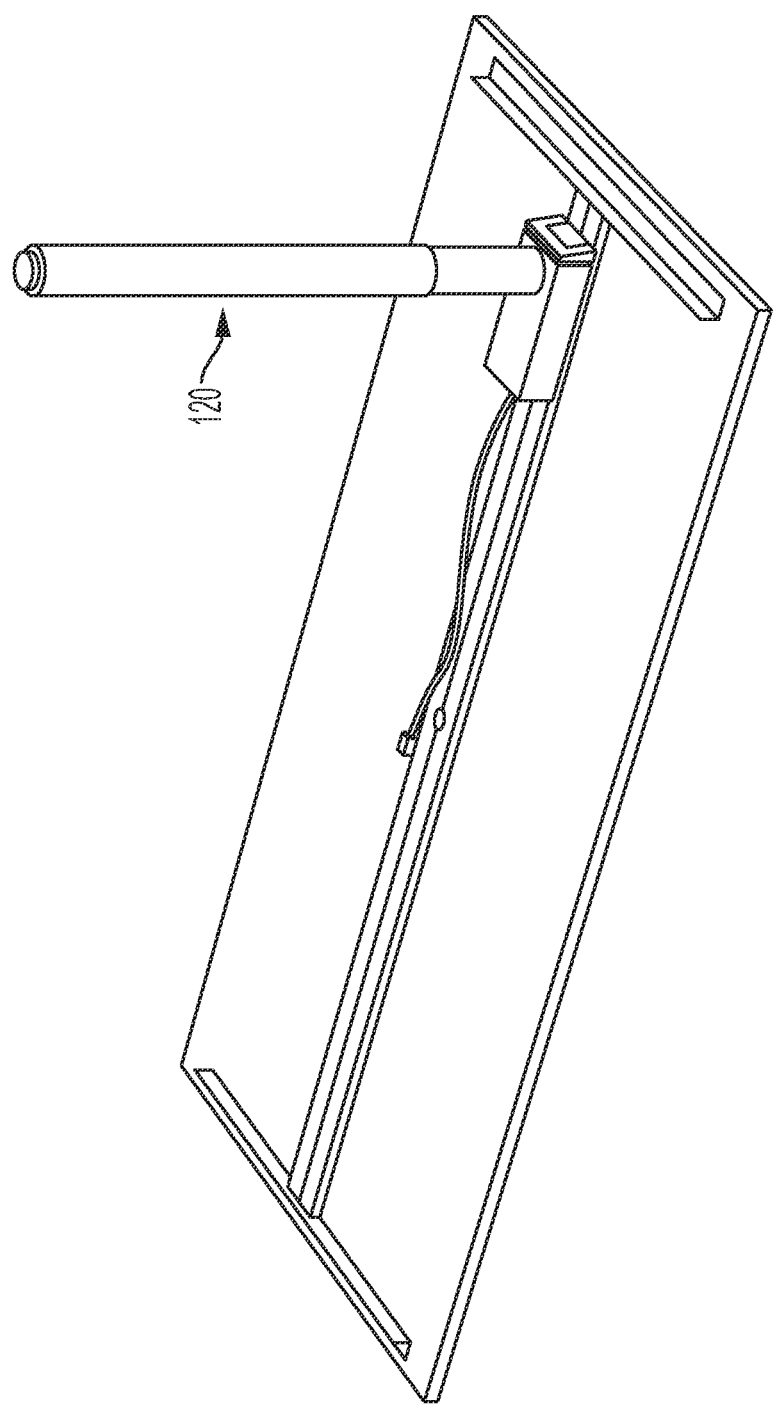
FIG. 7 illustrates the connector assembly in a tightened configuration according to various aspects of the present disclosure.

FIG. 7 illustrates the connector assembly 120 in a tightened configuration according to various aspects of the present disclosure (e.g., lever 152 rotated to an upright second position 158). More specifically, in view of FIG. 8, lever 152 of the lever assembly 148 has been rotated (e.g., counterclockwise in FIG. 8) about pin 154 to the second position 158. Notably, in the second position 158, the housing attachment assembly 144 is in a fixed/rigid configuration.

Figure 8:
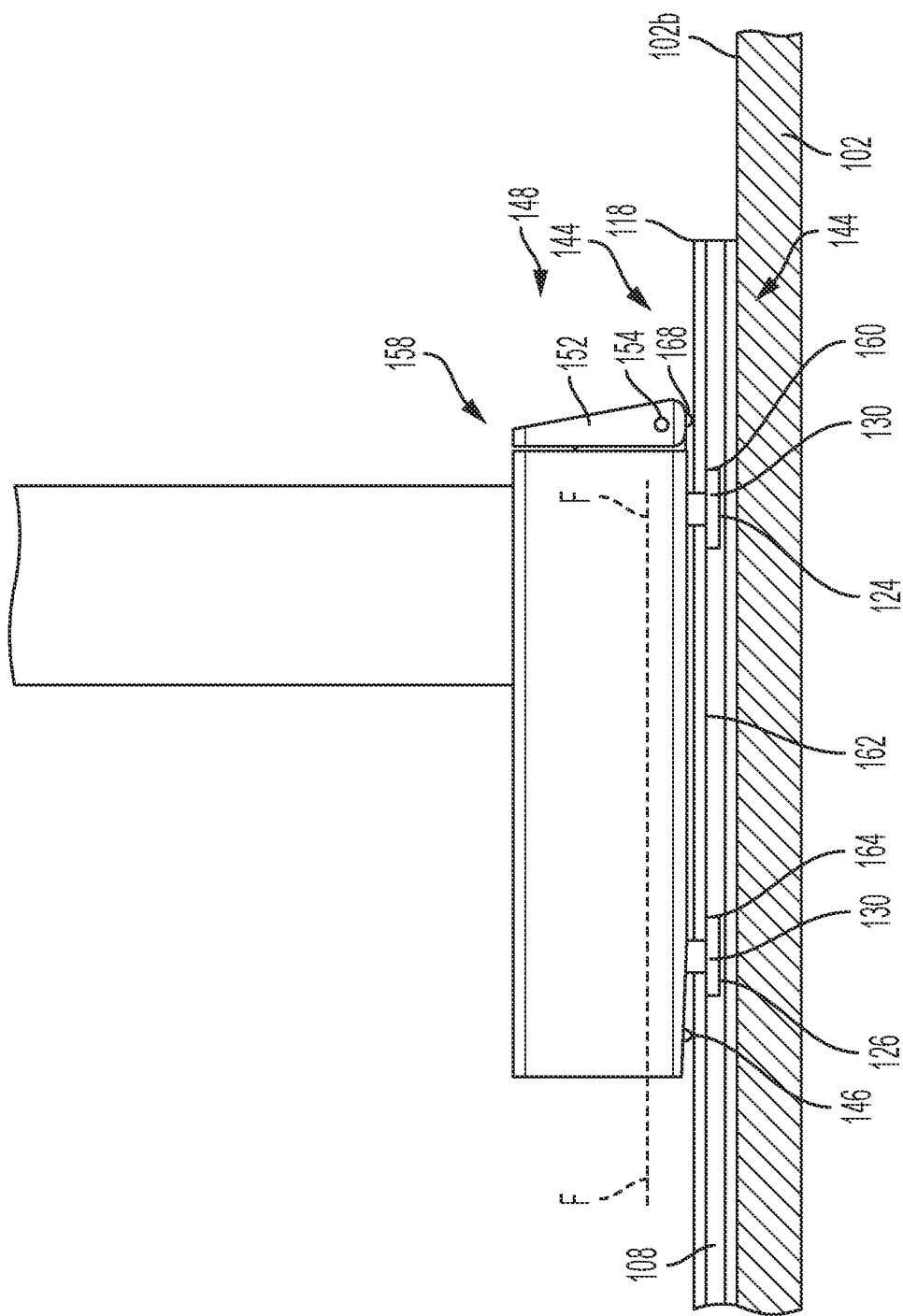
FIG. 8 illustrates a detailed view of the connector assembly in a tightened configuration according to various aspects of the present disclosure.

In view of FIG. 8, in the second position 158, the first gap 160 and the second gap 164 have been closed/eliminated. More specifically, the lever 152 of the lever assembly 148 may further comprise a second protrusion 168 (also referred to as, in some instances, a "cam"). In such an aspect, as the lever 152 is rotated about the pin 154 the second protrusion 168 is configured and sized to interface with at least a portion of the top surface 118 of the slotted rail 108 such that the first gap 160 and the second gap 164 are closed/eliminated. In such an aspect, the top surface of each head 130 is frictionally and/or rigidly engaged with the interfacing surface 162 of the slotted rail 108. Further in such an aspect, the cam is configured and sized to interface with at least a portion of the top surface 118 of the slotted rail 108 such that frictional binding between the first protrusion 146 and the top surface 118 of the slotted rail 108 and/or wedging between the first protrusion 146 and the second male anchor 126 occurs. In such an aspect, movement is prevented/inhibited in all directions rendering the housing 122 rigidly attached to the slotted rail 108 at that position along the slotted rail 108. Notably, in view of FIG. 8, the first protrusion 146 and/or second protrusion 168 are configured and sized such that axis F-F is substantially parallel to the plane defined by the bottom surface 102b of the desktop 102 (e.g. angle "M" is zero). According to various aspects, in view of FIG. 10, the first protrusion 146 and/or second protrusion 168 may be sized to a dimension equal to or slightly greater than the distance "J" less the distance "K".

Figure 9:
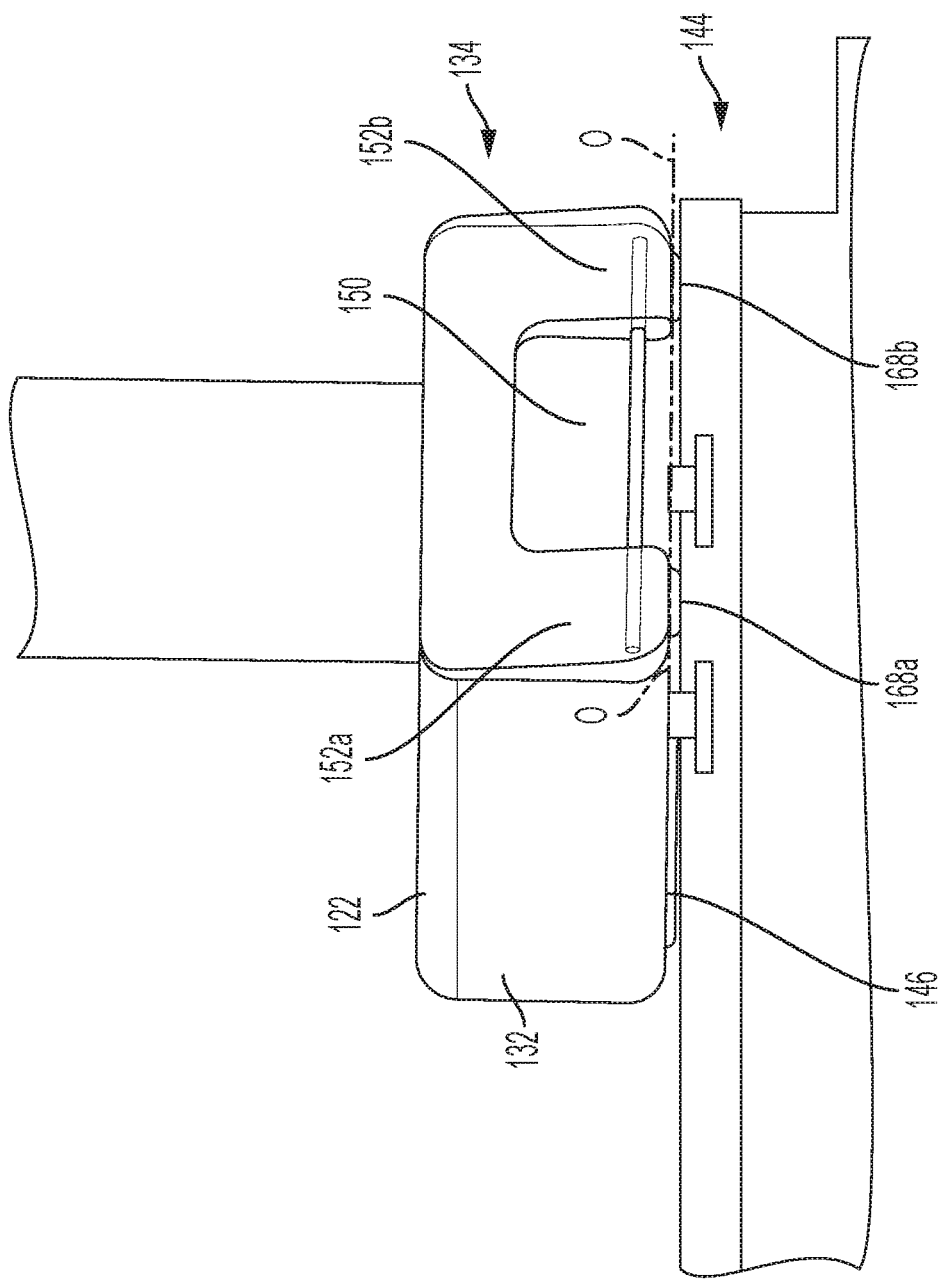
FIG. 9 illustrates an isometric view of the motor housing assembly and the housing attachment assembly in a tightened configuration according to various aspects of the present disclosure.
Figure 11:
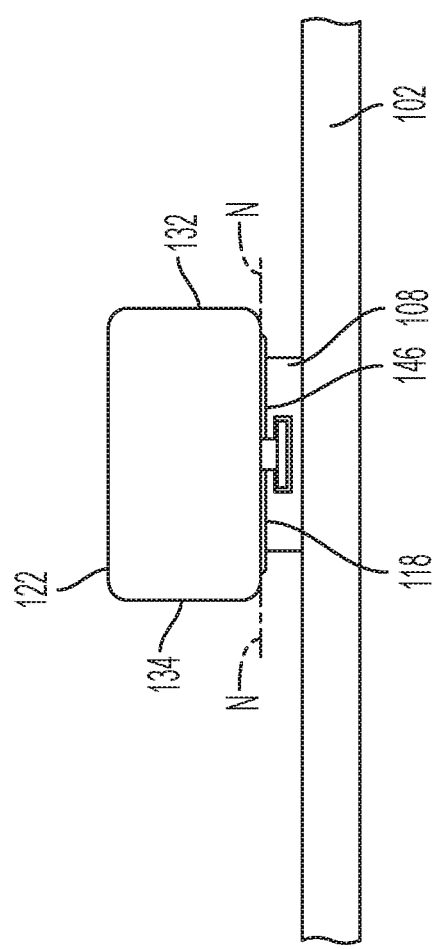
FIG. 11 illustrates a cross-section, through the desktop and the slotted rail, viewing the motor housing assembly and the housing attachment assembly, in a proximally-facing direction, in a tightened configuration, according to various aspects of the present disclosure.

FIGS. 9-11 illustrate various aspects of the disclosed tightened configuration. Initially, FIG. 9 illustrates an isometric view of the housing 122 and the housing attachment assembly 144 in the tightened configuration. Next, FIG. 10 illustrates a cross-section, through the desktop 102 and the slotted rail 108, viewing the housing 122 and the housing attachment assembly 144, in a distally-facing direction, in the tightened configuration. Next, FIG. 11 illustrates a cross-section, through the desktop 102 and the slotted rail 108, viewing the housing 122 and the housing attachment assembly 144, in a proximally-facing direction, in the tightened configuration.

More specifically, in view of FIG. 9 and FIG. 11, according to various aspects of the present disclosure, the first protrusion 146 may extend across the bottom surface 136 of the housing 122 along axis N-N between the first side 132 and the second side 134 of the housing 122. In such aspects, axis N-N may be perpendicular to axis F-F (see FIG. 5). Further, in such aspects, the first protrusion 146 may extend across the bottom surface 136 between the first side 132 and the second side 134 at least a distance equal to or greater than a width of the slotted rail 108 (see FIG. 11). In such an aspect the surface area of the first protrusion 146 interfacing with the top surface 118 of the slotted rail 108 in the second position 158 is maximized. In alternative aspects, the first protrusion 146 may extend across the bottom surface 136 between the first side 132 and the second side 134 a distance less than a width of the slotted rail 108. In such an aspect the surface area of the first protrusion 146 interfacing with the top surface 118 of the slotted rail 108 in the second position 158 is not maximized, but is sufficient to tighten the housing 122 and inhibit movement in all directions. In yet another alternative aspect, the first protrusion 146 may comprise a first fulcrum portion (not shown) and a second fulcrum portion (not shown), extending along axis N-N, wherein no fulcrum portion exists over the slot (i.e. T-slot) of the slotted rail 108 (e.g., lacks a fulcrum portion corresponding to portion "H" in FIG. 10). In various aspects of the present disclosure the first protrusion 146 comprises the same material as the motor housing 122 (e.g. sheet metal, aluminum, etc.). In alternative aspects, the first protrusion 146 comprises a hard rubber or composite material to frictionally engage the top surface 118 of the slotted rail 108 to further inhibit movement of the housing 122 in the tightened configuration and/or to inhibit movement when actuating the lever 152.

Further, in view of FIG. 9 and FIG. 10, according to various aspects of the present disclosure, the second protrusion 168 may comprise a first portion 168a and a second portion 168b separated by the base 150 of the lever assembly 148. Notably the first portion 168a and the second portion 168b may be aligned with each other along axis O-O (see FIG. 9). In such aspects, axis O-O may be perpendicular to axis F-F (see FIG. 5). Further, in such aspects, the first portion 168a may extend across a first lever portion 152a (see FIG. 9) at least a distance to maximize a surface area interfacing with the top surface 118 of the slotted rail 108 in the second position 158 (see FIG. 10). Similarly, in such aspects, the second cam portion 168b may extend across a second lever portion 152b at least a distance to maximize a surface area interfacing with the top surface 118 of the slotted rail 108 in the second position 158 (see FIG. 10). In alternative aspects, the first portion 168a and the second portion 168b may not extend across a full width of the first lever portion 152a and the second lever portion 152b respectively but is nonetheless sufficient to tighten the housing 122 and inhibit movement in all directions. In various aspects of the present disclosure the first portion 168a and the second portion 168b may comprise the same material as the lever 152 (e.g., polymer, composite, etc.). In alternative aspects, the first portion 168a and the second portion 168b may comprise a hard rubber or composite material to frictionally engage the top surface 118 of the slotted rail 108 to further inhibit movement of the housing 122 in the tightened configuration and/or to inhibit movement when actuating the lever 152.

Figure 12:
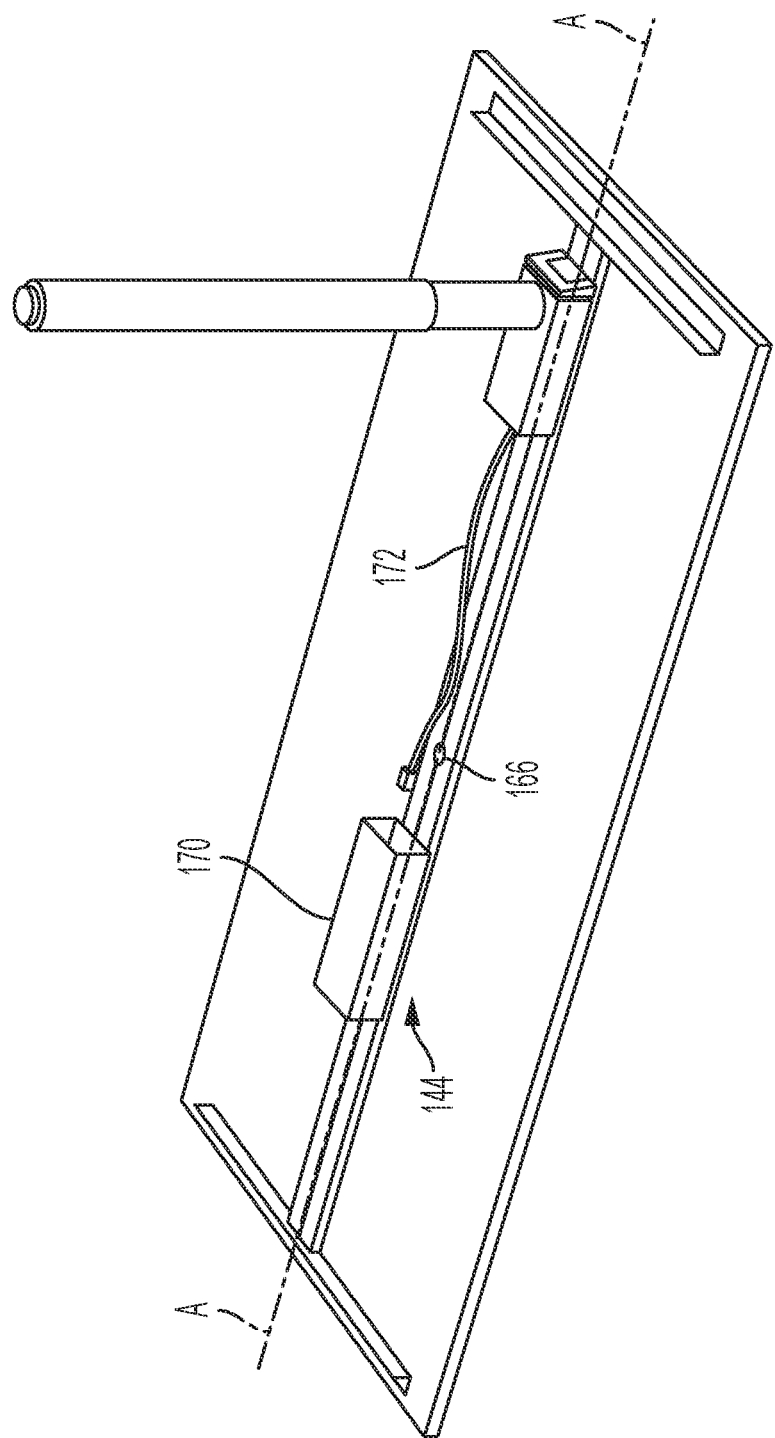
FIG. 12 illustrates the attachment of an additional component to the slotted rail according to various aspects of the present disclosure.

Next, FIG. 12 illustrates the attachment of an additional component 170 to the slotted rail 108. According to various aspects of the present disclosure the additional component 170 (e.g., a control box comprising various electronics/controllers to control the motors 140 of the electronic height-adjustable desk 100, a cord management box/tray, etc.) may comprise a rectangular steel tube or sleeve. More specifically, in such aspects, the additional component 170 may comprise a housing attachment assembly 144 including the first male anchor 124 and the second male anchor 126 coupled to its bottom surface as described herein (e.g., see FIG. 4). Further, according to various aspects of the present disclosure, the additional component 170 may be slideably received within the slot (e.g., T-slot) of the slotted rail 108 (e.g., via aperture 166) as described herein. Notably, according to one aspect, the housing attachment assembly 144 of the additional component 170 may not comprise a first protrusion 146 and/or a lever assembly 148. Namely, in such an aspect, the additional component 170 may remain movable along axis A-A within the slotted rail 108 between at least one first position and at least one second position (e.g., compare FIG. 12 and FIG. 13). Further in such an aspect, gravity and resulting friction between the head 130 of each of the first male anchor 124 and the second male anchor 126 and the interfacing surface 162 of the slotted rail 108 may keep the additional component 170 from undesired movement. According to an alternative aspect, the housing attachment assembly 144 may further comprise a first protrusion 146 and/or a lever assembly 148 that function as described herein.

Figure 13:
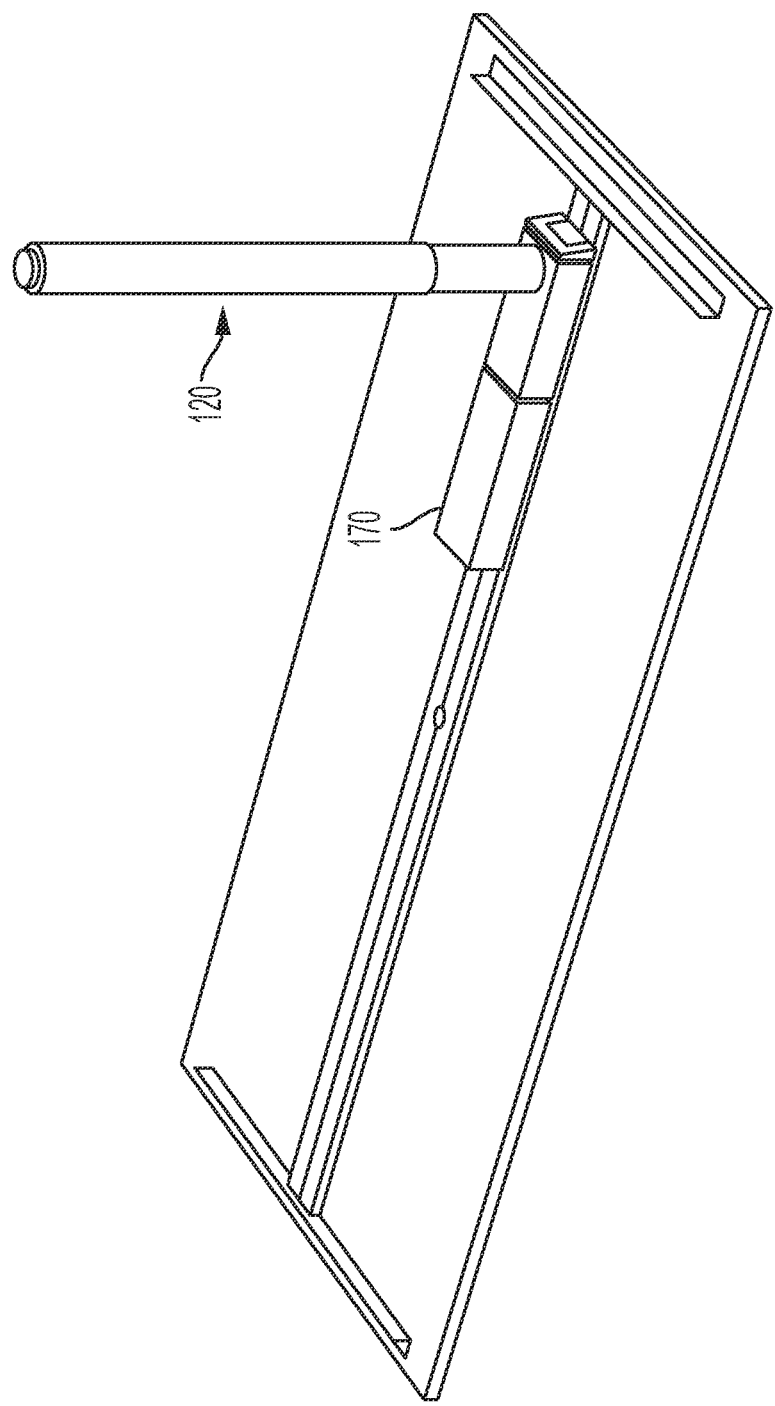
FIG. 13 illustrates the slideability of the additional component along the slotted rail according to various aspects of the present disclosure.

Next, FIG. 13 illustrates the slideability of the additional component 170 along the slotted rail 108. Notably, viewing FIG. 13 in light of FIG. 12, the additional component 170 may also serve the purpose of hiding/maintaining/managing power cords and/or wired interfaces 172 between the connector assembly 120 and the additional component 170 (e.g., control box).

Figure 14:
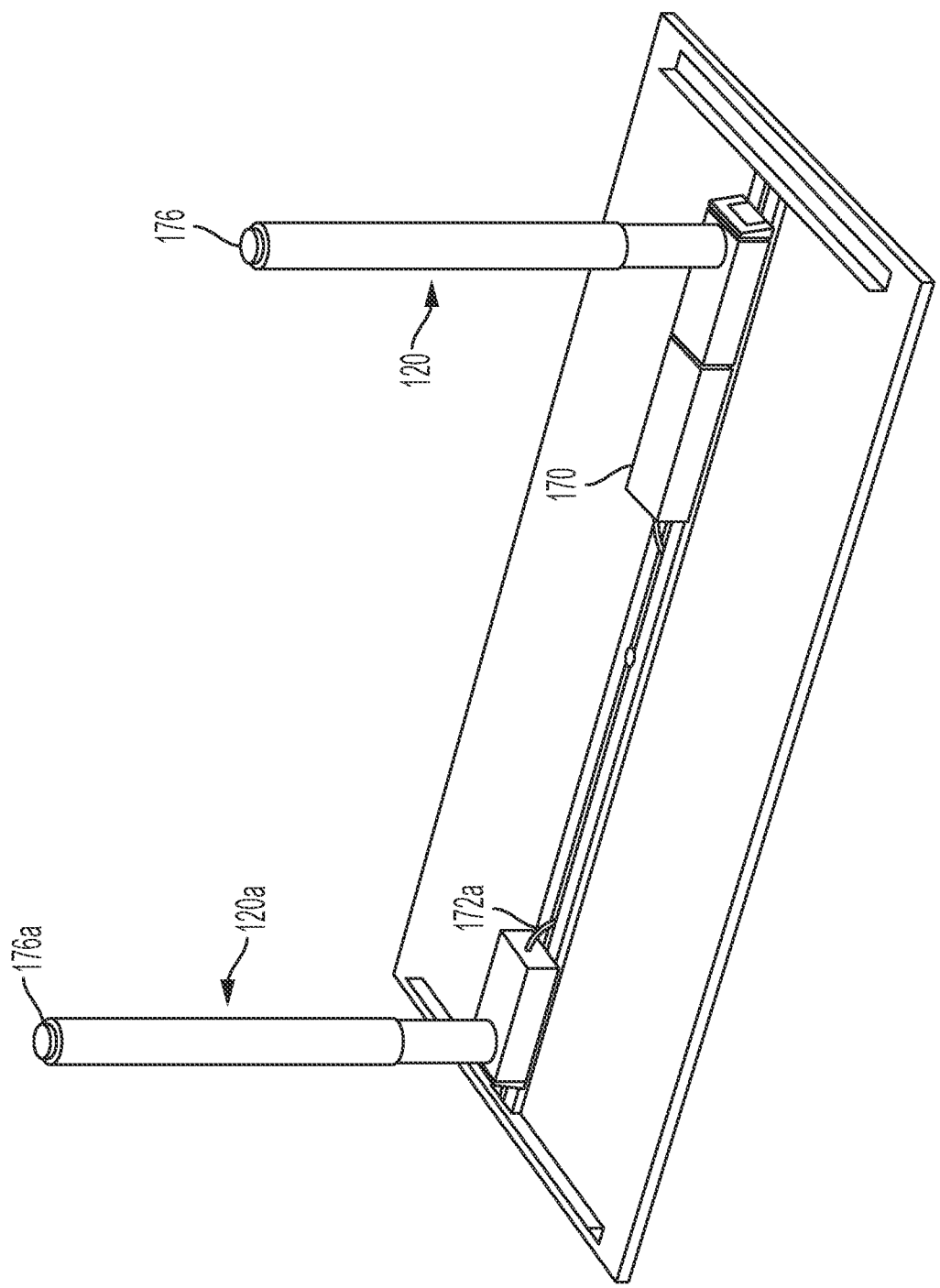
FIG. 14 illustrates a second connector assembly slideably coupled to the slotted rail according to various aspects of the present disclosure.

Next, FIG. 14 illustrates a second connector assembly 120a slideably coupled to the slotted rail 108 according to various aspects of the present disclosure. Notably, the slot (e.g., T-slot) of the slotted rail 108 may also serve the purpose of hiding/maintaining/managing power cords and/or wired interfaces 172a between the second connector assembly 120a and the additional component 170 (e.g., control box).

Figure 15:
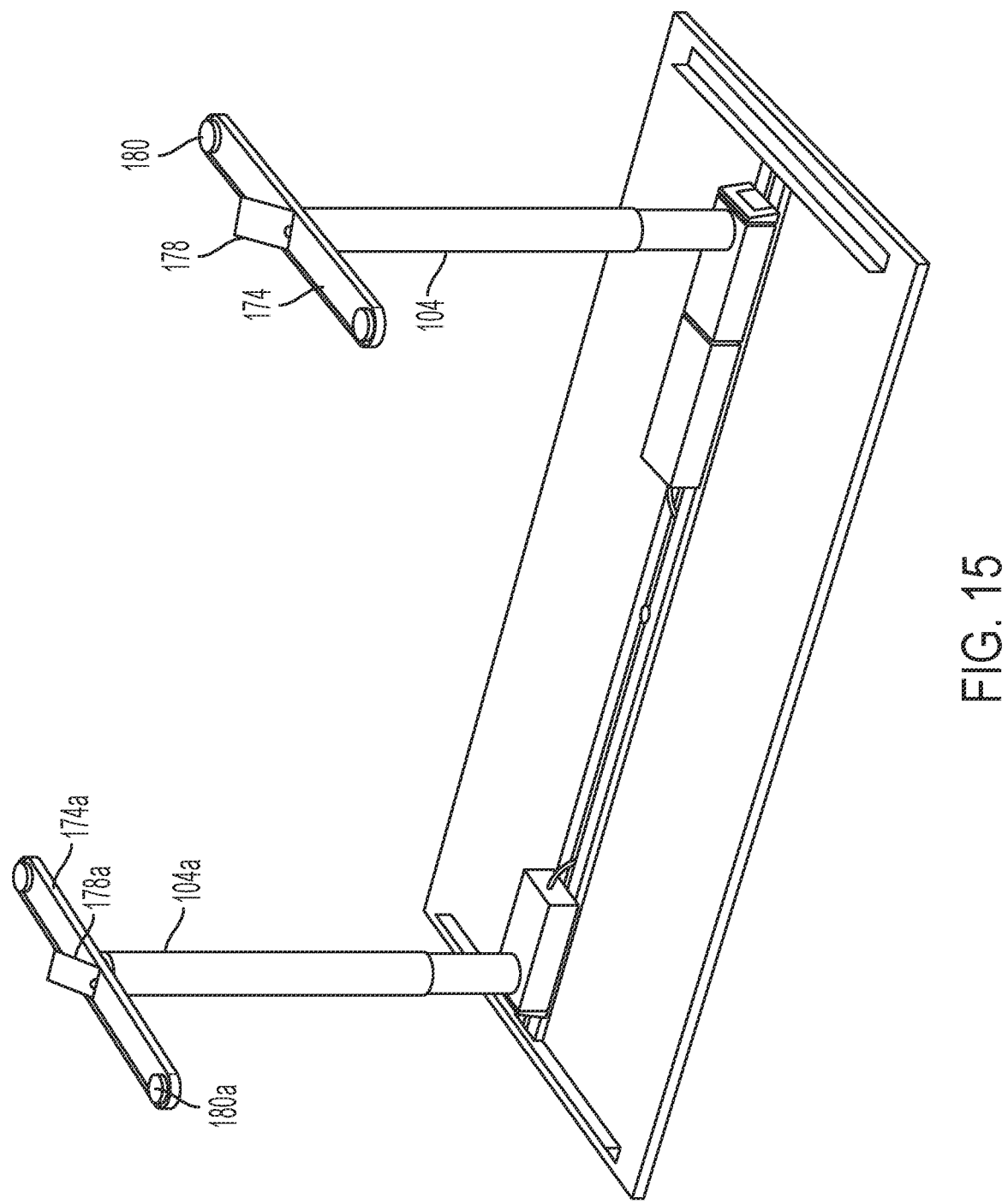
FIG. 15 illustrates the coupling of a first/second foot assembly to a first/second leg assembly according to various aspects of the present disclosure.
Figure 16:
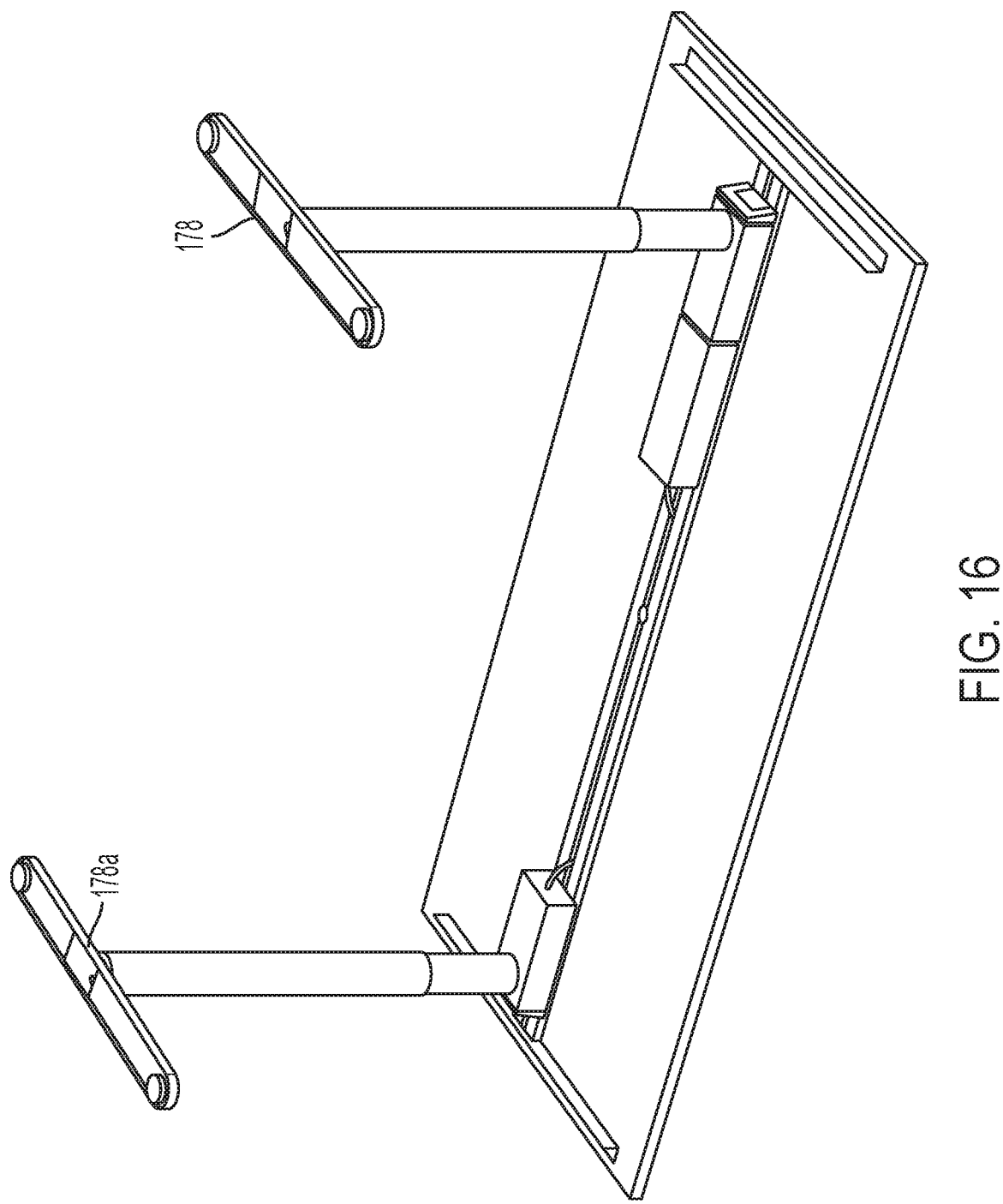
FIG. 16 illustrates a first/second lever connection mechanism in a closed position to couple a first/second foot assembly to a first/second leg assembly according to various aspects of the present disclosure.

Next, FIGS. 15 and 16 illustrate the coupling of a first foot assembly 174 and a second foot assembly 174a to a first leg assembly 104 and a second leg assembly 104a, respectively. Referring back to FIG. 14, for example, the first leg assembly 104 may comprise a first foot connection mechanism 176 and the second leg assembly 104a may comprise a second foot connection mechanism 176a. According to one aspect of the present disclosure, each of the first foot connection mechanism 176 and the second foot connection mechanism 176a may comprise a cylindrical protrusion including a groove surrounding a circumference of the cylindrical protrusion. Accordingly, referring again to FIG. 15, the first foot assembly 174 may comprise a first lever connection mechanism 178 and floor pads 180. In such an aspect, the first lever connection mechanism 178 may be configured to interface (e.g., slide into) the groove of the cylindrical protrusion of the first foot connection mechanism 176 to fixedly attach the first foot assembly 174 to the first leg assembly 104 as the first lever connection mechanism 178 is translated between an open position and a closed position (see FIG. 15 to FIG. 16). Similarly, the second foot assembly 174a may comprise a second lever connection mechanism 178a and floor pads 180a. In such an aspect, the second lever connection mechanism 178a may be configured to interface (e.g., slide into) the groove of the cylindrical protrusion of the second foot connection mechanism 176a to fixedly attach the second foot assembly 174a to the second leg assembly 104a as the second lever connection mechanism 178a is translated between an open position and a closed position (see FIG. 15 to FIG. 16). Furthermore, according to various aspects of the present disclosure, the floor pads 180/180a may be adjustable to level the desk 100 with a floor.

Figure 17:
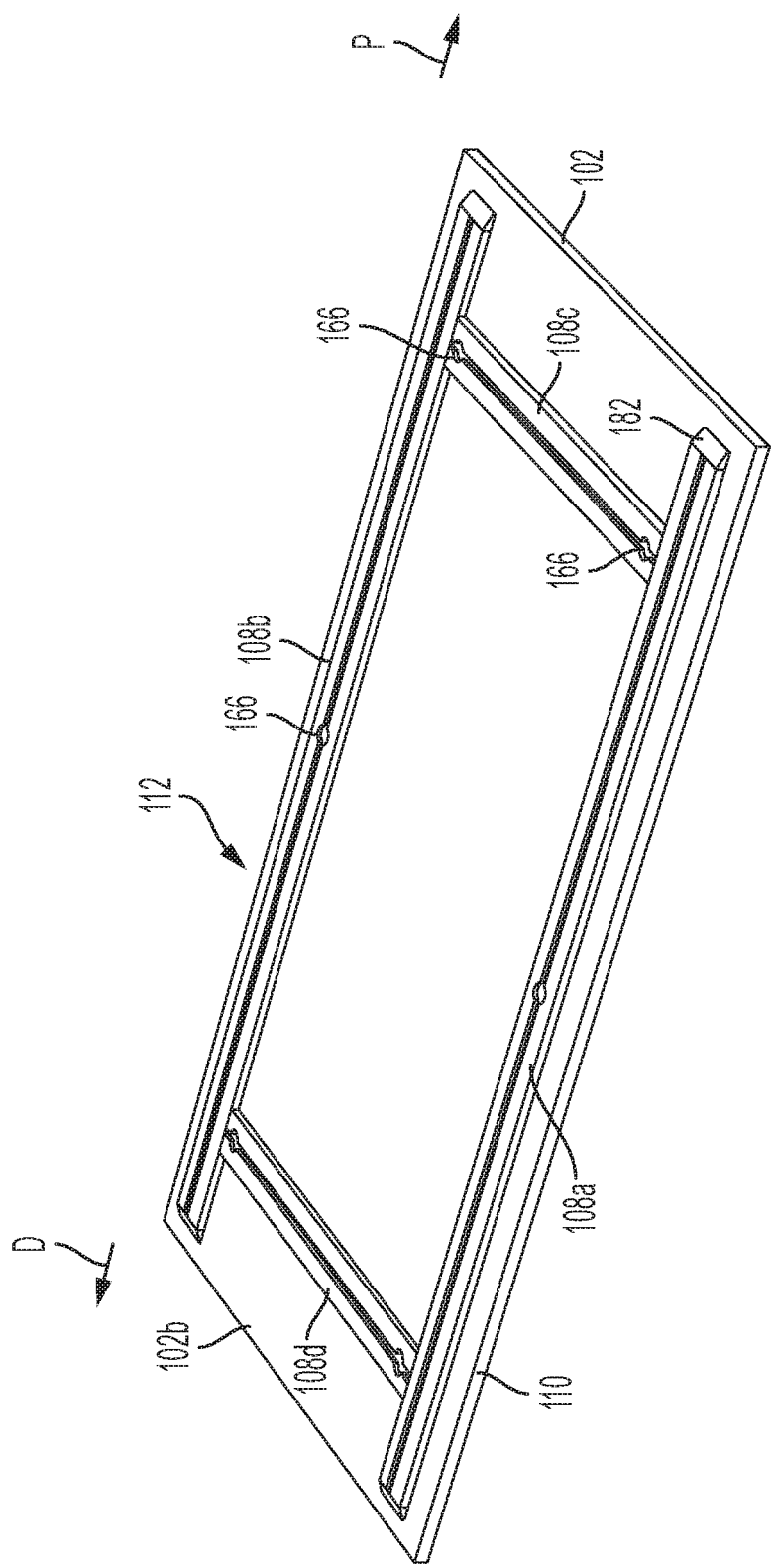
FIG. 17 illustrates a plurality of slotted rails coupled to a desktop according to one alternative aspect of the present disclosure.

Next, FIG. 17 illustrates a plurality of slotted rails coupled to a desktop according to one alternative aspect of the present disclosure. Similar to FIG. 2, a first slotted rail 108a and a second slotted rail 108b may extend lengthwise between a proximal portion and a distal portion of the second or bottom surface 102b of the desktop 102. However, the first slotted rail 108a may run parallel to and in proximity to the left or first side 110 of the desktop 102 and the second slotted rail 108b may run parallel to and in proximity to the right or second side 112 of the desktop 102. Furthermore, a third slotted rail 108c may extend perpendicular to and between the first slotted rail 108a and the second slotted rail 108b on a proximal portion of the second or bottom surface 102b and a fourth slotted rail 108d may extend perpendicular to and between the first slotted rail 108a and the second slotted rail 108b on a distal portion of the second or bottom surface 102b. In view of FIG. 17, such an arrangement of slotted rails around the periphery of the desktop 102 enables a plurality of connector assemblies 120 to be located in a plurality of positions (e.g., middle of third slotted rail 108c and fourth slotted rail 108d, proximal end and distal end of slotted rail 108a and proximal end and distal end of slotted rail 108b, etc.) as well as provide support to the desktop 102 and anticipated desktop loads. In further aspects, the slotted rails 108a/108b/108c/108d may comprise multiple slots extending along the respective slotted rails.

According to various aspects of the present disclosure, the slotted rails 108a/108b/108c/108d may be pre-installed on the desktop 102 by a manufacturer (e.g., attached via screws and/or adhesive, etc.). In such an aspect, the desk 100 may be quickly assembled as disclosed herein without the need to attach the slotted rails 108a/108b/108c/108d to the desktop 102.

According to one aspect, the slotted rails 108a/108b/108c/108d may each comprise an aluminum slotted rail including at least one standard T-slot (see FIG. 10). In other aspects, other materials (e.g., other metals, woods, composites) comprising at least one T-slot may be used. In yet other aspects, a slot configuration/profile different from a T-slot may be used.

According to one alternative aspect, the slotted rails 108a/108b/108c/108d may be inset into the second or bottom surface 102b of the desktop 102. According to one aspect, the top surfaces of the slotted rails 108a/108b/108c/108d may be flush with the second or bottom surface 102b. According to another alternative aspect, a slot (e.g., a T-slot formed via a router) may be integral to or part of the second or bottom surface 102b of the desktop 102 to supplant the use of a slotted rails 108a/108b/108c/108d.

Referring again to FIG. 17, each of the slotted rails 108a/108b/108c/108d may define one or more than one aperture 166 configured/sized to insertably receive the head 130 of each of the first male anchor 124 and the second male anchor 126. In such an aspect the first male anchor 124 may be inserted through the aperture 166 followed by the second male anchor 126 to slideably couple each housing 122 of each connector assembly 120 to each respective slotted rail 108a/108b/108c/108d. Furthermore, according to various aspects of the present disclosure, a proximal end and/or a distal end of a slotted rail (e.g., 108a and/or 108b) may permit the first male anchor 124 and the second male anchor 126 to slide into the slot of the slotted rail (e.g., 108a and/or 108b) and the housing 122 to slide onto the slotted rail (e.g., 108a and/or 108b). In such an aspect, a plug 182 may be inserted into the slot of the slotted rail (e.g., 108a and/or 108*b*) to prevent the inserted housing 122 from sliding out the proximal end and/or distal end of the slotted rail (e.g., 108*a* and/or 108*b*).

Figure 18:
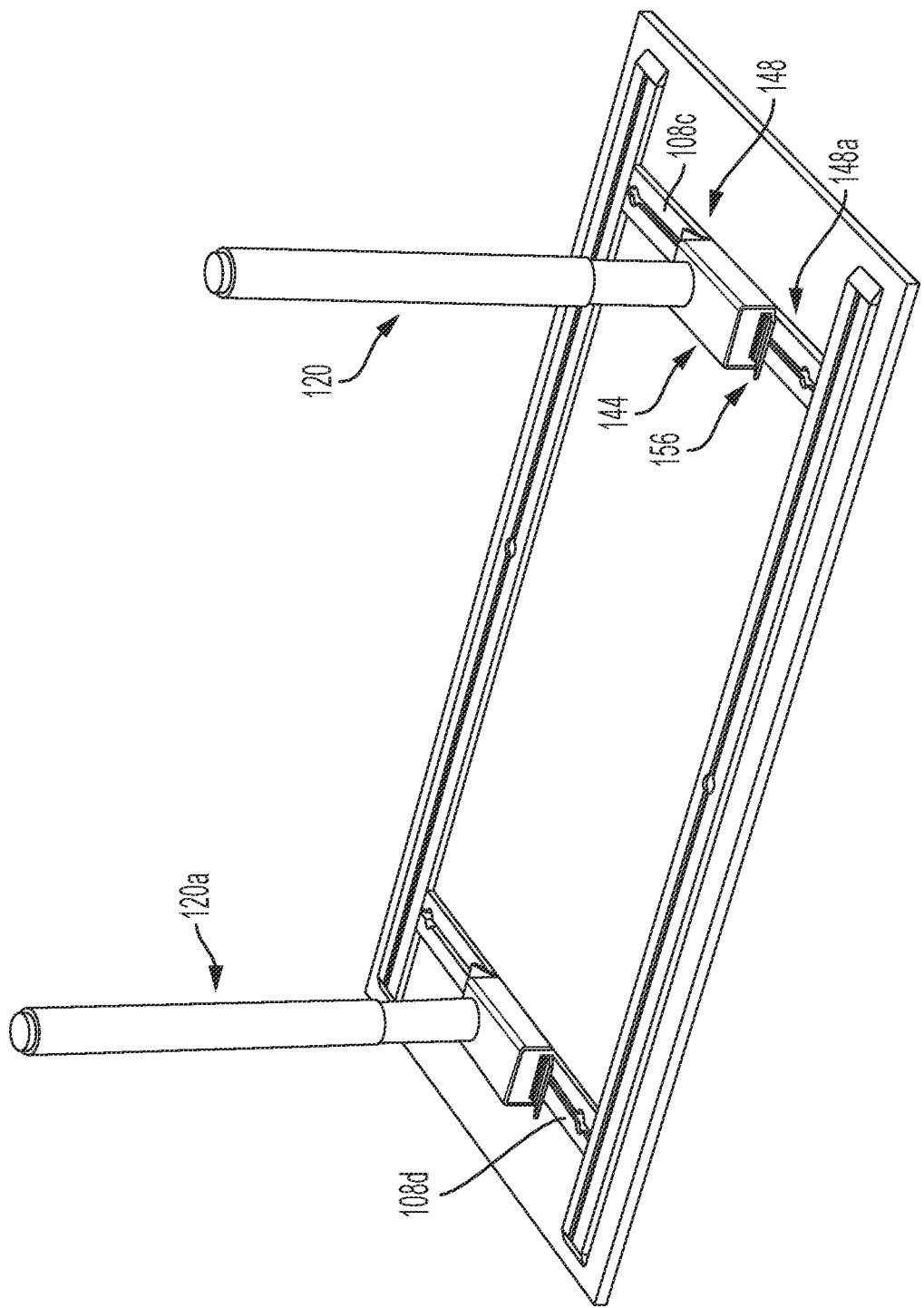
FIG. 18 illustrates a first connector assembly and a second connector assembly slideably coupled to the slotted rails of FIG. 17.
Figure 19:
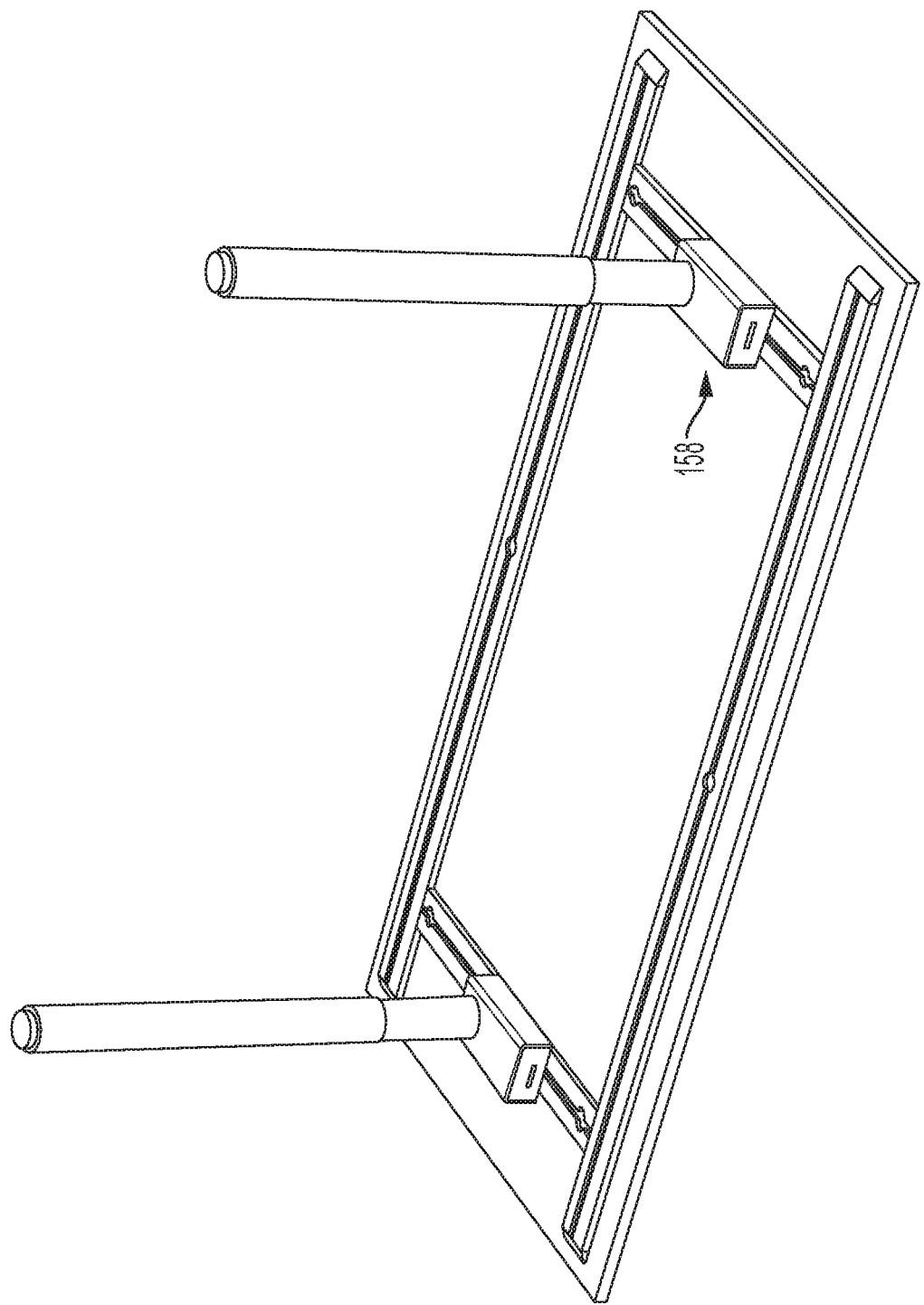
FIG. 19 illustrates a first connector assembly and a second connector assembly fixedly coupled to the slotted rails of FIG. 17.

Next, FIG. 18 illustrates a first connector assembly 120 and a second connector assembly 120*a* slideably coupled to the third slotted rail 108*c* and the fourth slotted rail 108*d*, respectively. Notably, according to one alternative aspect of the present disclosure, and in reference to FIG. 4, the first protrusion 146 may optionally be replaced by and/or interchanged with a second lever assembly 148*a*. The second lever assembly 148*a* will function in a manner similar to lever assembly 148, as described herein, to rigidly lock each connector assembly 120/120*a* to the respective slotted rails 108*c*/108*d*. In such an aspect, FIG. 18 illustrates each respective lever in a first position 156 (see FIG. 4. e.g., where each housing attachment assembly 144 is in a movable configuration). Similarly, FIG. 19 illustrates each respective lever in a second position 158 (see FIG. 8, e.g., where each housing attachment assembly 144 is in a fixed/rigid configuration).

Figure 20:
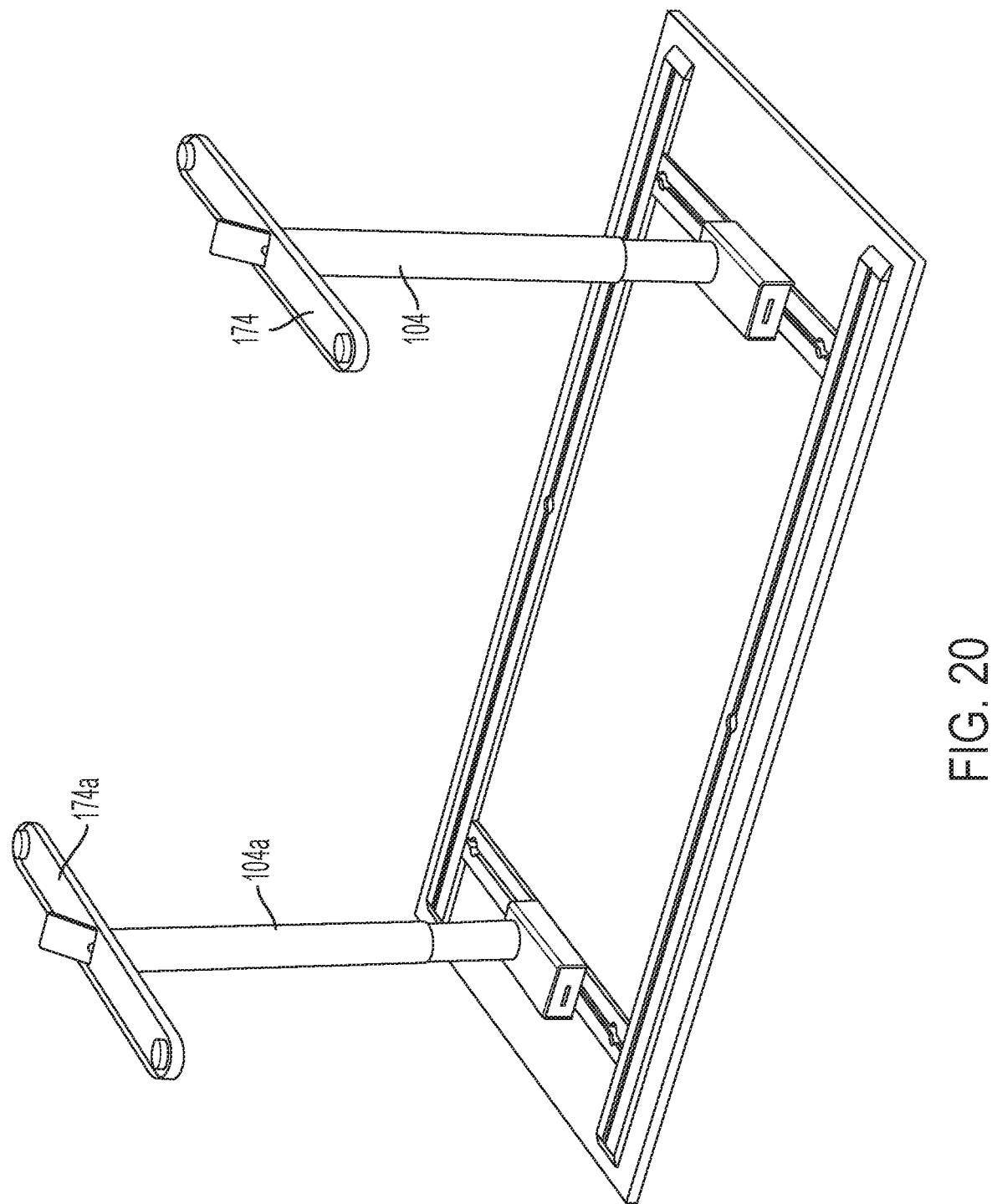
FIG. 20 illustrates the coupling of a first/second foot assembly to a first/second leg assembly according to various aspects of the present disclosure.
Figure 21:
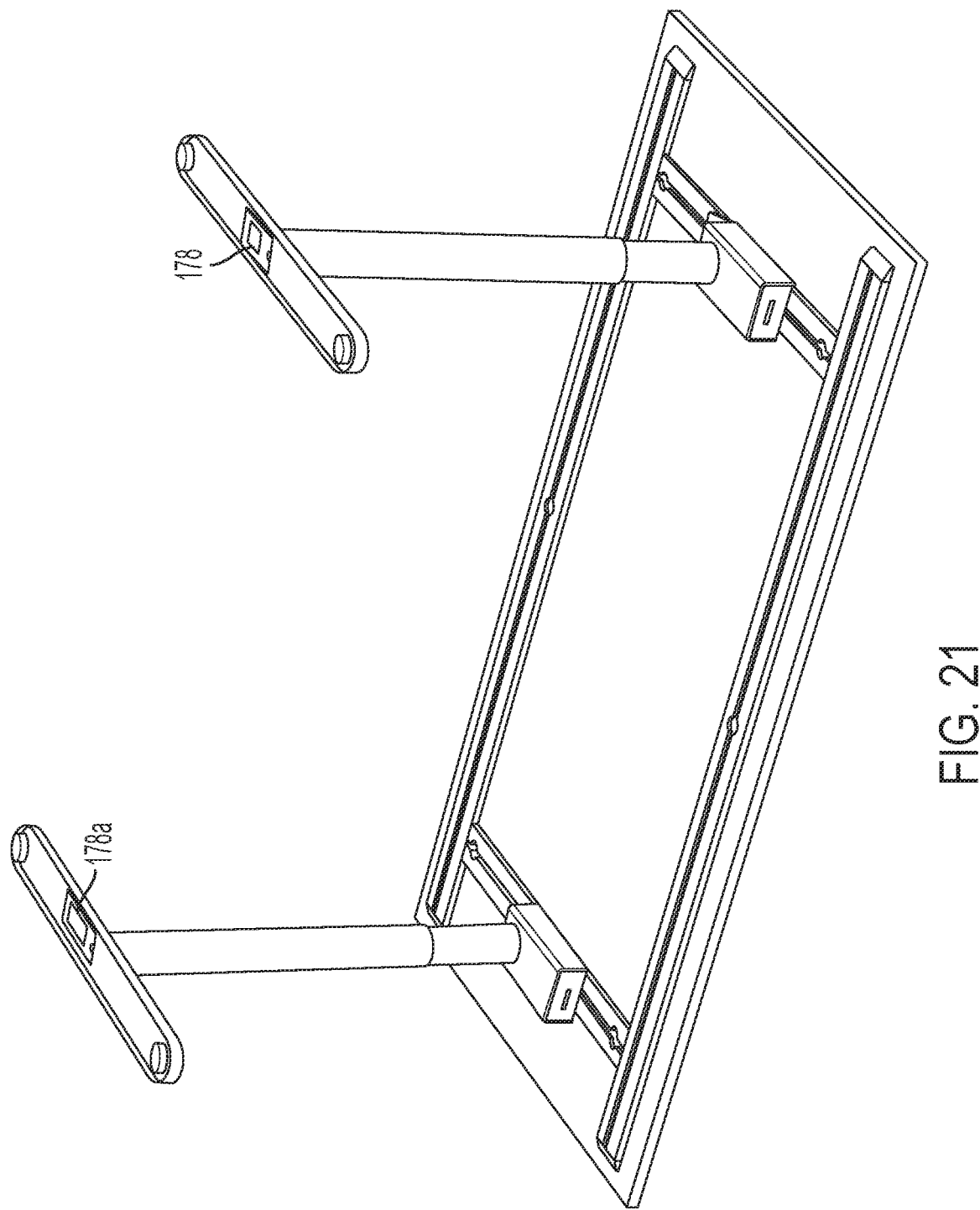
FIG. 21 illustrates a first/second lever connection mechanism in a closed position to couple a first/second foot assembly to a first/second leg assembly according to various aspects of the present disclosure.

Next, referring back to FIGS. 15 and 16 respectively, FIG. 20 similarly illustrates the coupling of a first/second foot assembly 174/174*a* to a first/second leg assembly 104/104*a* and FIG. 21 similarly illustrates a first/second lever connection mechanism 178/178*a* in a closed position to couple the first/second foot assembly to the first/second leg assembly.

Figure 22:
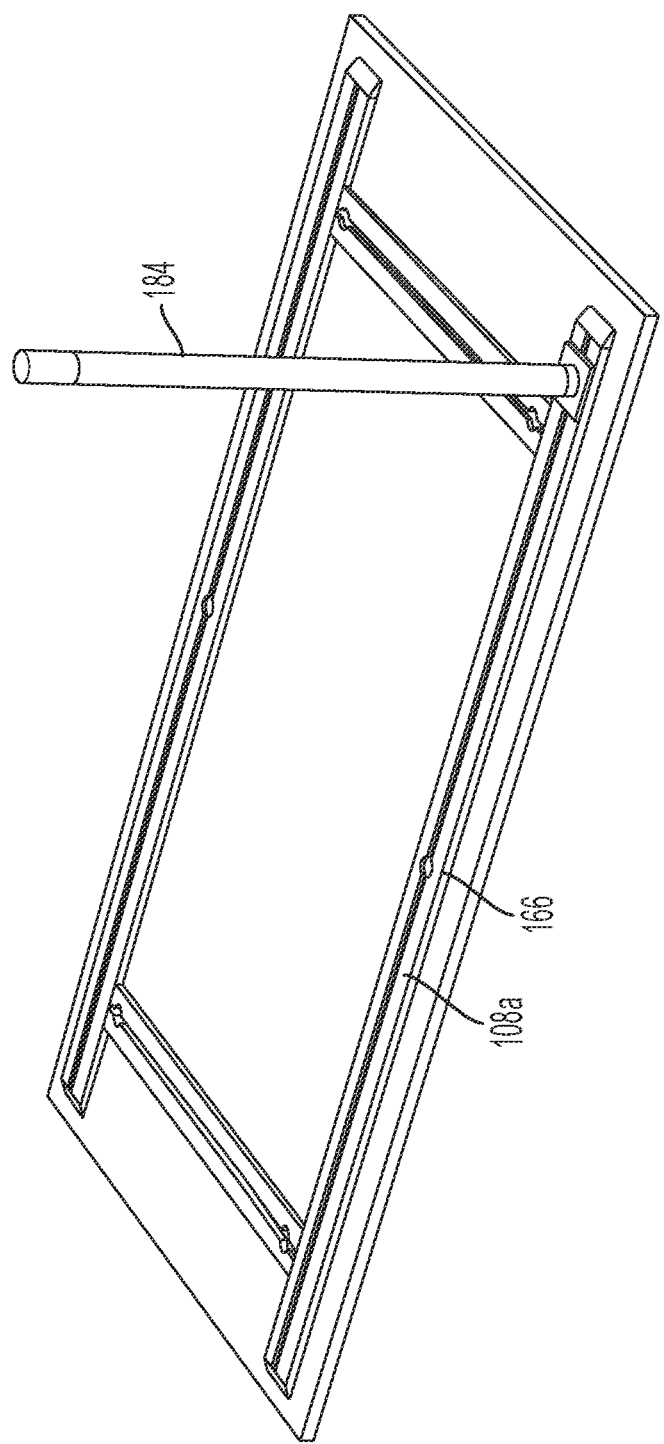
FIG. 22 illustrates an alternative leg attachable to the slotted rails of FIG. 17.
Figure 23:
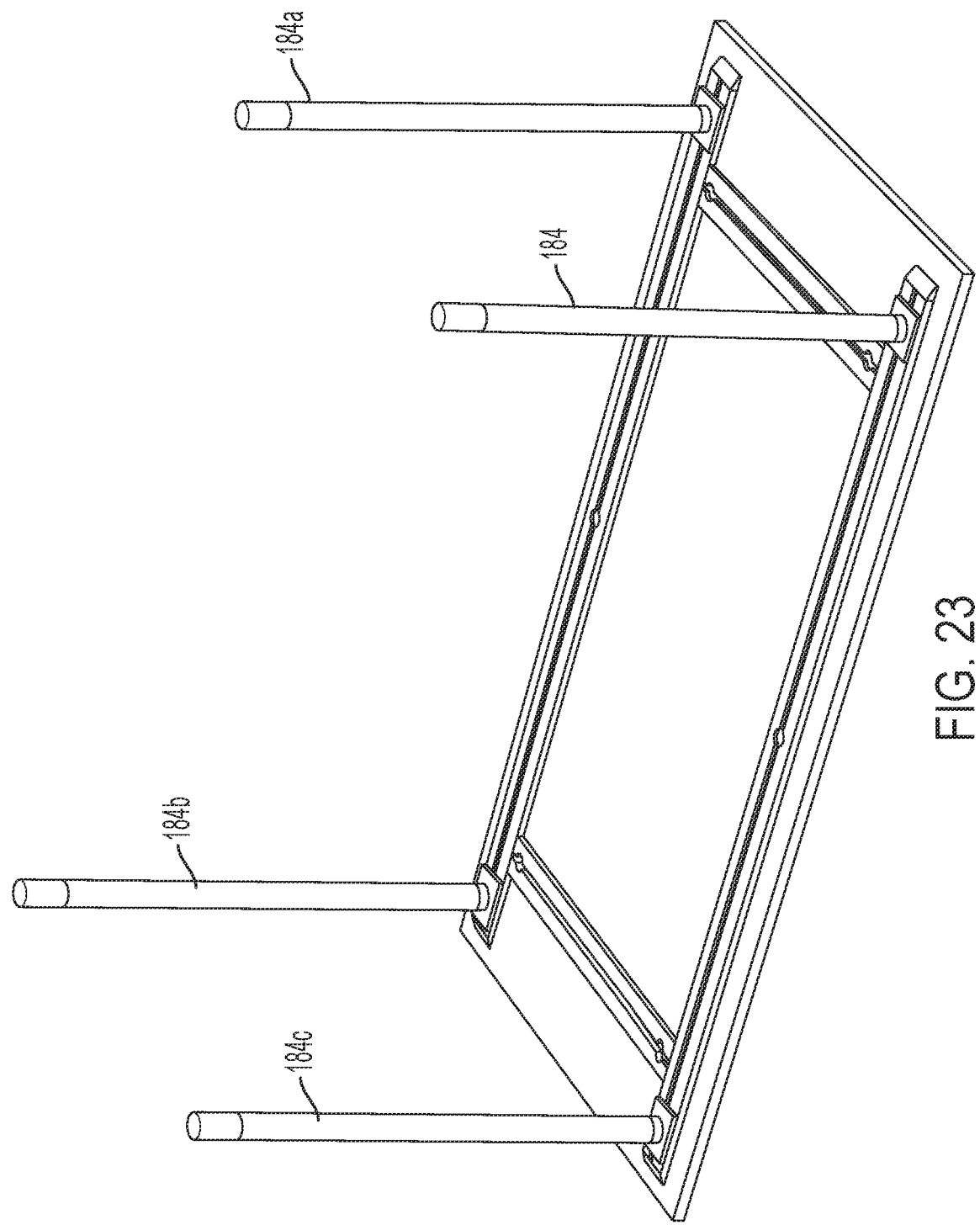
FIG. 23 illustrates a plurality of the alternative leg attached to the slotted rails of FIG. 17.

Next, FIG. 22 illustrates an alternative leg 184 attachable to the slotted rails of FIG. 17. According to one aspect of the present disclosure, an end interfacing with slotted rail 108*a* may comprise a protruding threaded portion and a male anchor (e.g., similar to FIG. 4) that defines an internally threaded aperture. In such an aspect, the male anchor may be inserted into the slot (e.g., via aperture 166 or the proximal/distal end of the slotted rail 108*a*) and rotated to thread the male anchor onto the protruding threaded portion such that the top surface of the head engages the interfacing surface of the slotted rail to fixedly attach the alternative leg 184 to the slotted rail. Notably, the alternative leg may be positioned at any desired positon along the slotted rail 108*a*. Similarly, FIG. 23 illustrates a plurality of the alternative legs 184/184*a*/184*b*/184*c* attached to the slotted rails of FIG. 17 in a manner similar to that as described in FIG. 22.

Figure 24:
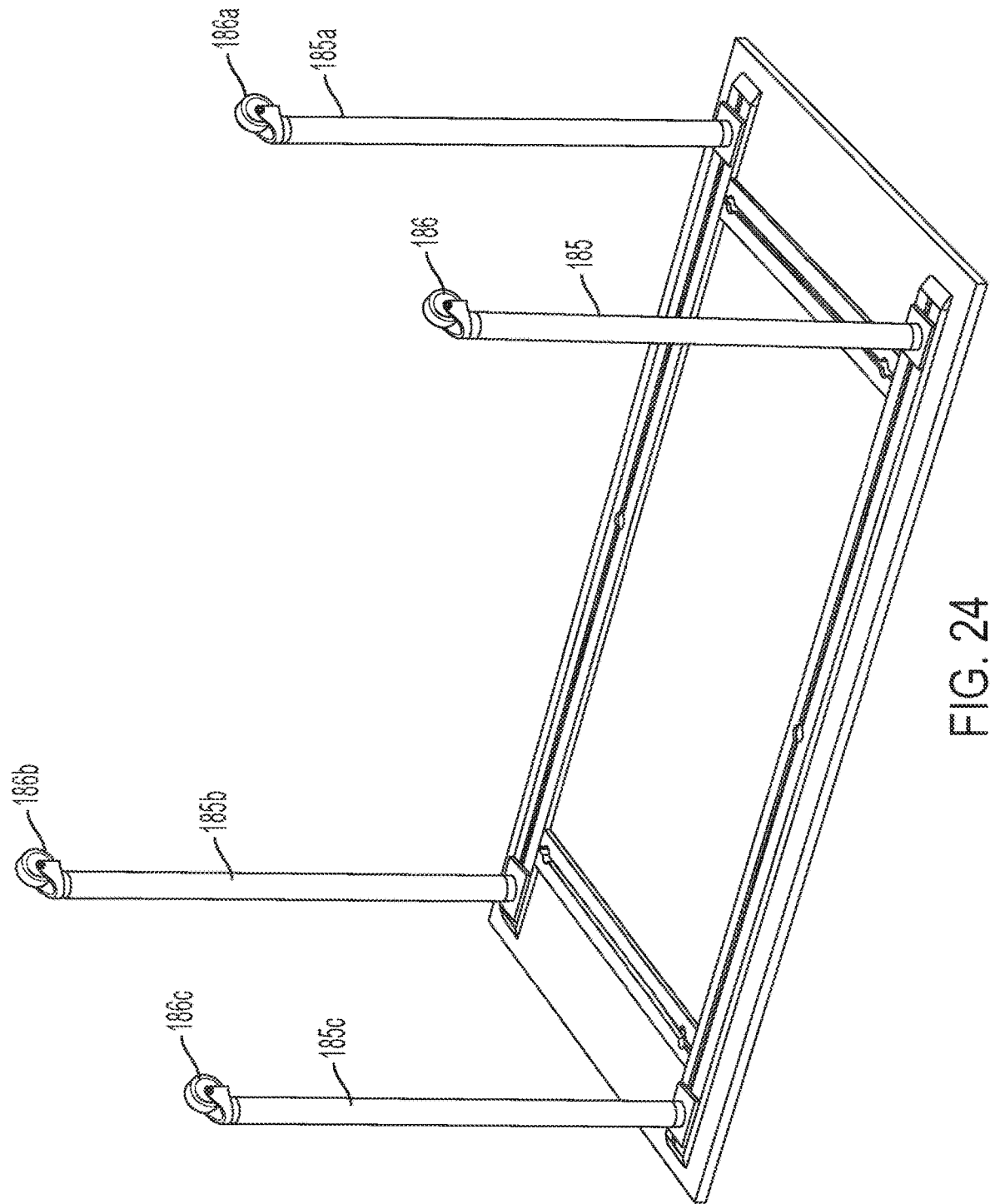
FIG. 24 illustrates a plurality of another alternative leg attached to the slotted rails of FIG. 17.

Next, FIG. 24 illustrates a plurality of another alternative leg 185/185*b*/185*c*/185*c* attached to the slotted rails of FIG. 17 in a manner similar to that as described in FIG. 22. Notably, in view of FIG. 23, each alternative leg 185/185*a*/185*b*/185*c* may comprise a caster 186/186*a*/186*b*/186*c* such that the desk 100 is easily moved.

Next, FIG. 27 illustrates a detailed view of the connector assembly 120 in a loosened configuration according to an alternative aspect of the present disclosure. More specifically, referring to FIG. 27 the second male anchor 126 is coupled to a bottom surface 136 of the housing 122. According to one aspect of the present disclosure, the second male anchor 126 comprises a neck-like spacer 128 and a washer-shaped head 130. In such an aspect, referring again to FIG. 27, the spacer 128 and the head 130 of the second male anchor 126 are coaxially aligned with axis E-E. In such an aspect, axis E-E may be perpendicular to axis F-F (see FIG. 28) which extends lengthwise between a proximal end and a distal end of the housing 122. Axis F-F may be centrally located between a first side 132 and a second side 134 of the housing 122. Notably, axis F-F and axis A-A (see FIG. 2) may be aligned in the same plane. Further in such an aspect, the neck-like spacer 128 and the washer-shaped head 130 of the second male anchor 126 is configured to mimic the shape of the T-slot of the slotted rail 108 (see FIG. 10). More specifically, each spacer 128 is configured and dimensioned to be insertably and slideably received in portion "H" defined by the slotted rail 108 and each head 130 is configured and dimensioned to be insertably and slideably received in portion "I" defined by the slotted rail 108 (see FIG. 10).

Referring again to FIG. 27, the second male anchor 126 is not adjustable. More specifically, a distance "J" defined between a top surface of the head 130 and a bottom surface 136 of the housing 122 cannot be altered (see FIG. 10). In such an aspect distance "J" may be specifically calibrated for a particular/standard slotted rail 108 with tight tolerances. According to one aspect, the spacer 128 and head 130 of the second male anchor 126 may be precision machined as one piece. According to such an aspect, the second male anchor 126 may be fixedly attached to the bottom surface 136 of the housing 122. In one aspect, the second male anchor 126 may be welded to the bottom surface 136 of the housing 122. In another aspect, the second male anchor 126 may further define an aperture along axis E-E. In such an aspect, a sleeved screw (e.g., that bottoms out at the desired distance "J"), may be inserted in the aperture to fixedly attach the second male anchor 126 to the bottom surface 136 of the housing 122. According to yet another aspect of the present disclosure, the second male anchor 126 may be integrated on the bottom surface 136 of the housing 122 via a die casting process. Namely, FIGS. 25 and 26 illustrate an example connector assembly 120 wherein the housing 122 lacks a bottom surface 136. In such an example, a bottom surface/plate 136 comprising the second male anchor integrated thereon, may be die casted for attachment to the housing 122 (e.g., via welding, screws/bolts to existing/available holes e.g., 138). Such a die casted bottom surface/plate 136 would serve at least three purposes (e.g., i) protect the motor 140 and gear assembly 142, ii) make the housing 122 rigid, and iii) provide a way to simply, quickly and rigidly attach a connector assembly 120 to a desk 100). Lastly, according to one alternative aspect of the present disclosure, a housing 122 of a connector assembly 120 (see, e.g., FIGS. 25 and 26) may be fixedly inserted within and/or attached to a rectangular steel tube or sleeve to which second male anchor 126 is attached as described herein.

Referring again to FIG. 27, according to an alternative aspect of the present disclosure, the second male anchor 126 may be adjustable. According to such aspect, adjustability of the second male anchor 126 may account for material variability (e.g., of the second male anchor 126 affecting distance "J," thickness "K" of the slotted rail 108, etc.). According to one aspect, to realize adjustability, the second male anchor 126 may define an aperture along axis E-E. In such an aspect, a screw may be inserted in the aperture to fixedly attach the second male anchor 126 to the bottom surface 136 of the housing 122. Notably, in such an aspect, the spacer 128 may be compressible to selectively adjust the distance "J" to ensure that the housing 122 is rigidly attached to the slotted rail 108.

Turning again to FIG. 27, a detailed view of a connector assembly 120 in a loosened configuration, according to various aspects of the present disclosure, is disclosed. In particular, the housing 122 comprises a housing attachment assembly (shown generally at 144). More specifically, in such aspects the housing attachment assembly 144 comprises a second male anchor 126 (e.g., described above) coupled to a first component surface 136 (e.g., a bottom surface of the housing 122, a surface of a die casted plate, a bottom surface of a rectangular steel tube, etc.), a fulcrum or pivot 146 located on a distal portion of the first component surface 136 and a lever assembly 148 coupled to a proximal end/portion of the first component (e.g., housing 122). Notably, in such an aspect, the first protrusion 146 is positioned proximally with respect to the second male anchor 126. Further, in such an aspect, the lever assembly 148 comprises a base 150, a lever 152, a first pin 154, a second pin 155, and a first male anchor 124, wherein the lever 152 is configured to rotate (e.g., counterclockwise in FIG. 27) about the first pin 154 between a first position 156 (see FIG. 27, e.g., where the housing attachment assembly 144 is in a movable configuration) and a second position 158 (see FIG. 29, e.g., where the housing attachment assembly 144 is in a fixed/rigid configuration).

In view of FIG. 27, in the first position 156, a first gap 160 exists between a top surface of the head 130 of the first male anchor 124 and an interfacing surface 162 of the slotted rail 108 and a second gap 164 exists between a top surface of the head 130 of the second male anchor 126 and the interfacing surface 162 of the slotted rail 108. Notably, in such a movable configuration axis F-F varies from axis L-L by an angle "M." In such an aspect, axis L-L may be parallel to a plane defined by the bottom surface 102b of the desktop 102. Furthermore, angle "M" may comprise an acute angle sufficient to produce a first gap 160 and a second gap 164 that enables the housing 122 to slide longitudinally, between the proximal end and the distal end of the slotted rail 108, within the slot (e.g. T-slot). Furthermore, the angle "M" may comprise an acute angle sufficient to prevent a frictional binding between the first protrusion 146 and the top surface 118 of the slotted rail 108 and/or a wedging between the first protrusion 146 and the second male anchor 126 that would inhibit distal and/or proximal slideability of the housing 122.

Figure 28:
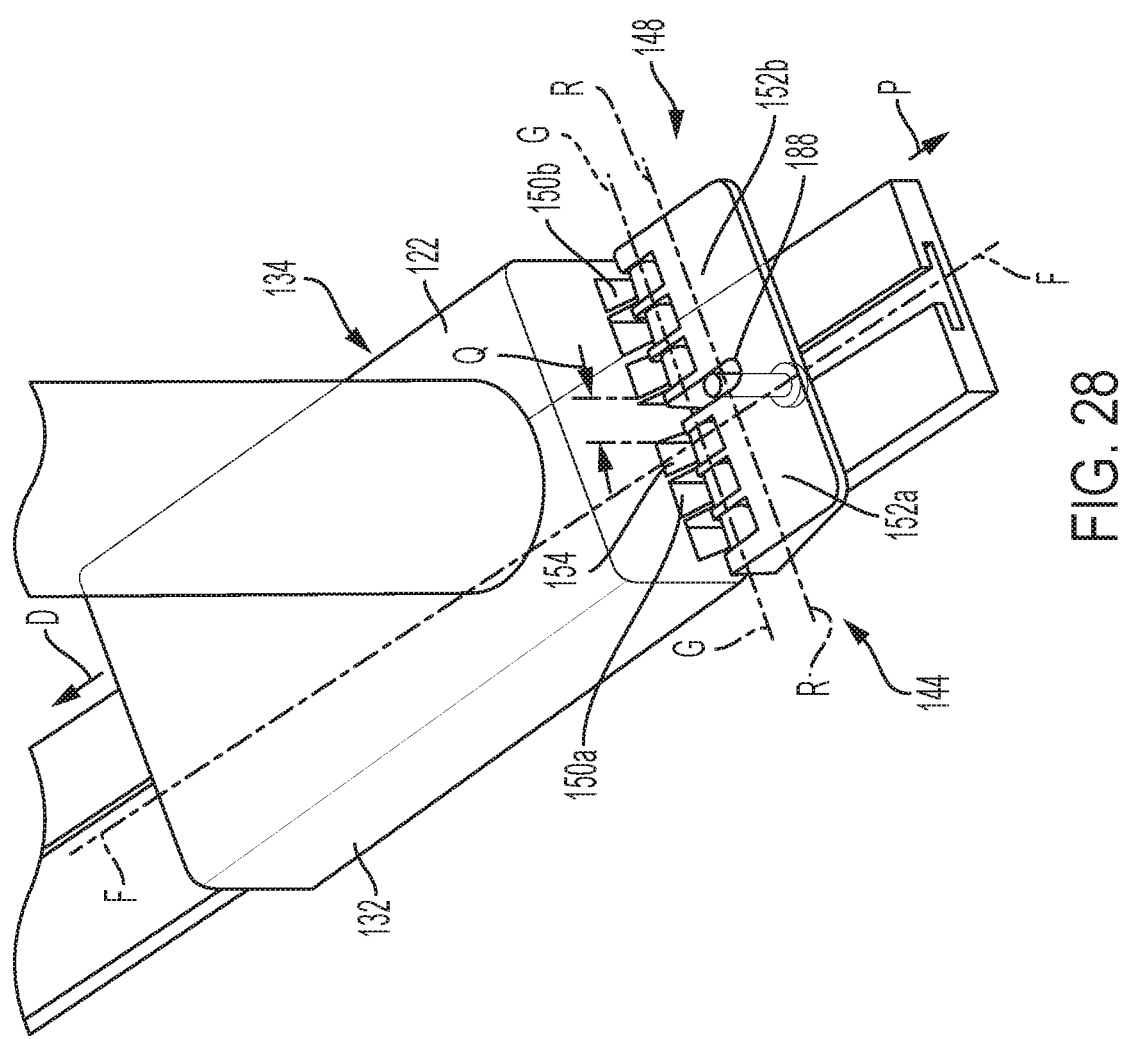
FIG. 28 illustrates an isometric view of the motor housing assembly and the housing attachment assembly according to the alternative aspect of FIG. 27.

FIG. 28 illustrates an isometric view of the housing 122 and the housing attachment assembly 144 according to the alternative aspect of FIG. 27. Notably, in view of FIG. 28, the lever assembly 148 of the housing attachment assembly 144 comprises the first pin 154 that extends along axis G-G through the base 150 and the lever 152 to rotatably couple the lever 152 to the base 150. In such an aspect, the axis G-G may be perpendicular to axis F-F. Notably, in such an aspect, the base 150 may comprise a first base portion 150a separated from a second base portion 150b (see FIG. 28) by a gap "Q" and the lever 152 may comprise a first lever portion 152a and a second lever portion 152b. Here, as previously indicated, the lever assembly 148 in such an aspect may further comprise the second pin 155 that extends along axis R-R through the first lever portion 152a, through the first male anchor 124, and through the second lever portion 152b to rotatably couple the first male anchor 124 to the lever 152. Notably, the lever 152 may define a slot 188. Here, in view of FIG. 28 the slot 188 in the lever 152 and the gap "Q" between the first base portion 150a and the second base portion 150b enable translation of the first male anchor 124 as the lever 152 is rotated between the first position 156 and the second position 158.

Referring back to FIG. 27, the first male anchor 124 is coupled to the lever 152 as described above. In such an aspect, similar to the second male anchor 126, the first male anchor 124 comprises a neck-like spacer 128 and a washer-shaped head 130. Notably, in such an aspect however, the spacer 128 of the first male anchor 124 is longer than the spacer 128 of the second male anchor 126. Referring again to FIG. 27, the spacer 128 and the head 130 of the first male anchor 124 are coaxially aligned with axis D-D. In such an aspect, axis D-D may be substantially perpendicular to axis L-L which is parallel to the plane defined by the bottom surface 102b of the desktop 102. Further in such an aspect, the neck-like spacer 128 and the washer-shaped head 130 of the first male anchor 124 is configured to mimic the shape of the T-slot of the slotted rail 108 (see FIG. 10). More specifically, each spacer 128 is configured and dimensioned to be insertably and slideably received in portion "H" defined by the slotted rail 108 and each head 130 is configured and dimensioned to be insertably and slideably received in portion "I" defined by the slotted rail 108 (see FIG. 10).

Figure 29:
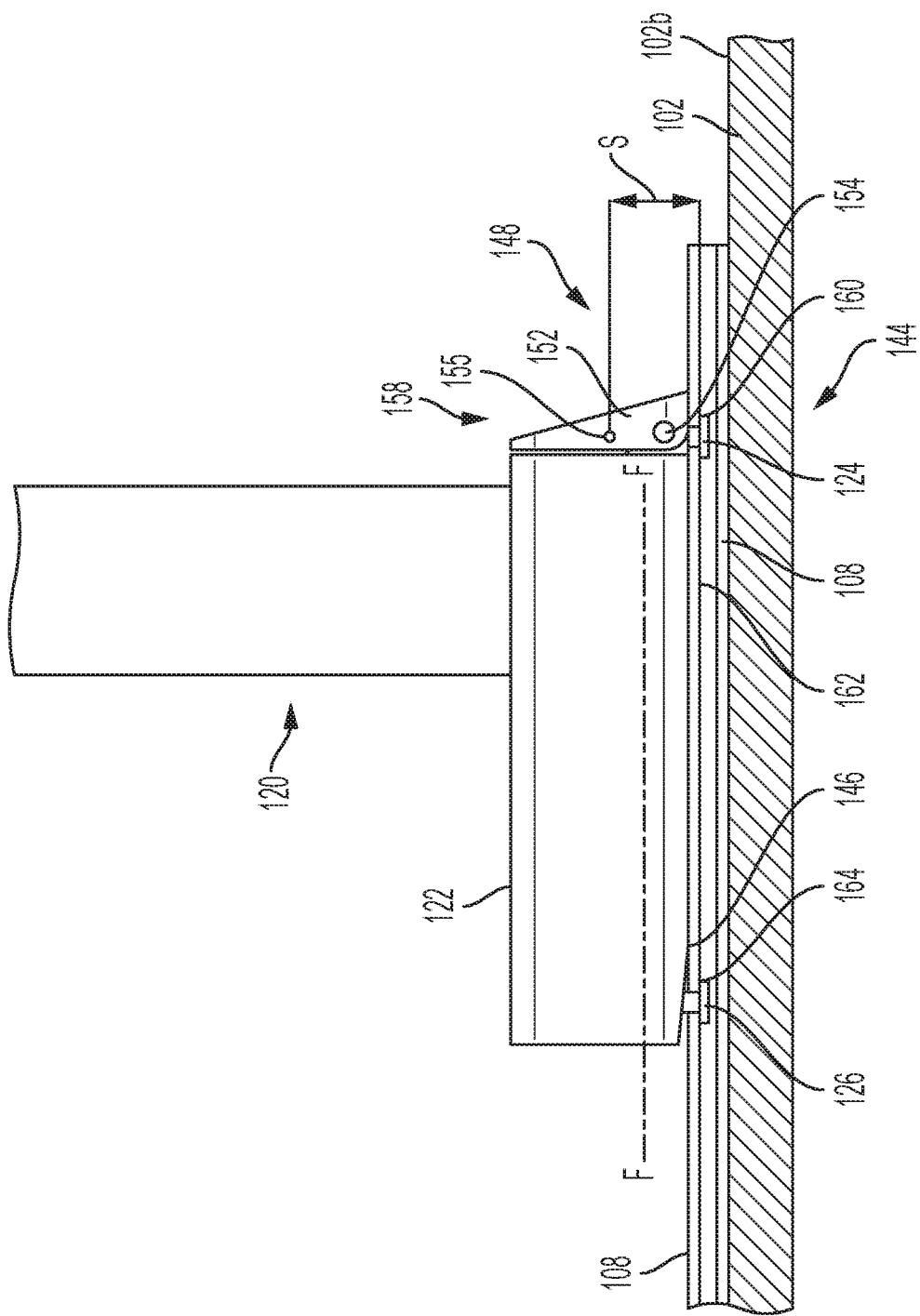
FIG. 29 illustrates a detailed view of the connector assembly in a tightened configuration according to the alternative aspect of FIG. 27.

Next, referring to FIG. 29, the first male anchor 124 is not adjustable. More specifically, distance "S" defined between a top surface of the head 130 and a center of the second pin 155 cannot be altered (see FIG. 10). In such an aspect distance "S" may be specifically calibrated for a particular/standard slotted rail 108 with tight tolerances. According to one aspect, the spacer 128 and head 130 of the first male anchor 124 may be precision machined as one piece.

Notably, referring back to FIG. 2, the top surface 118 of the slotted rail 108 may further define an aperture 166 configured/sized to insertably receive the head 130 of each of the first male anchor 124 and the second male anchor 126. In such an aspect the first male anchor 124 may be inserted through the aperture 166 followed by the second male anchor 126, or vice versa, to slideably couple the housing 122 of the connector assembly 120 to the slotted rail. In another aspect of the present disclosure the first angled bracket 114 and/or the second angled bracket 116 may define a cutout (not shown) at the proximal end and/or distal end of the slotted rail 108 respectively that permits the first male anchor 124 and the second male anchor 126 to slide into the slot of the slotted rail 108 and the motor housing assembly to slide onto the slotted rail 108. In such an aspect, a plug (not shown) may be inserted into the slot of the slotted rail 108 and/or attached to the first angled bracket 114 and/or the second angled bracket 116 to prevent the inserted housing 122 from sliding out the proximal end and/or distal end of the slotted rail 108. Notably, the first male anchor 124 and the second male anchor 126 of the alternative aspect described in FIG. 27 may be easier to insert into such an aperture 166 than the first male anchor 124 and the second male anchor 126 of the aspect described in FIG. 4. In particular, referring to the alternative aspect, since the first male anchor 124 is coupled to the lever 152 (e.g., in lieu of the housing 122) the first male anchor 124 is able to move (i.e., via the first pin 154 and the second pin 155) for easy insertion.

Next, referring again to FIG. 29, a detailed view of the connector assembly 120 in a tightened configuration, according to the alternative aspect of FIG. 27, is illustrated. Namely, in the second position 158, the first gap 160 and the second gap 164 have been closed/eliminated. Here, the first male anchor 124 is configured and sized (e.g., distance "S" described above) to close/eliminate the first gap 160 and the second gap 164 to lock the housing 122 to the slotted rail 108. In particular, as the lever 152 of the lever assembly 148 is rotated (e.g., counterclockwise between FIG. 27 and FIG. 29) about the first pin 154 the first male anchor 124 is translated (e.g., up and toward the housing 122), via the second pin 155, such that the first gap 160 and the second gap 164 are closed/eliminated. More specifically, in view of FIG. 28 and FIG. 30, as the lever 152 of the lever assembly 148 is rotated about the first pin 154, the second pin 155 causes the first male anchor 124 to translate such that the head 130 of the first male anchor 124 engages the interfacing surface 162. After such engagement, further rotation of the lever 152 toward the second position 158 causes the housing 122 to pivot about the first protrusion 146 and cause the head 130 of the second male anchor 126 to engage the interfacing surface of the slotted rail 108. In the second position 158, each of the top surface of the head 130 of the first male anchor 124 and the top surface of the head 130 of the second male anchor 124 are frictionally and/or rigidly engaged with the interfacing surface 162 of the slotted rail 108. In such an aspect, movement is prevented/inhibited in all directions rendering the housing 122 rigidly attached to the slotted rail 108 at that position along the slotted rail 108. Notably, in view of FIG. 29, the first protrusion 146 and/or first male anchor 124 are configured and sized such that axis F-F is substantially parallel to the plane defined by the bottom surface 102b of the desktop 102 (e.g. angle "M" is zero or substantially zero).

Figure 30:
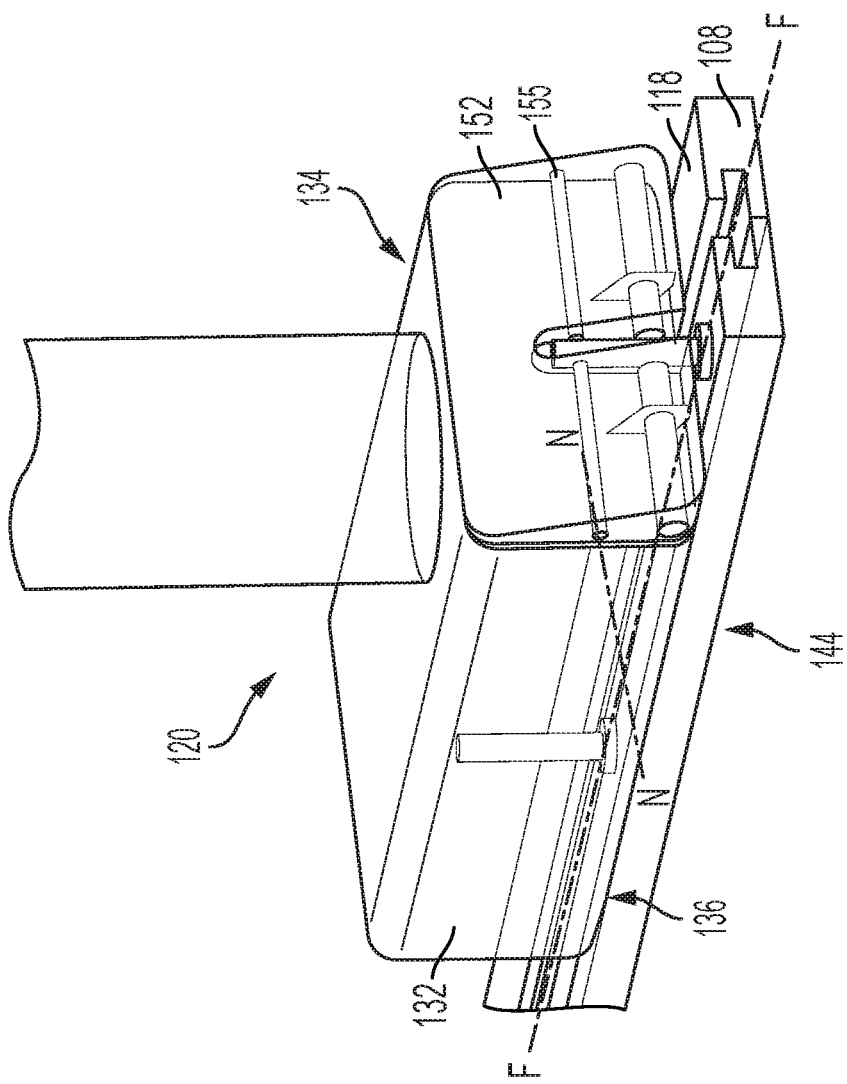
FIG. 30 illustrates an isometric view of the motor housing assembly and the housing attachment assembly in a tightened configuration according to the alternative aspect of FIG. 27.
Figure 31:
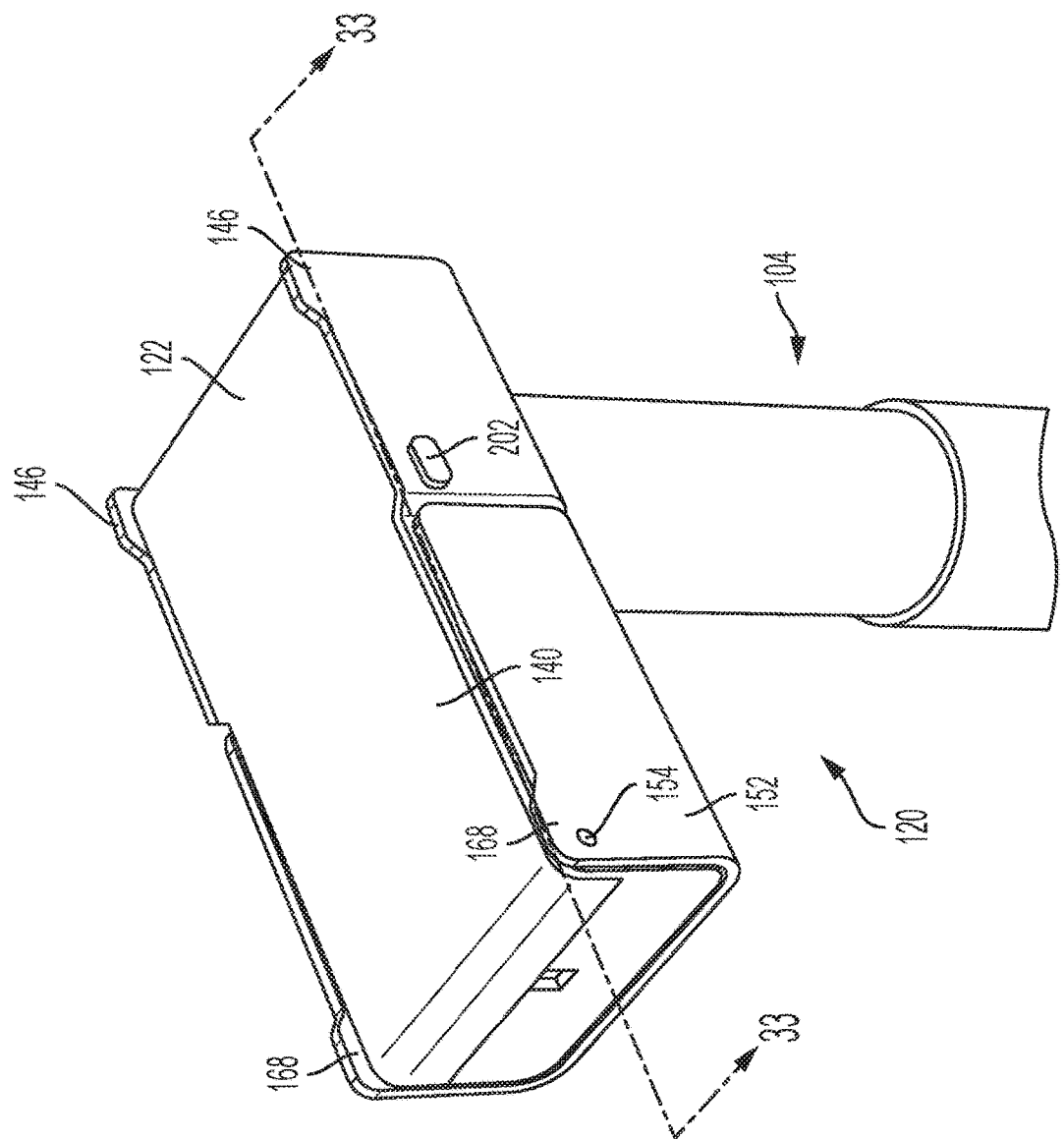
FIG. 31 illustrates a perspective view of a connector assembly according to an alternative aspect of the present disclosure.
Figure 32:
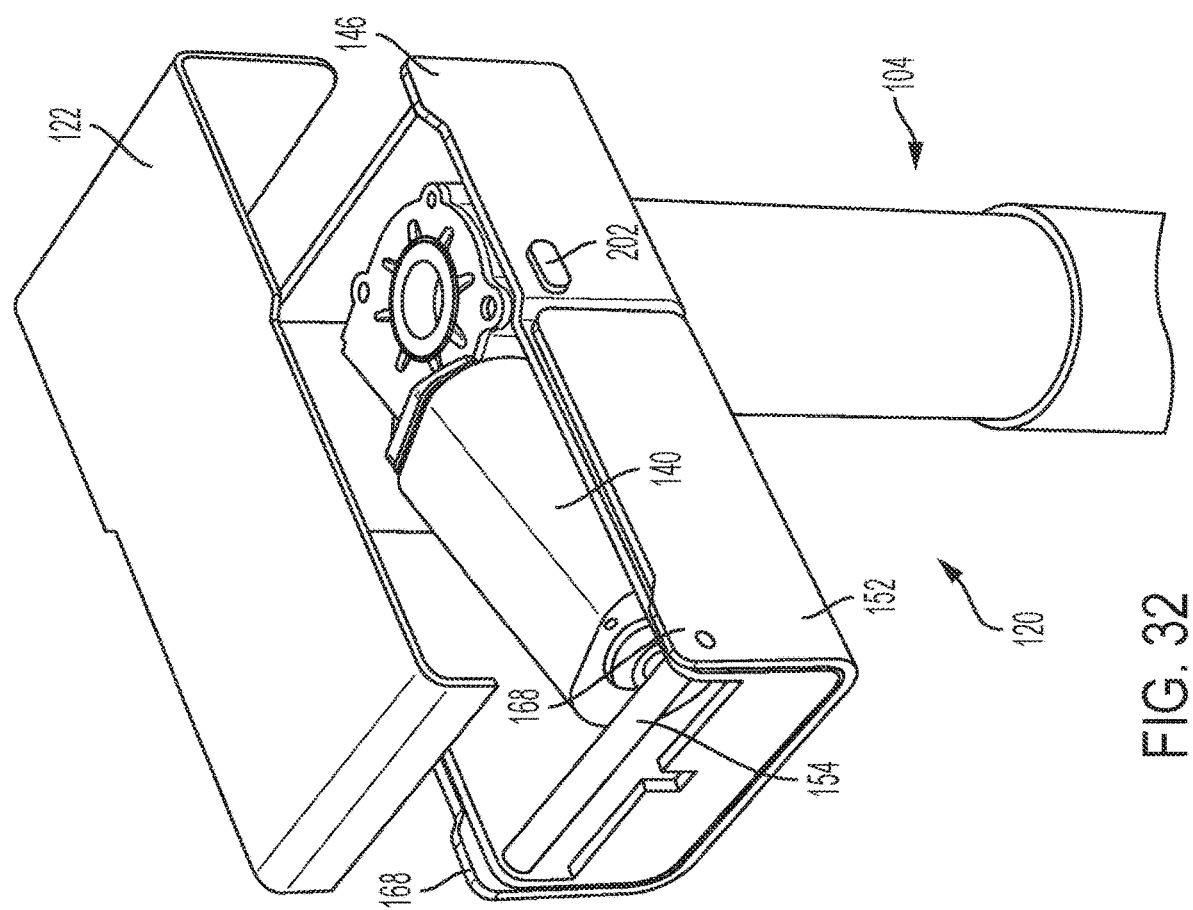
FIG. 32 illustrates an exploded view of the connector assembly according to the alternative aspect of FIG. 31.

FIG. 30 illustrates an isometric view of the connector assembly 120 and the housing attachment assembly 144 in a tightened configuration according to the alternative aspect of FIG. 27. Notably, the first protrusion 146 may extend across the bottom surface 136 of the housing 122 along axis N-N between the first side 132 and the second side 134 of the housing 122. In such aspects, axis N-N may be perpendicular to axis F-F. Further, similar to FIG. 11, the first protrusion 146 may extend across the bottom surface 136 between the first side 132 and the second side 134 at least a distance equal to or greater than a width of the slotted rail 108. In such an aspect the surface area of the first protrusion 146 interfacing with the top surface 118 of the slotted rail 108 in the second position 158 is maximized. In alternative aspects, the first protrusion 146 may extend across the bottom surface 136 between the first side 132 and the second side 134 a distance less than a width of the slotted rail 108. In such an aspect the surface area of the first protrusion 146 interfacing with the top surface 118 of the slotted rail 108 in the second position 158 is not maximized, but is sufficient to tighten the housing 122 and inhibit movement in all directions. In yet another alternative aspect, the first protrusion 146 may comprise a first fulcrum portion (not shown) and a second fulcrum portion (not shown), extending along axis N-N, wherein no fulcrum portion exists over the slot (i.e. T-slot) of the slotted rail 108 (e.g., lacks a fulcrum portion corresponding to portion "H" in FIG. 10). In various aspects of the present disclosure the first protrusion 146 comprises the same material as the motor housing (e.g. sheet metal, aluminum, etc.). In alternative aspects, the first protrusion 146 comprises a hard rubber or composite material to frictionally engage the top surface 118 of the slotted rail 108 to further inhibit movement of the housing 122 in the tightened configuration and/or to inhibit movement when actuating the lever 152.

Another alternative aspect of the present disclosure is illustrated in FIGS. 31-39. This aspect is similar to the aspects described above in that it includes a connector assembly 120 that is configured to reversibly engage with a rail 108 without the use of any tools. In various aspects, the connector assembly 120 illustrated in FIGS. 31-39 can likewise include a housing 122 that can house a motor 140, a leg assembly 104 that is connectable to the housing 122, and a lever assembly 148. Further, as with the aspects illustrated in FIGS. 1-11, the second protrusion(s) 168 can be positioned on the lever 152 such that pivoting the lever 152 from its first position (which corresponds to the loosened configuration of the connector assembly 120) to its second position (which corresponds to the tightened configuration of the connector assembly 120) causes the second protrusion(s) 168 to rotate from a first orientation, illustrated in FIG. 33A, to a second orientation, illustrated in FIG. 33B. When in the second orientation, the second protrusion 168 can extend outwardly from the body (e.g., the housing 122) of the connector assembly 120 a distance that is substantially equal to the distance by which the first protrusion 168 extends from the body of the connector assembly 120. In one aspect, the heights of the first and second protrusions 146, 168 can be substantially equal. However, this aspect differs from the aspects illustrated in FIGS. 1-30 in that the connector assembly 120 includes tabs 202 positioned on the lateral sides thereof, as opposed to anchors 124, 126 positioned on a bottom surface of the housing 122 (FIGS. 1-11) or positioned on a combination of the bottom surface of the housing 122 and the lever 152 (FIGS. 27-30). In one aspect, the tabs 202 are oriented orthogonally relative to the first and second protrusions 146, 168. As with the anchors 124, 126 described above, the tabs 202 can also be referred to as "third protrusions." By positioning the tabs 202 laterally along the connector assembly 120, the connector assembly 120 can sit such that it is at least partially enclosed within the rail 108 and thus provide for a more compact overall structure. In the illustrated aspect, the tabs 202 are positioned between the first protrusion 146 and the second protrusion 168 with respect to the longitudinal axis of the connector assembly 120. Further, the tabs 202 can be positioned such that they are nonplanar with a plane defined by the first protrusion 146 and the second protrusion 168 when the lever 152 is in the second or tightened position. In other words, the tabs 202 can be positioned such that they are offset from the first and second protrusions 146, 168.

It should also be noted that although the depicted aspect includes two tabs 202, each of which is positioned on opposing lateral surfaces of the connector assembly 120, this is merely for illustrative purposes. Aspects including any number, orientation, or arrangement of tabs 202 that otherwise conform to the requirements described herein are considered to be within the scope of the present disclosure. Further, although the depicted aspect includes a set of two of each of the first and second protrusions 146, 168, this is likewise merely for illustrative purposes. In alternative aspects, the connector assembly 120 can include a single first and/or second protrusion 146, 168 (see, e.g., FIG. 11). Aspects including any number, orientation, or arrangement of first and second protrusions 146, 168 that otherwise conform to the requirements described herein are considered to be within the scope of the present disclosure.

Figure 35:
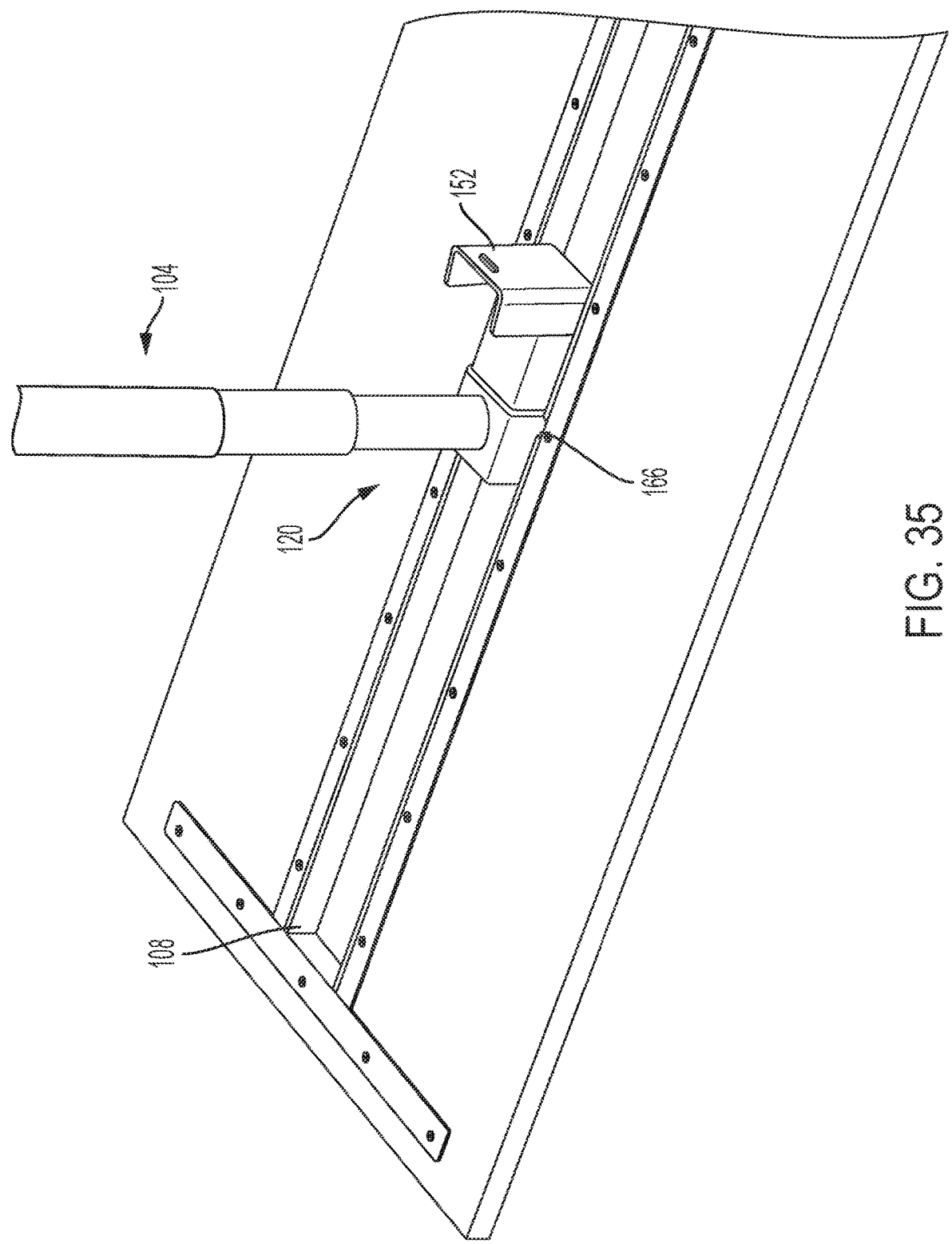
FIG. 35 illustrates a perspective view of the connector assembly initially inserted into the rail, according to the alternative aspect of FIG. 31.

The rail 108 further includes a cutout 166 corresponding to each of the tabs 202 of the connector assembly 120. The cutouts 166 are configured, sized, or dimensioned to receive the tabs 202 therethrough. The position(s) at which the cutouts 166 are located can be referred to as the "insertion position(s)" along the rail 108. Similarly to the aspects described above, the connector assembly 120 can be inserted into the rail 108 when the tabs 202 are aligned with the cutouts 166, as depicted in FIG. 35. Correspondingly, the rail 108 is further configured or dimensioned to retain the connector assembly 120 within or by the rail 108 when the tabs 202 are not aligned with the cutouts 166 because the lips 212 (FIG. 38) of the rail 108 serve as physical obstructions for the tabs 202, which prevents any non-longitudinal movement of the connector assembly 120 within the rail 108. The position(s) at which the connector assembly 120 is retained by the rail 108 can be referred to as the "retention position(s)" along the rail 108.

Figure 33A:
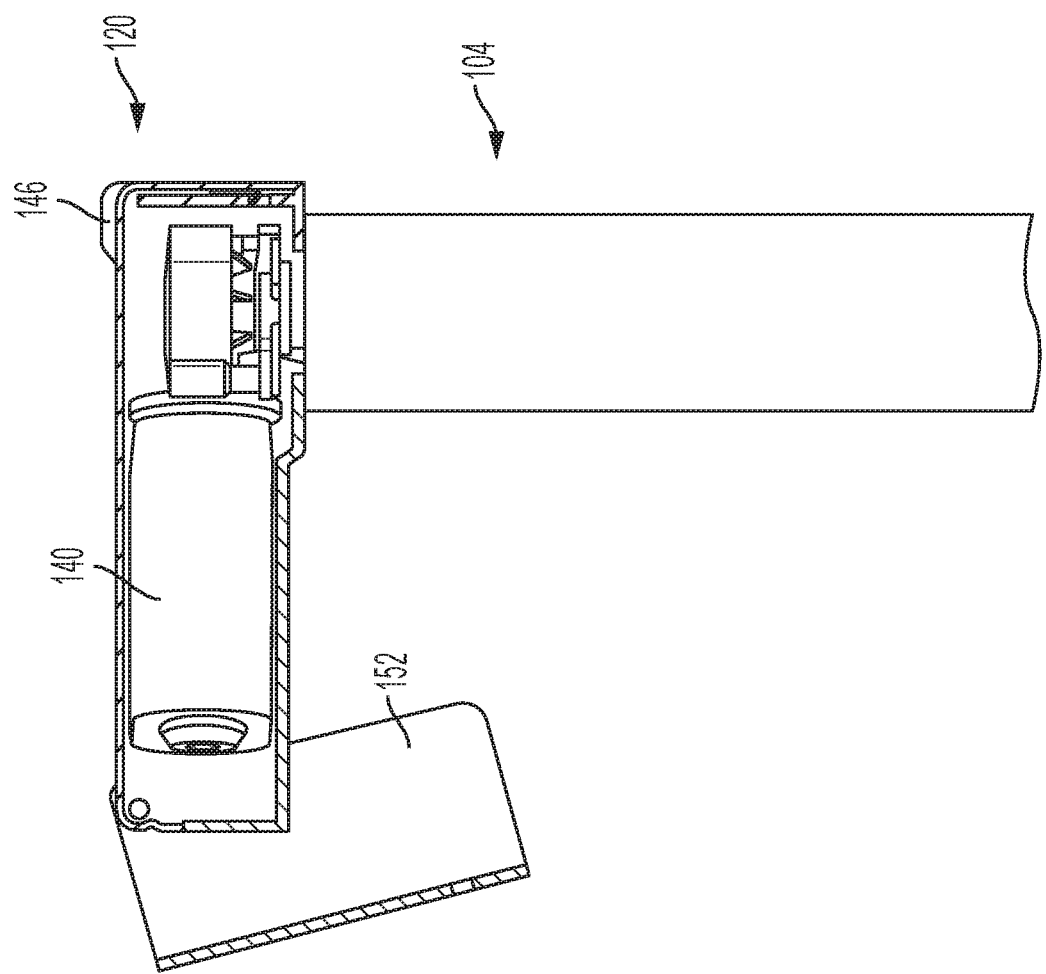
FIG. 33A illustrates a sectional view along line 33-33, where the lever is in the loosened configuration, according to the alternative aspect of FIG. 31.
Figure 34:
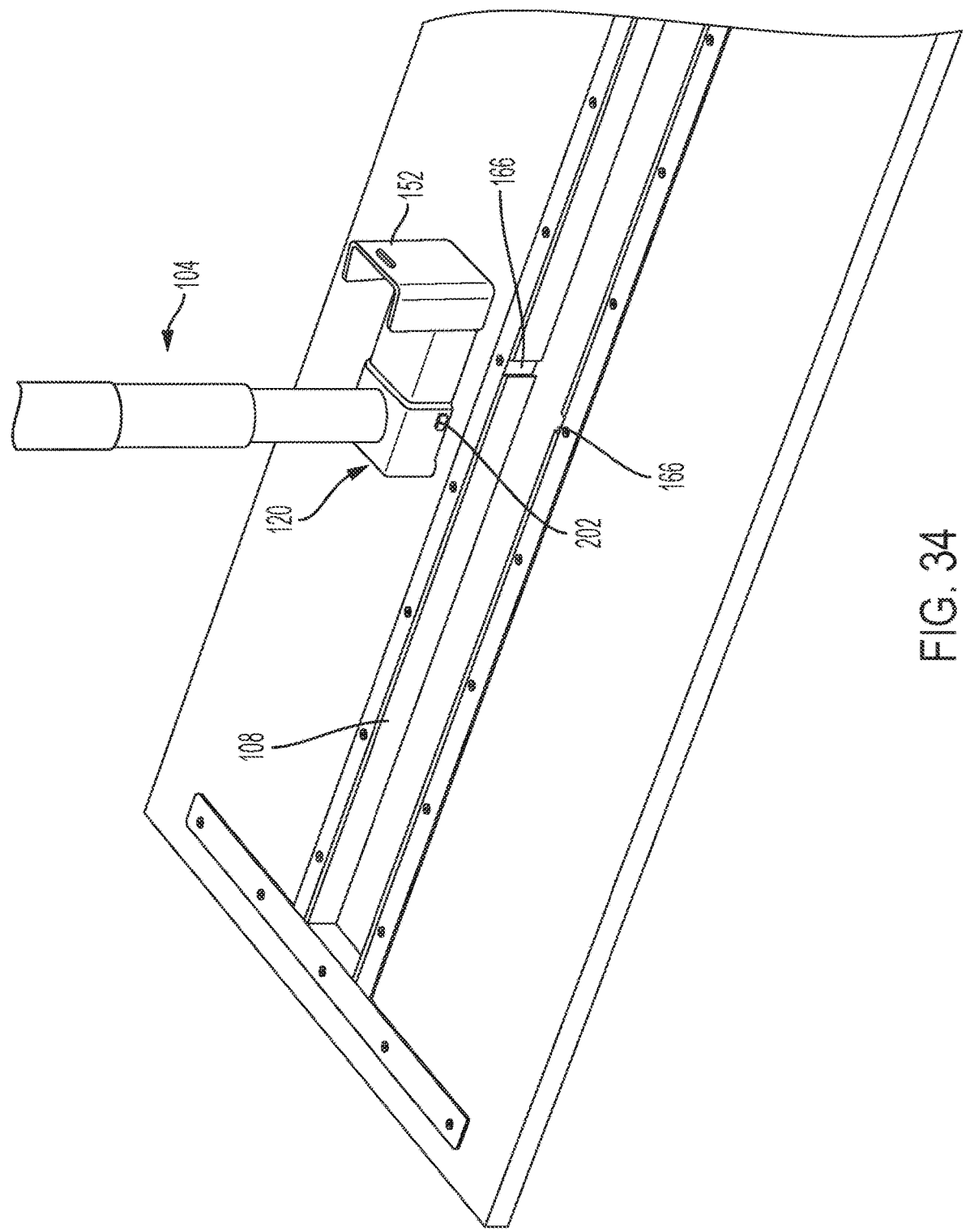
FIG. 34 illustrates a perspective view of the connector assembly prior to being engaged with a desktop rail, according to the alternative aspect of FIG. 31.
Figure 36:
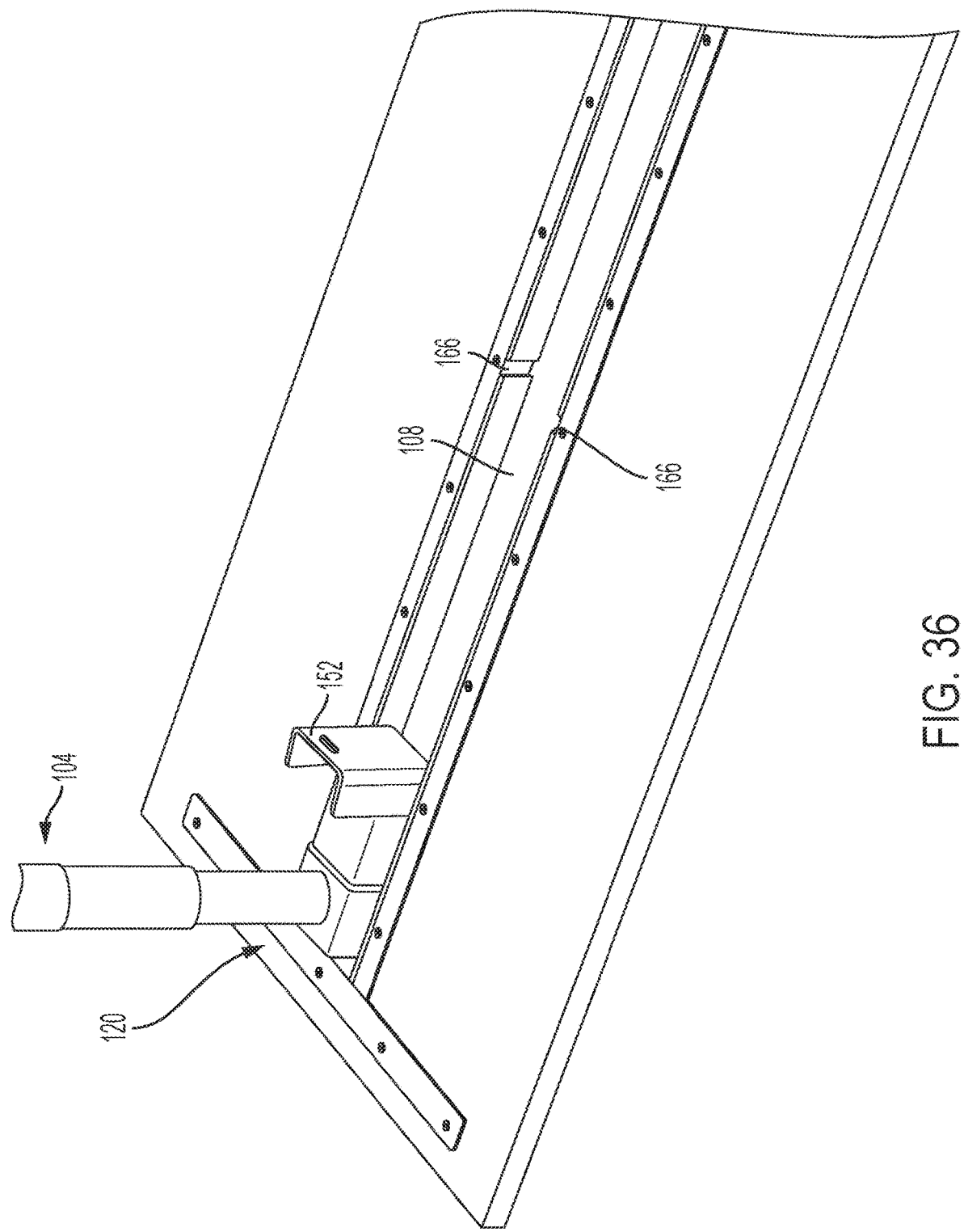
FIG. 36 illustrates a perspective view of the connector assembly slid to a distal end of the rail, according to the alternative aspect of FIG. 31.
Figure 37:
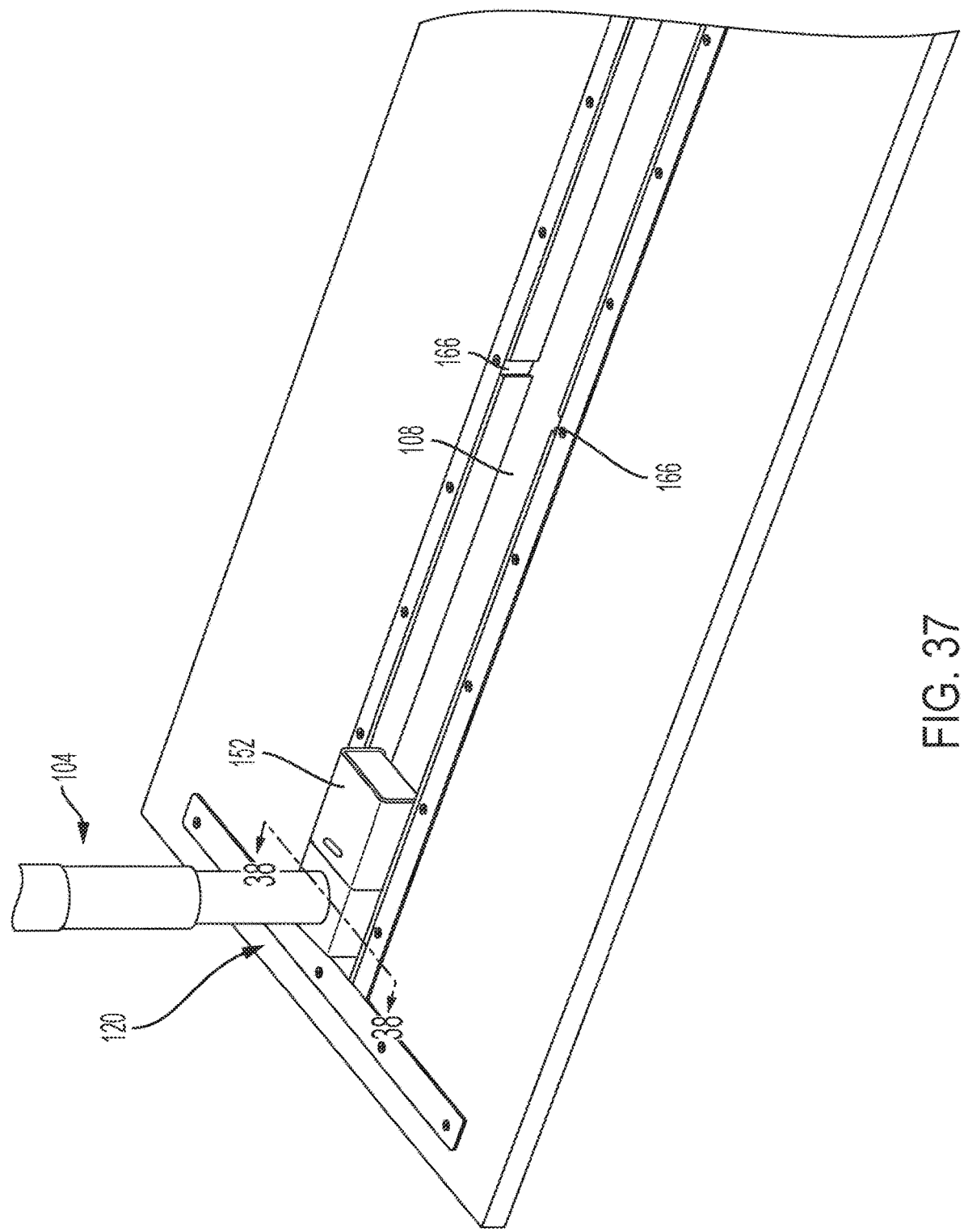
FIG. 37 illustrates a perspective view of the connector assembly engaged with the rail, where the lever is in the tightened configuration, according to the alternative aspect of FIG. 31.
Figure 39A:
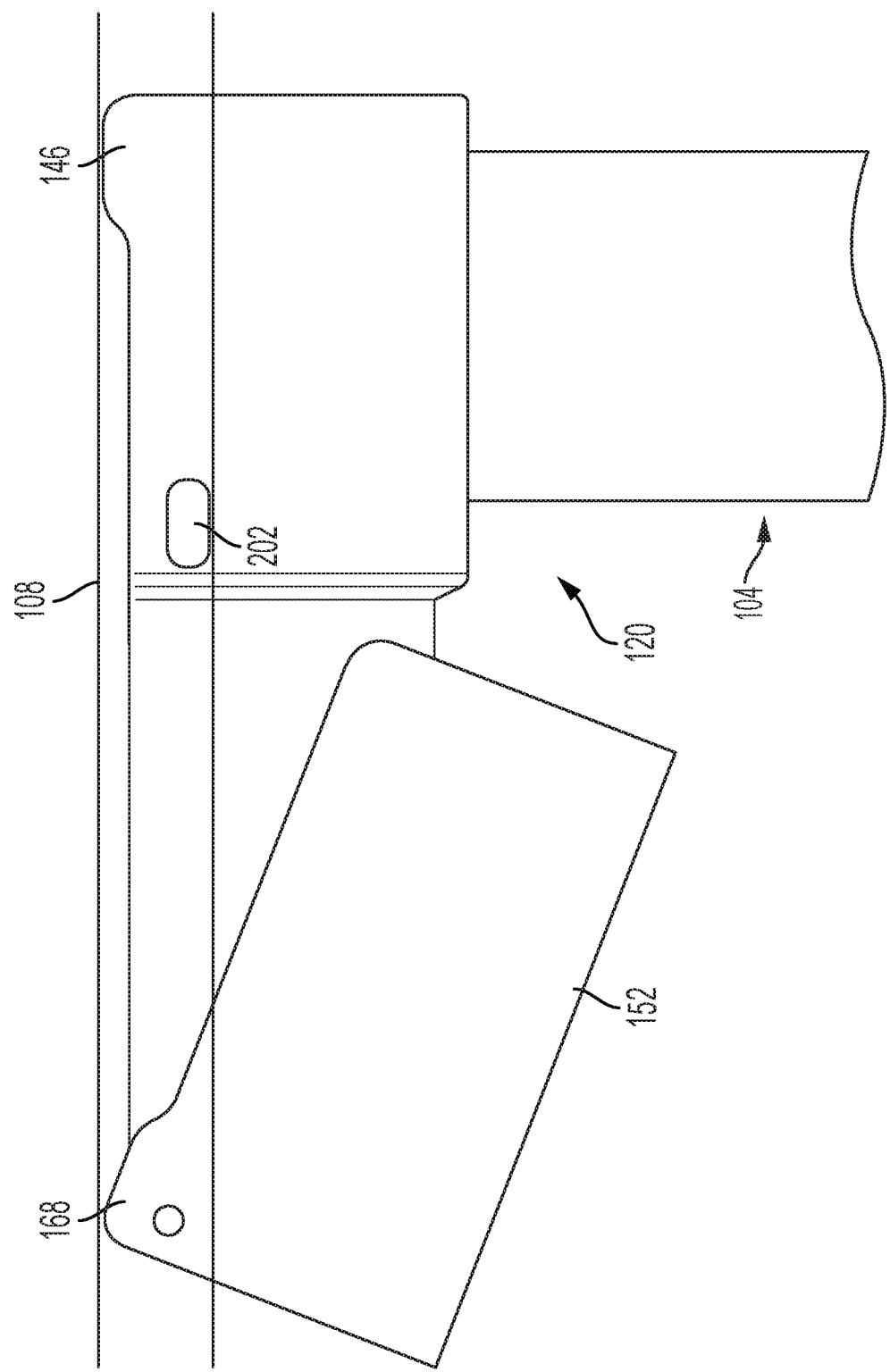
FIG. 39A illustrates a sectional view of the connector assembly along line 39-39, where the connector assembly is in the loosened configuration, according to the alternative aspect of FIG. 31.
Figure 39B:
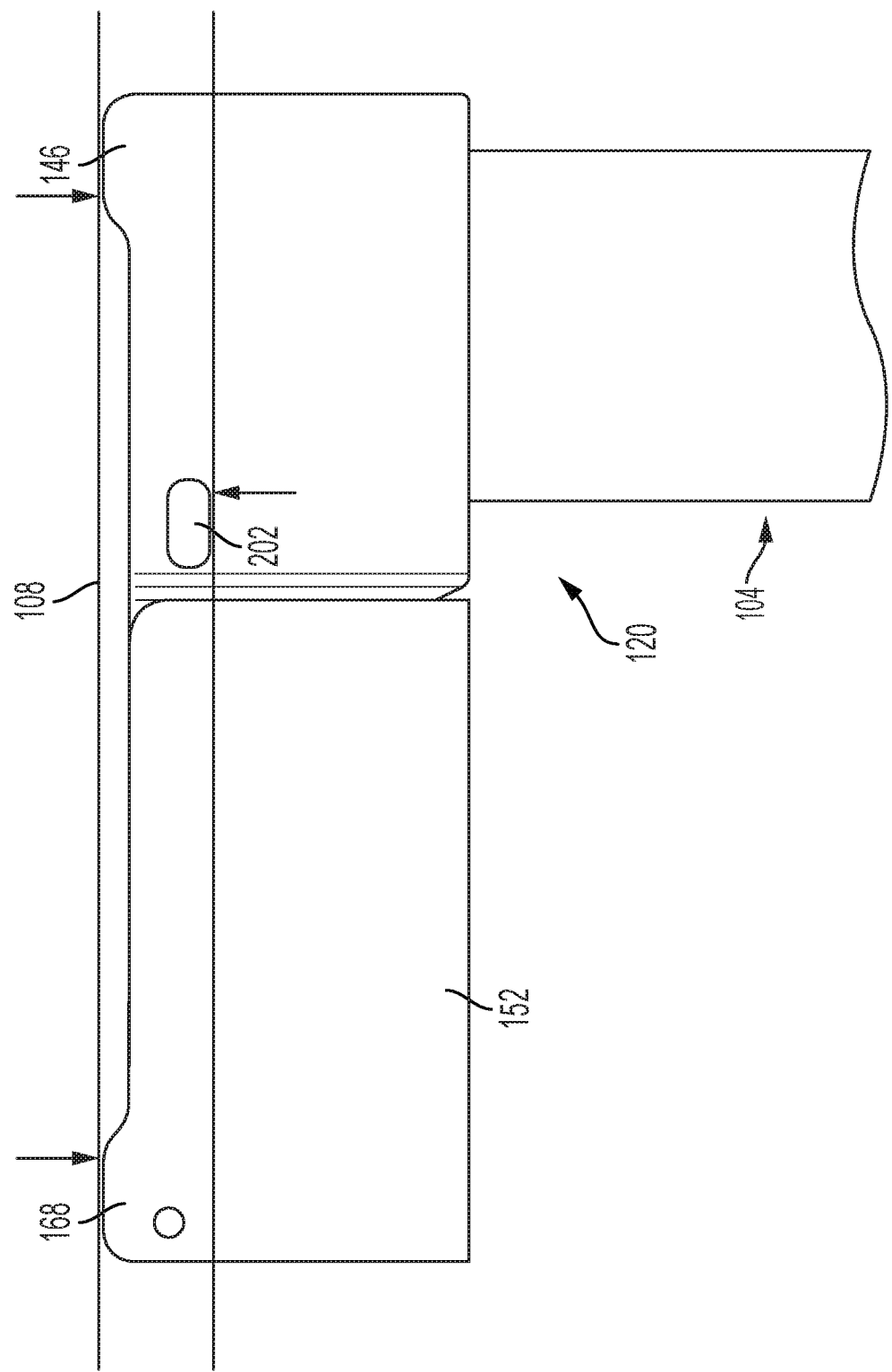
FIG. 39B illustrates a sectional view of the connector assembly along line 39-39, where the connector assembly is in the tightened configuration, according to the alternative aspect of FIG. 31.

Once inserted into the rail and when the lever 152 is in the open position, the connector assembly 120 can be slid along the length of the rail 108 to position the connector assembly 120 at the desired location, as depicted in FIGS. 35 and 36. When the lever 152 is in the open position, the second protrusions 168 (which extend from the lever 152) are rotated out of alignment with the first protrusions 146, as depicted in FIG. 33A, which thus allows for the connector assembly 120 to be pivoted slightly within the rail 108 about the first protrusions 146 to create clearance to slide the connector assembly 120 through the rail 108. Once at the desired location, the connector assembly 120 can be locked in place by transitioning the lever 152 from the open position to the closed position, as depicted in FIG. 37. When the lever 152 is in the closed position, the second protrusions 168 are rotated into alignment with the first protrusions 146, as depicted in FIG. 33B. As depicted in FIG. 38, the distance $d_1$ between the undersurface of the lip 212 of the rail 108 and the bottom surface 214 of the rail 108 is equal to a close tolerance to the distance $d_2$ between the end of the tabs 202 and the portion or end of the first and second protrusions 146, 168 that contact the bottom surface 214 of the rail 108. Accordingly, pivoting the lever 152 from a first or open position, as illustrated in FIG. 39A, to a second or closed position, as illustrated in FIG. 39B, when the connector assembly 120 is positioned within the rail 108 rotates the second protrusion(s) 168 into contact with the bottom surface 214 of the rail 108, which then causes the first and second protrusions 146, 168 to frictionally engage the bottom surface 214 of the rail 108 and the tab(s) 202 to frictionally engage the lip 212 of the rail 108. By this action, the connector assembly 120 is fixedly held or wedged within the rail 108. The frictional forces exerted by the first, second, and third protrusions 146, 168, 202 against the rail 108 prevent longitudinal, later, and/or rotational movement of the connector assembly 120 within the rail 108 and thus the connector assembly 120 is fixedly held in place therein, as illustrated in FIG. 39B.

Various aspects of the present disclosure are directed to an attachment assembly for quickly, simply, and rigidly attaching a motor housing and a leg assembly to a desktop of an electronic height-adjustable desk. For example, utilizing the structural and geometrical provisions of standard T-slot aluminum profiles, a motor housing's generous top surface plate may be integrally outfitted with male anchors along its length to interface and gain a strong purchase with a slotted rail. By actuating a lever with a cam at one extremity of the housing plate opposing an elevated fulcrum at the opposite end, the male anchors are moved from a free state within the slot to a locked position. Access to the rail can be made from the open ends or via a special cored-out channel on the rail's surface. The attachment of additional components (e.g., the electrical control box, rectangular tubing for cord management, etc.) may be accommodated by the slotted rail as well.

Advantages of the present disclosure include but are not limited to: intuitive and quick assembly, the elimination of screws and/or tools for assembly, the ability to locate the leg assemblies in various positions along the rail without prescription, the low profile of a structurally sound top with a pre-installed integral frame (e.g., slotted rail, angle brackets, etc.), and an abundant interchangeability across a range of top sizes and leg options.

The levering from one end of a rigid plate with integral fixation to a slotted rail should not be limited to use for a stand-up desk leg assembly. Such aspects could have wide-ranging application for the fixation of all types of load bearing and structural assemblies (e.g., with fixed legs or otherwise). Notably, the geometrical relationship of the male anchors and slotted profile are not limited to available aluminum profiles. Namely, according to various aspects, profiles of other shapes and materials can be made to measure for customized applications across a wide variety of surface shapes, sizes, and furnishings.

Various aspects of the subject matter described herein are set out in the following numbered examples:

Example 1. An attachment assembly comprising: a connector assembly comprising: a first protrusion held in a fixed orientation relative to the connector assembly; a lever pivotable between a first position and a second position; a second protrusion extending from the lever, the second protrusion configured to rotate from a first orientation to a second orientation as the lever pivots from the first position to the second position; a third protrusion positioned between the first protrusion and the second protrusion; and a rail comprising: a lip; and a cutout in the lip, the cutout located at an insertion position on the rail and sized to receive the third protrusion; wherein the rail is configured to retain the connector assembly at a retention position on the rail, the retention position being at a different position than the insertion position; wherein pivoting the lever from the first position to the second position when the connector assembly is positioned within the rail is configured to cause the second protrusion to bear against a bottom surface of the rail, such that the first protrusion and the second protrusion frictionally engage the bottom surface of the rail and the third protrusion frictionally engages the lip to fixedly hold the connector assembly at the retention position.

Example 2. The attachment assembly of Example 1, wherein the third protrusion is nonplanar to a plane defined by the first protrusion and the second protrusion.

Example 3 The attachment assembly of Examples 1 or 2, wherein the first protrusion and the second protrusion are equal in height.

Example 4. The attachment assembly of any one of Examples 1-3, wherein a first distance between an undersurface of the lip and the bottom surface of the rail is equal to a close tolerance to a second distance between an end of the third protrusion and an end of the first protrusion that contacts the bottom surface of the rail.

Example 5. The attachment assembly of any one of Examples 1-4, wherein the first protrusion and the second protrusion comprise a compressible material.

Example 6. The attachment assembly of any one of Examples 1-5, wherein a longitudinal axis of the connector assembly forms an angle with a longitudinal axis of the rail when the lever is in the first position, the angle configured to prevent the first protrusion and the second protrusion from frictionally engaging the rail.

Example 7. A furniture assembly comprising: a table surface; a leg assembly; a connector assembly disposed on the leg assembly, the connector assembly comprising: a first protrusion held in a fixed orientation relative to the connector assembly; a lever pivotable between a first position and a second position; a second protrusion extending from the lever, the second protrusion configured to rotate from a first orientation to a second orientation as the lever pivots from the first position to the second position; a third protrusion positioned between the first protrusion and the second protrusion; and a rail disposed on the table surface, the rail comprising: a lip; and a cutout in the lip, the cutout located at an insertion position on the rail and sized to receive the third protrusion; wherein the rail is configured to retain the connector assembly at a retention position on the rail, the retention position being at a different position than the insertion position; wherein pivoting the lever from the first position to the second position when the connector assembly is positioned within the rail is configured to cause the second protrusion to bear against a bottom surface of the rail, such that the first protrusion and the second protrusion frictionally engage the bottom surface of the rail and the third protrusion frictionally engages the lip to fixedly hold the connector assembly at the retention position.

Example 8. The furniture assembly of Example 7, wherein the third protrusion is nonplanar to a plane defined by the first protrusion and the second protrusion.

Example 9. The furniture assembly of Examples 7 or 8, wherein the first protrusion and the second protrusion are equal in height.

Example 10. The furniture assembly of any one of Examples 7-9, wherein a first distance between an undersurface of the lip and the bottom surface of the rail is equal to a close tolerance to a second distance between an end of the third protrusion and an end of the first protrusion that contacts the bottom surface of the rail.

Example 11. The furniture assembly of any one of Examples 7-10, wherein the first protrusion and the second protrusion comprise a compressible material.

Example 12. The furniture assembly of any one of Examples 7-11, wherein a longitudinal axis of the connector assembly forms an angle with a longitudinal axis of the rail when the lever is in the first position, the angle configured to prevent the first protrusion and the second protrusion from frictionally engaging the rail.

Example 13. The furniture assembly of any one of Examples 7-12, wherein the connector assembly further comprises: a housing; a motor disposed within the housing, the motor configured to extend and retract the leg assembly.

Example 14. A method of assembling an article of furniture comprising a connector assembly and a rail, the connector assembly comprising a first protrusion held in a fixed orientation relative to the connector assembly, a lever pivotable between a first position and a second position, a second protrusion extending from the lever, the second protrusion configured to rotate from a first orientation to a second orientation as the lever pivots from the first position to the second position, and a third protrusion positioned between the first protrusion and the second protrusion, the rail comprising a lip and a cutout in the lip, the cutout sized to receive the third protrusion, the method comprising: aligning the third protrusion with the cutout; inserting the connector assembly into the rail; sliding the connector assembly to a location along the rail; and pivoting the lever from the first position to the second position to cause the second protrusion to bear against a bottom surface of the rail, such that the first protrusion and the second protrusion frictionally engage the bottom surface of the rail and the third protrusion frictionally engages the lip to fixedly hold the connector assembly at a retention position.

Example 15. The method of Example 14, wherein the connector assembly comprises a first connector assembly, further comprising: aligning a third protrusion of a second connector assembly with the cutout; inserting the second connector assembly into the rail; sliding the second connector assembly to a second location along the rail; and pivoting a second lever of the second connector assembly from a first position to a second position to cause a second protrusion of the second connector assembly to bear against the bottom surface of the rail, such that a first protrusion of the second connector assembly and the second protrusion of the second connector assembly frictionally engage the bottom surface of the rail and the third protrusion frictionally engages the lip to wedge the second connector assembly within the rail and fixedly hold the second connector assembly in place at the second location.

Example 16. The method of Examples 14 or 15, wherein the third protrusion is nonplanar to a plane defined by the first protrusion and the second protrusion.

Example 17. The method of any one of Examples 14-16, wherein the first protrusion and the second protrusion are equal in height.

Example 18. The method of any one of Examples 14-17, wherein a first distance between an undersurface of the lip and the bottom surface of the rail is equal to a close tolerance to a second distance between an end of the third protrusion and an end of the first protrusion that contacts the bottom surface of the rail.

Example 19. The method of any one of Examples 14-18, wherein the first protrusion and the second protrusion comprise a compressible material.

Example 20. The method of any one of Examples 14-19, wherein a longitudinal axis of the connector assembly forms an angle with a longitudinal axis of the rail when the lever is in the first position, the angle configured to prevent the first protrusion and the second protrusion from frictionally engaging the rail.

Example 21. The method of any one of Examples 14-20, wherein the connector assembly further comprises a leg assembly attached thereto.

While various details have been set forth in the foregoing description, it will be appreciated that the various aspects of the techniques may be practiced without these specific details. One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Further, while several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

It is to be understood that depicted architectures of different components contained within, or connected with, different other components are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated also can be viewed as being "operably connected," or "operably coupled," to each other to achieve the desired functionality, and any two components capable of being so associated also can be viewed as being "operably couplable" to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components, and/or electrically interacting components, and/or electrically interactable components, and/or optically interacting components, and/or optically interactable components.

In other instances, one or more components may be referred to herein as "configured to," "configurable to," "operable/operative to," "adapted/adaptable to," "able to," "conformable/conformed to," etc. Those skilled in the art will recognize that "configured to" can generally encompass active-state components and/or inactive-state components and/or standby-state components, unless context requires otherwise.

While particular aspects of the present disclosure have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. It will be understood by those within the art that, in general, terms used herein, and especially in the appended claims (e.g., bodies of the appended claims), are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

Wth respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "one form," or "a form" means that a particular feature, structure, or characteristic described in connection with the aspect is included in at least one aspect. Thus, appearances of the phrases "in one aspect," "in an aspect," "in one form," or "in a form" in various places throughout the specification are not necessarily all referring to the same aspect. Furthermore, the particular features, structures, or characteristics may be combined in any suitable manner in one or more aspects.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:
1. An attachment assembly comprising:
   a connector assembly, comprising:
      a housing;
      a first protrusion held in a fixed orientation relative to the housing;

a lever pivotably coupled to the housing, the lever pivotable between a first position and a second position;

a second protrusion extending from the lever, the second protrusion configured to rotate from a first orientation to a second orientation as the lever pivots from the first position to the second position;

a third protrusion positioned between the first protrusion and the second protrusion; and a rail comprising:
  a lip; and
  a cutout in the lip, the cutout located at an insertion position on the rail and sized to receive the third protrusion;

wherein the rail is configured to retain the connector assembly at a retention position on the rail, the retention position being at a different position than the insertion position;

wherein pivoting the lever from the first position to the second position when the connector assembly is positioned within the rail is configured to cause the second protrusion to bear against a bottom surface of the rail, such that the first protrusion and the second protrusion frictionally engage the bottom surface of the rail and the third protrusion frictionally engages the lip to fixedly hold the connector assembly at the retention position.

2. The attachment assembly of claim 1, wherein the first protrusion and the second protrusion extend toward the rail to a longitudinal axis, and wherein the third protrusion extends through the longitudinal axis.

3. The attachment assembly of claim 1, wherein the first protrusion and the second protrusion are equal in height.

4. The attachment assembly of claim 1, wherein a first distance between an undersurface of the lip and the bottom surface of the rail is equal to a close tolerance to a second distance between an end of the third protrusion and an end of the first protrusion that contacts the bottom surface of the rail.

5. The attachment assembly of claim 1, wherein the first protrusion and the second protrusion comprise a compressible material.

6. The attachment assembly of claim 1, wherein a longitudinal axis of the connector assembly forms an angle with a longitudinal axis of the rail when the lever is in the first position such that the first protrusion and the second protrusion are prevented from frictionally engaging the rail.

7. A furniture assembly comprising:
  a table surface;
  a leg assembly;
  a connector assembly disposed on the leg assembly, the connector assembly comprising:
    a housing;
    a first protrusion held in a fixed orientation relative to the housing;
    a lever pivotably coupled to the housing, the lever pivotable between a first position and a second position;
    a second protrusion extending from the lever, the second protrusion configured to rotate from a first orientation to a second orientation as the lever pivots from the first position to the second position;
    a third protrusion positioned between the first protrusion and the second protrusion; and
  a rail disposed on the table surface, the rail comprising:
    a lip; and
    a cutout in the lip, the cutout located at an insertion position on the rail and sized to receive the third protrusion;
  wherein the rail is configured to retain the connector assembly at a retention position on the rail, the retention position being at a different position than the insertion position;
  wherein pivoting the lever from the first position to the second position when the connector assembly is positioned within the rail is configured to cause the second protrusion to bear against a bottom surface of the rail, such that the first protrusion and the second protrusion frictionally engage the bottom surface of the rail and the third protrusion frictionally engages the lip to fixedly hold the connector assembly at the retention position.

8. The furniture assembly of claim 7, wherein the first protrusion and the second protrusion extend toward the rail to a longitudinal axis, and wherein the third protrusion extends through the longitudinal axis.

9. The furniture assembly of claim 7, wherein the first protrusion and the second protrusion are equal in height.

10. The furniture assembly of claim 7, wherein a first distance between an undersurface of the lip and the bottom surface of the rail is equal to a close tolerance to a second distance between an end of the third protrusion and an end of the first protrusion that contacts the bottom surface of the rail.

11. The furniture assembly of claim 7, wherein the first protrusion and the second protrusion comprise a compressible material.

12. The furniture assembly of claim 7, wherein a longitudinal axis of the connector assembly forms an angle with a longitudinal axis of the rail when the lever is in the first position such that the first protrusion and the second protrusion are prevented from frictionally engaging the rail.

13. The furniture assembly of claim 7, wherein the connector assembly further comprises
  a motor disposed within the housing, the motor configured to extend and retract the leg assembly.

14. A method of assembling an article of furniture comprising a connector assembly and a rail, the connector assembly comprising a housing, a first protrusion held in a fixed orientation relative to the housing, a lever pivotably coupled to the housing, the lever pivotable between a first position and a second position, a second protrusion extending from the lever, the second protrusion configured to rotate from a first orientation to a second orientation as the lever pivots from the first position to the second position, and a third protrusion positioned between the first protrusion and the second protrusion, the rail comprising a lip and a cutout in the lip, the cutout sized to receive the third protrusion, the method comprising:
  aligning the third protrusion with the cutout;
  inserting the connector assembly into the rail;
  sliding the connector assembly to a location along the rail; and
  pivoting the lever from the first position to the second position to cause the second protrusion to bear against a bottom surface of the rail, such that the first protrusion and the second protrusion frictionally engage the bottom surface of the rail and the third protrusion frictionally engages the lip to fixedly hold the connector assembly at a retention position.

15. The method of claim 14, wherein the connector assembly comprises a first connector assembly, further comprising:

aligning a third protrusion of a second connector assembly with the cutout;

inserting the second connector assembly into the rail;

sliding the second connector assembly to a second location along the rail; and pivoting a second lever of the second connector assembly from a first position to a second position to cause a second protrusion of the second connector assembly to bear against the bottom surface of the rail, such that a first protrusion of the second connector assembly and the second protrusion of the second connector assembly frictionally engage the bottom surface of the rail and the third protrusion frictionally engages the lip to wedge the second connector assembly within the rail and fixedly hold the second connector assembly in place at the second location.

16. The method of claim 14, wherein the first protrusion and the second protrusion extend toward the rail to a longitudinal axis, and wherein the third protrusion extends through the longitudinal axis.

17. The method of claim 14, wherein the first protrusion and the second protrusion are equal in height.

18. The method of claim 14, wherein a first distance between an undersurface of the lip and the bottom surface of the rail is equal to a close tolerance to a second distance between an end of the third protrusion and an end of the first protrusion that contacts the bottom surface of the rail.

19. The method of claim 14, wherein the first protrusion and the second protrusion comprise a compressible material.

20. The method of claim 14, wherein a longitudinal axis of the connector assembly forms an angle with a longitudinal axis of the rail when the lever is in the first position such that the first protrusion and the second protrusion are prevented from frictionally engaging the rail.

21. The method of claim 14, wherein the connector assembly further comprises a leg assembly attached thereto.

* * * * *